(12) United States Patent
Furche et al.

(10) Patent No.: US 10,643,203 B2
(45) Date of Patent: May 5, 2020

(54) SECURE TRANSACTION CONTROLLER FOR VALUE TOKEN EXCHANGE SYSTEMS

(71) Applicant: Digicash Pty Ltd., Sydney, NSW (AU)

(72) Inventors: Andreas Furche, Daintree (AU); Jelte Willem Jan Van Der Hoek, Amsterdam (NL)

(73) Assignee: DIGICASH PTY LTD., Daintree (AU)

( * ) Notice: Subject to any disclaimer, the term of this patent is extended or adjusted under 35 U.S.C. 154(b) by 699 days.

(21) Appl. No.: 15/348,952

(22) Filed: Nov. 10, 2016

(65) Prior Publication Data

US 2017/0293912 A1    Oct. 12, 2017

Related U.S. Application Data

(63) Continuation-in-part of application No. 15/184,636, filed on Jun. 16, 2016.

(60) Provisional application No. 62/321,676, filed on Apr. 12, 2016.

(51) Int. Cl.
| | |
|---|---|
| *G06Q 20/38* | (2012.01) |
| *H04L 9/32* | (2006.01) |
| *H04L 9/30* | (2006.01) |
| *G06Q 20/06* | (2012.01) |

(52) U.S. Cl.
CPC ....... *G06Q 20/3829* (2013.01); *G06Q 20/065* (2013.01); *G06Q 20/385* (2013.01); *H04L 9/30* (2013.01); *H04L 9/3247* (2013.01); *H04L 9/3263* (2013.01); *H04L 2209/56* (2013.01)

(58) Field of Classification Search
CPC ................................................. G06Q 20/3829
See application file for complete search history.

(56) References Cited

U.S. PATENT DOCUMENTS

| | | | |
|---|---|---|---|
| 4,759,063 A | 7/1988 | Chaum | |
| 4,759,064 A | 7/1988 | Chaum | |
| 4,914,698 A | 4/1990 | Chaum | |
| 4,947,430 A | 8/1990 | Chaum | |
| 4,949,380 A | 8/1990 | Chaum | |
| 4,987,593 A | 1/1991 | Chaum | |
| 5,453,601 A * | 9/1995 | Rosen .................... | G06Q 20/02 235/379 |
| 5,712,913 A | 1/1998 | Chaum | |
| 5,768,375 A | 6/1998 | Yamauchi et al. | |
| 5,781,631 A | 7/1998 | Chaum | |
| 5,845,266 A * | 12/1998 | Lupien .................... | G06Q 40/00 705/36 R |

(Continued)

FOREIGN PATENT DOCUMENTS

| | | |
|---|---|---|
| EP | 1005682 | 6/2000 |
| WO | WO2015085393 | 6/2015 |

OTHER PUBLICATIONS

Furche, Andreas, "The Model of Token Money," Macquarie University (NSW, Australia), all pages. (Year: 2001).*

(Continued)

*Primary Examiner* — Jacob C. Coppola
(74) *Attorney, Agent, or Firm* — K&L Gates LLP

(57) ABSTRACT

Systems and methods that provide improved security and scalability in digital token exchange are disclosed. A secure transaction controller may include an exchange request module, exchange matching module, and exchange execution module to facilitate the exchange of different classes of value tokens.

20 Claims, 24 Drawing Sheets

(56) References Cited

U.S. PATENT DOCUMENTS

| | | | |
|---|---|---|---|
| 5,878,140 A | 3/1999 | Chaum | |
| 6,438,691 B1 | 8/2002 | Mao | |
| 6,493,683 B1* | 12/2002 | David | G06Q 20/02 705/37 |
| 7,328,189 B2 | 2/2008 | Ling | |
| 7,783,539 B2 | 8/2010 | Martin | |
| 8,442,919 B2 | 5/2013 | Al-Herz et al. | |
| 8,590,779 B2 | 11/2013 | Tullis | |
| 8,712,918 B2 | 4/2014 | Omer | |
| 8,924,301 B2 | 12/2014 | Lindelsee | |
| 9,147,188 B2 | 9/2015 | Dharmapalan | |
| 9,836,790 B2* | 12/2017 | Ronca | G06Q 40/04 |
| 2002/0004783 A1 | 1/2002 | Paltenghe et al. | |
| 2006/0213975 A1 | 9/2006 | Krishnan et al. | |
| 2008/0228651 A1 | 9/2008 | Tapsell | |
| 2008/0262969 A1* | 10/2008 | Samid | G06Q 20/04 705/64 |
| 2010/0325297 A1 | 12/2010 | Romney et al. | |
| 2013/0036476 A1* | 2/2013 | Roever | H04L 63/08 726/27 |
| 2013/0054471 A1* | 2/2013 | Samid | G06Q 20/04 705/69 |
| 2013/0311348 A1* | 11/2013 | Samid | G06Q 40/00 705/37 |
| 2014/0143142 A1 | 5/2014 | Talker | |
| 2014/0258073 A1* | 9/2014 | Hunn | G06Q 40/04 705/37 |
| 2015/0032627 A1 | 1/2015 | Dill et al. | |
| 2015/0081566 A1 | 3/2015 | Slepinin | |
| 2015/0120536 A1 | 4/2015 | Talker | |
| 2016/0092988 A1* | 3/2016 | Letourneau | G06Q 40/06 705/66 |
| 2016/0359633 A1* | 12/2016 | Norton | H04L 9/3247 |
| 2017/0279786 A1* | 9/2017 | Peterson | G06F 21/6245 |

OTHER PUBLICATIONS

Chaum et al., "Minting electronic cash," IEEE Spectrum, all pages. (Year: 1997).*

International Search Report and Written Opinion dated Oct. 12, 2017 issued for International PCT Application No. PCT/IB2017/000507.

Andreas Furche, The Model of Token Money, Ph. D. thesis, Macquarie Graduate School of Management, Macquarie University, NSW, Australia, Mar. 1, 2001.

* cited by examiner

FIG. 9

| Token ID | Spent | Suspect | Not Valid After | Not Valid Before | Mint Issuer |
|---|---|---|---|---|---|
| A1235689 | No | No | Noon 3/30/2016 | Noon 3/29/2016 | XYZ1234 |
| A1235688 | Yes | No | Noon 3/30/2016 | Noon 3/29/2016 | XYZ1234 |

FIG. 10

1010 Token UID = "abc456"

1020 Issued by Mint UID = "xyz123"

1030 Class = "Euros"

1040 Denomination = "10"

1050 "not valid before Date 1"/"not valid after Date 2"

1060 Redemption Rule Information = "expressed rule set for Token"

1070 Risk = "None"

SECURE TRANSACTION CONTROLLER FOR VALUE TOKEN EXCHANGE SYSTEMS

CROSS-REFERENCE TO RELATED APPLICATIONS AND PRIORITY CLAIM

This application is a continuation-in-part of U.S. application Ser. No. 15/184,636 filed Jun. 16, 2016, and also claims priority to U.S. Provisional Application 62/321,676 filed Apr. 12, 2016. The entire disclosures of said applications are incorporated herein by reference thereto.

BACKGROUND

Within the area of cryptography and computer security, there has been substantial research on the secure creation and transfer of electronic value. This area of research is generally termed 'electronic cash research', although its applications in practice are much wider than the creation and circulation of electronic forms of money, as such, because the techniques extend to the creation and circulation of electronic value of any kind.

Cryptographic electronic cash systems may be based on the circulation of so-called digital currency. Electronic cash systems are generally classified as 'on-line' or 'off-line'. On-line systems generally require the verification of digital currency at transaction time in order to provide for a secure system. The verification procedure may prevent spending illegitimate copies of a digital currency.

Electronic cash systems also include both token based and account/ledger based systems. In an account/ledger based system, value is represented as entries in a centralised or distributed data repository, and transactions are ledger entries containing a 'from' (payer) and a 'to' (payee) account identifier and/or other information serving as a ledger of transactions.

In some electronic digital currency token based systems value may be stored in electronic form on user's devices, much like holding a banknote, coin, or share certificate in printed or minted form. A transaction may include sending, normally though one or more electronic transmission channels digital currency from a payer to a payee. In some prior systems, a server may maintain a record of valid serial numbers for digital currency tokens, and the exchange value associated with them. When such a digital currency token is provided back to the issuer for 'deposit' (also referred to as 'redemption'), it may be marked as 'invalid' on the server records and the exchange value provided to the user in return. An early example of such a system was called Netcash (Medvinski 1993).

Alternatively, instead of just issuing digital currency as an identification string (serial number), digital currency can be cryptographically signed by the issuer, e.g., using a cryptographic digital signature. This allows local verification, by any user in the system that this signed digital currency has indeed been issued by a given issuer. Furthermore, the issuer can add additional conditions or information to such a digital currency, which can then also be locally verified as having been added by the issuer—for example, the amount or denomination of a digital currency, or an expiry date. It will be appreciated that, in this scenario, the contents of the digital currency and authenticity of its issuer can be verified locally. Unless the digital signature is compromised, the digital currency cannot be modified by a party other than the issuer. A verification check by the issuer is now required only to prevent so-called 'double spending' of a digital currency, that is the improper duplication of the digital currency and the attempt to spend it more than once.

A further extension of digital currency with digital signatures is the use of the so-called "blind signature" approach. This approach allows for a secure system where a user, not the issuer, creates unsigned 'proto digital currency tokens', which are then provided to the issuer to sign (in what may be termed a 'withdrawal' transaction). At the times digital currency tokens are signed by the issuer, the issuer does not see their serial numbers, nor is the issuer able to determine them. However, the issuer can securely identify the correctness and denomination of the requested digital currency, which the issuer can then endorse with its digital signature. In order to prevent double spending under this system, it may be necessary to maintain and compare to a record of 'spent' digital currency, rather than a record of 'valid' digital currency. That is because the issuer only effectively sees the serial number of a digital currency token at the time it is returned for 'deposit' (or 'redemption'). Most notably, this approach permits a user to remain anonymous during a transaction. In order to make a valid payment, the user need not disclose his identity, nor any account related to his identity, to the payee, nor to the issuer. This type of electronic cash system is therefore seen as more 'cash-like' in its properties, in comparison with other electronic cash systems.

Existing electronic cash systems have numerous limitations and bottlenecks. In particular, these systems are often not readily scalable, or the system security is irrevocably impacted in case of the compromise of the signature key.

Electronic cash systems utilising digital signatures rely for their security on the security of the signature key used to sign digital currency tokens. Signature keys therefore have to be heavily protected. In practice digital signature keys are usually changed at regular intervals, in order to limit exposure to risk from potential attackers. The risk level in case of a successful attack on the signature key (or its accidental or wilful disclosure) is very high, since, theoretically, the attacker can now create seemingly valid digital currency tokens in unlimited quantities. This problem is magnified by the Internet-specific problem, namely that these improperly obtained keys can be distributed rapidly and widely, and improperly signed tokens can be very rapidly distributed and redeemed on a wide scale, potentially without geographic limitations.

There may often be problems with interoperability or exchangeability of digital currency tokens issued by different issuers.

In existing systems, the double spending check may constitute a significant performance bottleneck. The task of checking against the double spending record cannot be parallelised easily, because there is a risk of potential double spending unless an unambiguously up-to-date version of the double spending record is being checked against.

Certain system properties and transaction monitoring, often required for regulatory and operational reporting purposes in the operation on electronic payment systems (such as AML-Anti Money Laundering—and suspicious transactions reporting), are difficult to achieve in electronic cash systems as described above, particularly when anonymous tokens are employed, due to several different limitations when compared to account based systems.

Some example embodiments described in the present disclosure include systems and methods for handling digital currency tokens that are more secure and more scalable, while providing improved auditability. Further example embodiments provide systems and methods that allow secure, scalable and flexible exchange of tokens of different types.

SUMMARY

One example embodiment of the present invention includes an apparatus for cryptographically signed digital tokens representing value. The apparatus includes a processor, a memory accessible to the processor; and a secure memory readable by the processor, and storing a private Mint key. The processor is configured to receive a request from a requester to swap a previously issued Value Token and to read from the memory the Value Token, the previously issued Value token having a class, a digital signature, and a denomination. The processor is configured, responsive to the request, to validate the previously issued Value Token(s) using the digital signature, and responsive to validating the token(s) and the request, to cause a newly issued Value Token(s) having the class and denomination to be signed using the private Mint key, and to send the signed newly issued Value Token(s) to the requester. The processor is configured to sign and send new intrinsic Value Token(s) only in response to requests to swap previously issued coded Value token(s). Optionally, validating previously issued Value Tokens includes validating a digital signature of the one or more previously issued Value Tokens using a public key of the Mint that issued the previously issued Value Tokens. The public key of the Mint that issued the previously issued Value Token may have an associated expiration state, the processor may be further configured to; conditioned on the original recipient of the previously issued Value Token being unknown and the previously issued Value Token Mint key expiration state being active, issuing the newly issued Value Token; conditioned on the original recipient of the previously issued Value Token being unknown and the previously issued Value Token Mint key expiration state being expired, refusing the request to issue conditioned on the identity of the original recipient of the previously issued Value Token being known and being different than the requester and the previously issued Value Token Mint key expiration state being active, issuing the newly issued Value Token; conditioned on the identity of the original recipient of the previously issued Value Token being known and being different than the requester and the previously issued Value Token Mint key expiration state being expired, refusing the request to issue the newly issued Value Token conditioned on the identity of the original recipient of the previously issued Value Token being known and the identity of the recipient being known and being the same as the original recipient, issuing a newly issued Value Token irrespective of the expiration of the Mint key, the newly issued Value Token including information identifying the recipient.

In the above examples, the apparatus may further include a data repository storing statuses of issued tokens, the data repository in communication with the processor, wherein the processor is further configured to, as part of validating the previously issued Value Token, to check the data repository to confirm the status of the previously issued Value Tokens, and prior to signing the newly issued Value Token, to cause the data repository to be updated to indicate that the previously issued Value Token is no longer a valid token.

In the above examples, the processor may be further configured: to receive and swap both previously issued Value Tokens including digital signatures of the original recipient and previously issued Value Tokens without identification of the original recipient, and to issue a newly issued Value Token without a digital signature of the requester only in response to a request to swap a previously issued Value Token signed by the original recipient of the previously issued Value Token.

In the above apparatus, the previously issued Value Token may optionally include information indicating at least one redemption rule. The apparatus may further include a redemption rule module configured to determine the redemption rule associated with the previously issued Value Token and to cause the processor to swap the previously issued Value Token for the newly issued Value Token only in compliance with the redemption rule.

In the above apparatus, the processor may be configured to only issue a new intrinsic Value Token not identifying the requester when the previously issued Value Token is a coded Value Token where the requester is identified either in the Value Token or in a data repository accessible to the processor.

Another example embodiment of the present invention includes a method of token swap. The method includes receiving at a Mint from a requester, optionally via a network, one or more previously issued Value Tokens, the one or more previously issued Value Tokens each including a shared class and a respective digital signature and denomination; receiving at the Mint a request from the requester to swap the one or more previously issued Value Tokens for newly issued Value Tokens of the same class; validating by the Mint the one or more previously issued Value Tokens; responsive to receiving the request to swap and validating the one or more previously issued Value Tokens, signing by the Mint with a digital signature of the Mint one or more newly issued Value Tokens having the shared class; and sending the signed one or more newly issued Value Tokens, optionally via the network, to the requester.

In the method, the one or more newly issued Value Tokens are intrinsic Value Tokens, and the one or more newly issued Value Tokens are signed and sent conditioned on the one or more previously issued Value Tokens being coded Value Tokens. If the one or more previously issued Value Tokens are coded Value Tokens, the method may further include: as part of the request to swap, receiving an indication as to whether the previously issued Value Tokens should be swapped for coded Value Tokens or intrinsic Value Tokens; signing and sending the newly issued Value Tokens as the type of tokens indicated by the received indication, wherein sending the newly issued Value Tokens as intrinsic Value Tokens is contingent on the previously issued Value Tokens being coded Value Tokens. Conditioned on the previously issued Value Tokens being intrinsic Value Tokens, the method may require the previously issued Value Tokens be swapped only for coded Value Tokens.

In the above method, the Mint may include a processor; a memory in communication with the processor and storing the one or more previously issued Value Tokens when they are received; and a secure memory containing a Mint key. In this case, the one or more newly issued Value Tokens may be signed by the processor using the Mint key.

Optionally, in the above method, total of the respective denominations of the one or more previously issued Value Tokens is the same as the total of the respective denominations of the one or more newly issued Value Tokens. Optionally, the shared class may be one of a sovereign currency, a security, a commodity, or another class of token. Optionally validating the one or more previously issued Value Tokens may include validating the digital signatures of the one or more previously issued Value Tokens. Further, validating the at least one previously issued Value Token, may optionally include checking a data repository to confirm the status of the one or more previously issued Value Tokens; and prior to sending the one or more newly issued Value Tokens, updating the data repository to indicate that the one or more previously issued Value Tokens are no longer valid tokens. Optionally, the data repository includes a double spend record, and confirming the status of the one or more previously issued Value Tokens includes confirming that the one or more previously issued Value Tokens have not previously been swapped. Optionally, the data repository indicates status of the one or more previously issued Value Tokens is tainted, and conditioned on the indication that the one or more previously issued Value Tokens is tainted, the method restricts swaps for such tokens to be for coded Value Tokens. Optionally, when the one or more previously issued Value Tokens are intrinsic Value Tokens, the method may include, as part of validating the one or more previously issued Value Tokens, confirming the identity of requester.

In the above method, optionally, the one or more previously issued Value Tokens includes a digital signature of an original recipient of the one or more previously issued Value Tokens, and validating the one or more previously issued Value Tokens further includes validating the digital signature of the original recipient for reach of the one or more previously issued Value Tokens. If the one or more previously issued Value Tokens are intrinsic Value Tokens having a respective token signature key expiration state; the method optionally includes conditioned on any of the respective token signature key expiration states being expired and the requester being a party other than an original requester who received the Value Token when it was issued, refusing a request to swap the one or more previously issued Value Tokens; conditioned on the token signature key expiration state being expired and the requester being the original requester who received the one or more previously issued Value Tokens when they were issued and the one or more tokens being validated, accepting the request to swap the one or more previously issued Value Tokens; and conditioned on the respective token signature key expiration states of the one or more previously issued Value Tokens all being unexpired and the one or more previously issued Value Tokens being validated, accepting the request to swap the one or more previously issued Value Tokens independent of the identity of the requester.

Optionally, in the above method, the one or more newly issued Value Tokens further include a respective identifier of a redemption mint, different than the mint, where the one or more newly issued Value Tokens should be swapped. When those tokens are received for a subsequent swap as previously issued Value Tokens, conditioned on the Mint not being the redemption mint, the request to swap the one or more previously issued Value Tokens may be rejected.

Optionally, in the above method tokens may further include at least one of: a geographic identifier indicating a geographic area where the Value Token is valid; a jurisdiction identifier indicating a jurisdiction where the Value Token is valid; a not valid before indicator configured to indicate a time before which the Value Token cannot be swapped; a not valid after indicator configured to indicate a time after which the Value Token cannot be swapped or a time after which the Value Token cannot be swapped for an intrinsic Value Token. Alternatively or in addition, the method may include determining a risk profile of the received token, and conditioned on the risk profile being beyond a predetermined threshold, refusing the request to swap the Value Token. Alternatively, the method may further include conditioned on the risk profile being beyond a predetermined threshold and the request to swap the Value Token being from a requester other than the original token recipient, refusing to the request; conditioned on the requester being the original token recipient, accepting the request to swap the Value Token by a requester when the risk profile is beyond the predetermined threshold.

The above method may optionally further include: receiving the one or more newly issued Value Tokens from a payee who has received the one or more newly issued Value Tokens from the requester; receiving a request from the payee to swap the one or more newly issued Value Tokens; responsive to the request from the payee, validating the one or more newly issued Value Tokens; responsive to validating the one or more newly issued Value Tokens, signing by the Mint with a digital signature of the Mint one or more newly issued Value Tokens having the shared class; and sending the signed one or more second newly issued Value Tokens to the payee.

In the above method, optionally, where the one or more newly issued Value Tokens do not identify their original recipient, the method may include in the second newly issued Value Tokens information identifying the payee, preferably a digital signature of the payee.

In the above method, optionally, the request may include the newly issued Value Tokens as part of the request message. These newly issued Value Tokens may include a blind signature of the requester when received by the mint.

Another example embodiment of the present invention may include a method of receiving a payment. The method includes: receiving by the payee an intrinsic Value Token from the payer, the intrinsic Value Token including a class, a denomination, and a Mint digital signature; sending from the payee the intrinsic Value Token and a request to swap the intrinsic Value Token to a Mint associated with the intrinsic Value Token; and receiving by the payee, in response to the request, a new coded Value Token, the new coded Value Token having the same class and denomination as the intrinsic Value Token and being signed by the Mint associated with the intrinsic Value Token, the new coded Value Token including information identifying the payee. Optionally, the payer may be a device or a software agent. The payee may also, optionally be a device or a software agent. Optionally, the Mint associated with the intrinsic Value Token is the Mint that issued the intrinsic Value Token with the mint's digital signature. Optionally, the Mint associated with the Value Token is a Mint other than the Mint that issued the intrinsic Value Token, where the Mint is associated with the Value Token by being identified in redemption information associated with the intrinsic Value Token.

Optionally, the above method may further include, prior to the sending, storing the intrinsic Value Token in a digital wallet of the payee. The method may also include after the receiving, storing the coded Value Token in a digital wallet of the payer. Optionally, after the receiving the new coded Value Token may be signed with a digital signature of the payee, after receiving.

In one alternative, the payee may receive in response to the request an indication that the intrinsic Value Token cannot be swapped. The indication may further indicate the Value Token cannot swapped because a redemption rule indicated by information in the Value Token has not been satisfied. The method may further include resubmitting the Value Token for redemption after the condition has been satisfied, and receiving the new coded Value Token in response.

In the above method, optionally the intrinsic Value Token may be received from the digital wallet of a payer via a network.

In the above method, optionally, if the payee receives a coded Value Token, the method may further include sending by the payee the new coded Value Token to a Mint with a request to swap the new coded Value Token; receiving in response to the request to swap the new coded Value Token a new intrinsic Value Token.

Another example embodiment of the present invention is a method for exchanging tokens of two different classes. The method may include receiving a request from a first user to exchange first tokens in a first class for tokens in a second class; receiving the first tokens from the first user; receiving a request from a second user to exchange second tokens in the second class for tokens in the first class; receiving the second tokens from the second user; making an escrow request for the first tokens to a first Mint designated for swapping of the first tokens; making an escrow request for the second tokens to a second Mint designated for swapping of the second tokens; receiving a confirmation of escrow for the first tokens; receiving a confirmation of escrow for the second tokens; sending the first tokens to the first Mint and receiving third tokens having the same class and total value in exchange; sending the second tokens to the second Mint receiving fourth tokens having the same class and total value in exchange; sending the third tokens to the second user; and sending the fourth tokens to the first user.

Optionally, the method of exchange may further include marking the status of the first tokens as escrowed in a token validity repository readable by the first Mint in response to the escrow request for the first tokens; and marking the status of the second tokens as escrowed in a token validity repository readable by the second Mint in response to the escrow request for the second tokens. Optionally, the method may also include receiving, responsive to the escrow request for the second Value Tokens, a failure message, indicating the Value Tokens have not been escrowed and/or are not available for exchange; and responsive to receiving the failure message, requesting a release of the escrow for the first tokens. The method may further include sending a message to the first user indicating that the Exchange request has not been fulfilled.

In another example embodiment, for any of the above-described example methods, an article of manufacture may provided. The article may include a computer readable device have recorded there on instructions which are configured to, when executed by a processor, to cause the execution of the respective method. Another example embodiment of the present invention may include a system for managing the issuance of tokens. The system may include at least one processor; at least one memory in communication with the processor; a token verification module stored in the memory configured to be executed by the processor, the Value Token verification module configured to verify that tokens presented for swap should be redeemed for newly issued Value Tokens; a token certification module stored in the memory and configured to certify newly issued tokens; a token issue module configured to issue newly issued Value Tokens in response to a swap request, the token issue module configured to issue intrinsic Value Tokens only in response to request to swap coded Value Tokens. Optionally, the token verification module may include an intrinsic Value Token verification module configured to confirm the Value Token has not been previously exchanged by accessing a double spend repository. Optionally, the token verification module may include a coded Value Token verification module configured to validate a token by checking a repository of information on valid tokens. Optionally, token certification module may include an intrinsic Value Token certification module configured to receive a blinded token and to sign the blinded token with a private token signature key of the mint. Optionally, the token certification module may further include a coded Value Token certification module configured to record information in a data repository indicating the newly issued token is a valid token.

The above system may also optionally include an escrow module configured to receive a request to escrow a token; send a response indicating the Value Token is in escrow; store an indication in a data repository that the Value Token is in escrow; terminate the escrow when a request to swap the Value Token is received from the escrow requester; wherein while the Value Token is in escrow, the token verification module is configured to reject requests to swap the Value Token for a newly issued Value Token from a source other than the escrow requester.

Optionally the system may also further include a double spending repository stored in the memory and containing information indicating tokens for which the Mint has issued a newly issued Value Token in exchange. The system may also further include a safe mode module, configured to, upon receipt of a safe mode instruction from a Mint operator, to cause the token verification module to prevent any anonymous token exchanges. [One further example embodiment of the present invention includes a secure transaction controller which includes a processor, a memory in communication with the processor, an exchange request module, an exchange matching module, and an exchange execution module. The exchange request module is stored in the memory and executed by the processor to receive a first request from a first client to exchange a first set of Value Tokens of a first respective class redeemable by a first Mint for Value tokens of a second respective class redeemable by a second Mint. Responsive to the first request, the exchange request module provides an indication to an escrow controller in communication with the first Mint that the first set of Value Tokens should be placed in escrow. Responsive to providing the indication, the exchange request module receives an acknowledgement confirming that the first set of Value Tokens is valid and has been placed in escrow. Additionally, the exchange request module receives a second request from a second client to exchange a second set of Value Tokens of the second respective class for Value Tokens of the first respective class. Responsive to the second request, the exchange request module provides a second indication to an escrow controller in communication with the second Mint that the second set of Value Tokens should be placed in escrow. The exchange request module also receives, responsive to providing the second indication, an acknowledgement confirming that the second set of Value Tokens is valid and has been placed in escrow. The exchange matching module is stored in the memory and executed by the processor to determine there is a match between the first request and the second request. The exchange execution module is stored in the memory. Additionally, the exchange execution module is executed by the processor to, responsive to the exchange matching module determining there is a match between the first request and the second request, and conditioned on the acknowledgements from the first and second Mints having been received, send an instruction to the first Mint to swap the first set of tokens for a first set of new coded Value Tokens and a second instruction to the second Mint to swap the second set of Value tokens for a second set of new coded Value Tokens.

In the above secure transaction controller example, the exchange execution module may be further executed by the processor to receive the first set of new coded Value Tokens from the first Mint encoded to indicate the identity of the second client as recipient and deliver the first set of new coded Value Tokens to the second client, and receive the second set of new coded tokens from the second Mint encoded to confirm the identity of the first client as recipient and deliver the second set of new coded Value Tokens to the first client.

Optionally, in the above secure transaction controller examples, the exchange execution module is further executed by the processor to send a first escrow finalization message to the first client, the escrow finalization message allowing the first client to retrieve the second set of new coded Value Tokens from the second Mint.

In the above secure transaction controller examples, the first request may include an express enumerated value in the second class, and the processor executing the exchange matching module may match the first and second requests conditioned on a total express enumerated value of the second set of Value Tokens meeting or exceeding the express enumerated value included in the first request. Additionally, the first request may indicate a market order, and the processor executing the exchange matching module may match the first request with the a second request chosen from a set of requests to exchange Value Tokens of the second class for Value Tokens of the first class. The second request may have the highest total express enumerated value of the set of requests.

Optionally, in the above secure transaction controller examples, the system further includes a ruleset stored in the memory. The processor executing the exchange matching module may use the ruleset to match the first set and the second set of Value Tokens.

In the above secure transaction controller examples, the first set of tokens may further include a token of a third class that is different than the first class. Additionally, the second set of tokens may further include a token of a third class that is different than the second class.

In the above secure transaction controller examples, the indication may further include a complex exchange transaction id. Additionally, the instruction to the first Mint and the instruction to the second Mint may include the complex exchange transaction id.

In the above secure transaction controller examples, the indication may further include an expiry time. Optionally, the processor executing the exchange matching module may determine the matching based, at least in part, on information sets associated with the tokens but not included in such requests.

Another example embodiment of the present invention may include a method of providing a secure token exchange transaction. The method includes receiving a first request from a first client to exchange a first set of Value Tokens of a first respective class redeemable by a first Mint for Value tokens of a second respective class redeemable by a second Mint. Responsive to receiving the first request, the method provides an indication to the first Mint that the first set of Value Tokens should be placed in escrow. Responsive to providing the indication, the method receives an acknowledgement confirming that the first set of Value Tokens is valid and has been placed in escrow. Additionally, the method receives a second request from a second client to exchange a second set of Value Tokens of the second respective class for Value Tokens of the first respective class. Responsive to receiving the second request, the method provides a second indication to the second Mint that the second set of Value Tokens should be placed in escrow. Responsive to providing the second indication, the method receives an acknowledgement confirming that the second set of Value Tokens is valid and has been placed in escrow. Additionally, the method determines there is a match between the first request and the second request. Responsive to determining there is a match between the first request and the second request, and conditioned on the acknowledgements from the first and second Mints having been received, the method sends an instruction to the first Mint to swap the first set of tokens for a first set of new coded Value Tokens and a second instruction to the second Mint to swap the second set of Value tokens for a second set of new coded Value Tokens.

Optionally, the method may further include receiving the first set of new coded Value Tokens from the first Mint encoded to indicate the identity of the second client as recipient and deliver the first set of new coded Value Tokens to the second client, and receiving the second set of new coded tokens from the second Mint encoded to confirm the identity of the first client as recipient and deliver the second set of new coded Value Tokens to the first client.

The above method may further include sending a first escrow finalization message to the first client, the escrow finalization message allowing the first client to retrieve the second set of new coded Value Tokens from the second Mint.

In the above method, optionally, the first request may include a value in the second class, the matching of the first and second requests is conditioned on a value of the second set of Value Tokens meeting or exceeding the value included in the first request.

Optionally, in the above method, the first request may indicate a market order. Additionally, the first request may be matched with the a second request chosen from a set of requests to exchange Value Tokens of the second class for Value Tokens of the first class, the second request having the highest total value of the set of requests.

The above method may optionally further include matching the first set and the second set of Value Tokens using a predetermined ruleset.

In the above method, the first set of tokens may further include a token of a third class that is different than the first class. Additionally, the second set of tokens may further include a token of a third class that is different than the second class.

In the above method, the indication may further include a complex exchange transaction id. Additionally, the instruction to the first Mint and the instruction to the second Mint may include the complex exchange transaction id.

In the above method, the indication may further include an expiry time. Optionally, determining there is a match may be based, at least in part, on information sets associated with the tokens, where the information sets are not included in such requests.

BRIEF DESCRIPTION OF THE DRAWINGS

FIG. 9 illustrates an example token data repository, according to an example embodiment of the present invention.

FIG. 10 illustrates an example coded Value Token data structure, according to an example embodiment of the present invention.

DETAILED DESCRIPTION OF EXAMPLE EMBODIMENTS

Figure 1:
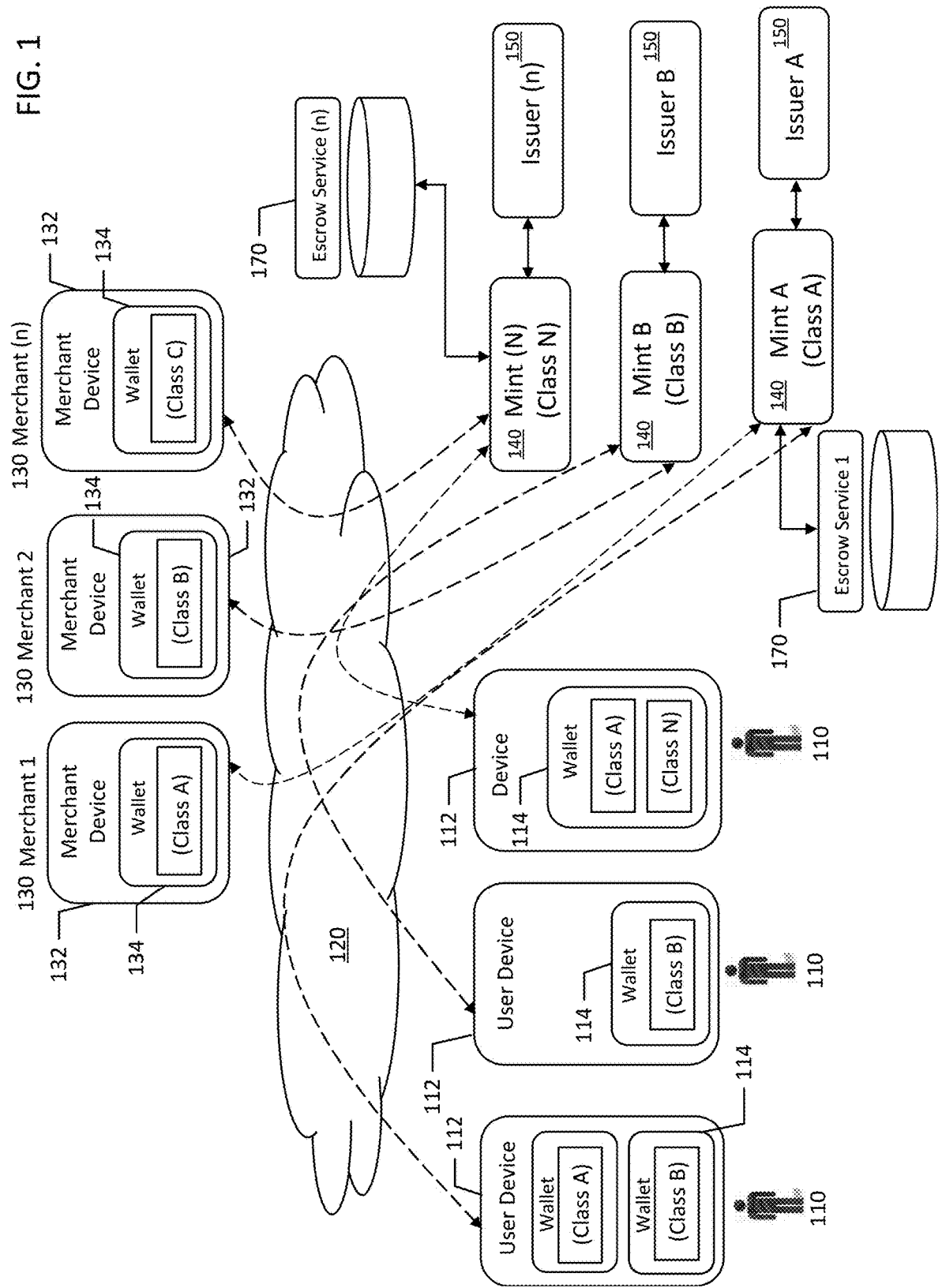
FIG. 1 illustrates an example payment ecosystem, according to an example embodiment of the present invention.

This disclosure describes several example embodiments of apparatus and methods that may be used to provide a payment and exchange infrastructure in open networks, based on the concept of Value Tokens. Value Tokens are cryptographically signed messages, representing underlying value. Value Tokens may be created and circulated, purely in digital form. Value Tokens may include a limited set of data (or a computer file), representing the underlying value.

The "Issuer" is the party (which could be a computer system, process, intelligent agent, or the like, in turn representing an organization or person) that authorized the issue of the Value Token. The represented value of a Value Token may be in a sovereign currency. The Value Token could also represent other things of value, such as financial securities, commodities, promotional points, and/or the like, other types of bearer instruments, or even other Value Tokens. In some cases, the Issuer may have an obligation to accept the Value Token in exchange for the specified represented value. Significant operational advantages may be obtained from using the example embodiments described herein over existing payment infrastructure approaches (which are largely based on ledgers/accounts), including improved interoperability, reduced cost, better scalability, and improved security. For convenience these may be referred to as electronic value transfer, e.g. cash transfer, payments, etc., but the systems and methods to control their issuing and circulation may be independent of exactly what the Value Tokens represent.

Using digital communications for an electronic value transfer using a Value Token, need not, at the time of transmission, correspond to any action on an account (or other ledger based system). Instead, Value Tokens themselves may provide support for those interactions that are familiar to a user previously undertaken with physical cash or share certificates in share trading, without the physical limitations. For example, at some point there may be a 'withdrawal' where Value Tokens are obtained in return for an account transaction, and at a subsequent time there may be one or more transactions where some or all of such Value Tokens are sent from one user (payer) to another (payee), and at some further point there may be a 'deposit'/redemption where the payee may provide Value Tokens in return for an account entry.

A Value Token may include information associated with the value specified by the issuer for the Value Token, such as a unique identifier e.g., a string or serial number.

Alternatively, instead of just issuing a Value Token as an identification string (serial number), the Value Token can be cryptographically signed by the Issuer. This allows local verification, by any user in the system. Such local verification confirms that the verified Value Token has indeed been issued by a given Issuer. Furthermore, the Issuer can add additional conditions or information to such a Value Token.

These additional conditions or information can then also be locally verified as having been added by the Issuer. Such additional information may include, for example, the amount or denomination of a Value Token, or an expiry date. It will be appreciated, that in this scenario, the contents of the Value Token, and authenticity of its Issuer, can be verified locally contingent on appropriate information sets for such authentication being available. Unless the digital signature is compromised, signed information cannot be modified by a party other than the Issuer. A verification check by the Issuer is now needed only to prevent so called 'double spending' of a Value Token, that is the copying of the Value Token in an attempt to spend it more than once.

In some examples described in the present disclosure, Value Tokens and the systems and procedures configured to handle them may also have several further features that facilitate the provision of capabilities that meet the demands of users, the capabilities of their devices and the obligations of the regulating authorities (including Anti Money Laundering-AML). These features may include:

- Provision to an end user a level of privacy and/or anonymity available in Blind Signature based electronic cash systems while at the same time, at a system level:
- Resolve the scalability bottleneck of parallelising the double spending check, operationally, and provide the ability to scale linearly with no upper limitation;
- Provide capabilities for system monitoring and controls required for operational and regulatory monitoring and reporting.
- Provide a capability to change Issuer signature keys, at any time, with little or no impact on an end user.
- Reduce the risk of loss in the event of an accidental or malicious Issuer key disclosure, possibly to the point of being practically zero.
- Resolve key issues in interoperability of Value Tokens issued by different Issuers.
- Improve system security against attacks by 'insiders' as well as 'outsiders'.
- Provide for a Value Token trading facility with greatly reduced systemic exchange risk.

In some of the examples described in the present disclosure, systems and methods are provided that employ a messaging protocol with different, alternating properties in the Value Token creation, swap, and exchange components of transactions between users and between users and Issuers. This alternating property messaging protocol is structured, in part, to help solve the problems of rapid key dissemination and distributed attack that is specifically present when digital Value Tokens are employed on the Internet on a large scale, as well as solving the technical problem of providing greatly improved scalability in digital Value Token redemption.

For example, in the example systems and methods described herein, only every other circulation of a Value Token is permitted to be anonymous (blinded). That is, an anonymous Value Token is never swapped to the Issuer for another anonymous Value Token, but instead only for a Value Token that is traceable and that may contain one or more sets of redemption conditions.

Because a user may swap their Value Tokens with the Issuer at any time, material impact on users is effectively avoided, by making the swap of the 'non-anonymous Value Tokens' for 'new, anonymous Value Tokens', a transparent or automated procedure. Despite the automation of this procedure, its usage may allow achievement of the technical system properties above, such as auditability and scalability, which have previously been either much more difficult, or not possible to achieve, in electronic cash system implementations.

Example System Overview

In the present disclosure, a system component that issues Value Tokens as electronically signed message is referred to as a Mint. In the example embodiments described in the present disclosure, these Value Tokens may be created in at least two types: an Intrinsic value token means that the denomination (and, optionally other parameters) of the Value Token is fixed by the specific digital signature key used for this specific denomination. Optionally other parameters of such Value Token could also be associated with the digital signature key in the intrinsic Value Token. A Coded Value Token is a Value Token where the denomination is associated with the Value Token itself, rather than the digital signature, either as part of the Value Token payload or bound to the Value Token and stored elsewhere.

Value Tokens of a particular "class" all represent the same type of value, e.g., the same sovereign currency, financial instrument, commodity, goods and/or service and/or the like. Optionally, class may also be restricted to include the Mint that issued the Value Tokens, so that only tokens issued by the same Mint are considered to be the same class. This disclosure reserves the term "sovereign currency" to refer to currencies issued by sovereign nations that are commonly used as legal tender. Value Tokens representing a particular sovereign currency would be of a different class than Value Tokens representing a different sovereign currency.

In some example embodiments described in the present disclosure, Intrinsic Value Tokens may be used to implement Value Token transfers with optional anonymity, for example, by using Chaum blind signature protocols.

In some example embodiments described in the present disclosure, Coded Value Tokens may be used to implement value token transfers where the Mint maintains a full audit trail of payer and payee for the transaction. Such an audit trail may be cryptographically protected, e.g., so that only the Mint that created the audit trail has certain access rights to the audit trail. For example, once written, each audit trail entry might only be read by a Mint that created such a record.

Coded Value Tokens can optionally have other additional properties encoded, for example validity timestamps, payer and/or payee details, information sets, transaction references and/or information sets (for example invoice details), geographic information sets (such as for example location information), device information sets (for example smartphone ID sets, computing device IP and/or MAC addresses) and the like.

In some example embodiments described in the present disclosure, payment messages may include a message containing one or more Value Tokens. Optionally, the payment message may be encoded to a particular Payee; only the payee may present such an encoded message to the relevant Mint to redeem or swap the Value Token. Tokens may be enclosed in or with the Payment Message. Optionally, the Value Tokens themselves may include information preventing them from being redeemed or swapped by someone other than the designated Payee. We use the term "swap" to refer to presenting a Value Token, e.g., to a Mint, and receiving a Value Token, e.g., a newly issued Value Token that is issued in response to the request to swap, in response to the request. In a swap the previously issued or "old" Value Token may be rendered "used" or invalid, and the new Value Token may preferably be of the same class and denomination as the originally presented Value Tokens. It will be appreciated that, because the Value Token is simply information, merely providing the Value Token in the swap does not prevent the party presenting the Value Token from maintaining possession of a copy, accordingly, the swap relies on the Mint causing the previously issued Value Token to be considered invalid, e.g., by updating records in a way that others can determine that the Value Token has already been redeemed.

For the purpose of clarity in this disclosure we reserve the word "exchange" in reference to the process of Value Tokens issued by one Mint, being exchanged for Value Tokens issued by a different Mint (that is, the exchange of Value Tokens of different classes, for example an exchange of Value Tokens representing particular shares, for Value Tokens representing a sovereign currency). We use the term "swap", when Value Tokens of the same Class and total denomination are swapped by a single Mint. In some embodiments there may be, for example, appliances or other devices that incorporate multiple Mint instances each of which issues its own particular respective class of Value Tokens.

In some example embodiments described in the present disclosure, a Mint may be configured to issue Value Tokens that are representative of an obligation of a single Issuer to accept these Value Tokens in exchange for something else, e.g., goods, commodities, sovereign currency, financial assets of some kind, or other value representations. The total amount of the value which is represented by a particular Value Token is specified by the denomination of the Value Token.

In some example embodiments described in the present disclosure, there may be multiple types of Mints, each with a pre-determined set of functionalities that determine, in whole or in part, the operations of the Mint in respect to the Value Tokens that such Mint is responsible for. Mints that create Value Tokens may be persistently associated with those Value Tokens, such that only such an issuing Mint is capable of transacting, in line with the Mint pre-determined functionalities, those Value Tokens.

The Mint, and entities communicating to the mint, may use multiple layers of encryption in the circulation, swapping, and exchange of Value Tokens. Beyond the encryption described elsewhere herein facilitating digital signatures by the Mint, and facilitating the basic Value Token creation, swapping, and exchange protocols, some additional encryption layers, described below, may be employed for Value Token transfer messages which are encrypted to a particular recipient (Payment Messages).

In some example embodiments, when Value Tokens are sent from one party to another, those Value Tokens may be encrypted together with (or have included in the Value Token) a unique identifier of the recipient, to represent that such Value Tokens are intended for the specified recipient only. In this case, the Mint will only accept these Value Tokens from the specified recipient, and no other party. This effectively protects the transfer of Value Tokens against eavesdroppers who may be able to intercept a Value Token transfer message on an insecure communications channel. It is noted that one of the parties referred to above, may be the Mint, e.g., a party requesting a swap of tokens from a Mint may encrypt the swap message in a manner tying the message only to the Mint, as the intended recipient, and the Mint may similarly issue tokens to be tied to the particular swap recipient.

A Payment Message may contain one or more Value Tokens (intrinsic or coded), as well as optional additional information, and may be encrypted into a single message for transfer between participants. In some example embodiments, further message encryption may, be used on one or more messages between parties in the system, which may be protected using another layer of encryption. Entire messages may be encrypted for transit, and cryptographic certificates may be used to unambiguously identify individual participants.

In some example embodiments a registration service may operate that authorizes each Mint instance. The authorization may be accomplished through the issuance and binding of one or more cryptographic certificate sets. For example, such a registration service, which may in some example embodiments be distributed and/or replicated, may use PKI for such certificate sets. Certificate issuance may be on a time limited basis, such that each Mint instance is only certified for one or more specific time periods, for example $_1$ hour/day/week/month and/or for a specific period, such as Monday through Friday, or 9 am to 5 pm (or other convenient business hours), such that Mint operations involving Value Tokens may only be undertaken in these periods. For example, in some example embodiments, time limitations may be implemented using coded value tokens. Further limitations may be implemented by specific currencies, which may have for example age, time or use limitations. For example, a user may have to their age validated.

In some example embodiments several types of Mints may be instantiated as system elements. In some example embodiments, a Mint may be a separate device (including for example a combination of software, firmware and hardware) and that creates, issues and manages (including receiving and issuing) one or more sets of Value Tokens, according to a predetermined set of functionalities. A Mint issues such created Value Tokens as specific electronic messages, signed with a digital signature based on a secret cryptographic key, such as those of a public key based digital signature system.

In some example embodiments, a Mint device may be configured to swap a set of Value Tokens that is received by the Mint in a single atomic transaction. For example, when a set of Value Tokens is received by a Mint, the Mint can, verify the validity of all the Value Tokens, in this process invalidating such received Value Tokens and consequently issue a new set of Value Tokens, having the same total denominations of the same class as those received.

Such an approach creates an example embodiment of the system that facilitates the issuing of electronic value, and its transfer, both in a semi-anonymous (for example Chaum level anonymity), and in a traceable/auditable manner. This capability for a Mint to issue Value Tokens of different characteristics supports both anonymized and traceable transactions with differing associated rule sets applied to a set of Value Tokens at the time of issuance (for example a unique secure secret between Mint and Value Token recipient) and/or at the time of swap or exchange.

In some example embodiments a Mint will at different times, use different secret keys to sign Value Tokens issued by that Mint. These keys that a Mint may evaluate, may include two types of keys, 'active keys' and 'expired keys'. Active keys are those keys that are used by a Mint to create new Value Tokens. An expired key is one that was previously an Active key but that is now no longer used to issue Value Tokens.

In some example embodiments, conditions associated with such expired keys, e.g. time periods, risk levels, etc., are consistent with one or more rule sets that the Mint holds or may access for such keys. The rule sets may be time based, for example where the Mint is embodied as a hardware component in a device having access to and/or control of a secure clock and such rules distinguishing between active (where the time periods are in compliance with the rules or expired, where the time periods are not in compliance). Alternatively, Mints may be based in one or more secure cloud services. Mints may have further rules, for example those associated with an Issuer, such as a Financial Institution, certificate authority, share issuer, bank, public or private company, venture capital provider, credit provider (including credit card company and/or card issuer), issuer of loyalty points, store or merchant and/or any other provider of value individual, group or any other entity and/or other system element associated with them.

When Value Tokens are presented to a Mint for swap and/or exchange, the Mint may evaluate the keys of such Value Tokens. Depending on the Value Tokens' signature key state, which might include active or expired, and comparison with one or more rule sets held by the Mint, the following operations might be undertaken by the Mint:

In the receipt of Value Tokens signed with active keys, the Mint will invalidate such tokens and issue new Value Tokens (of the same total denomination and class), signed with an active key In the receipt of Value Tokens signed with expired keys, the Mint may, as part of the evaluation and validation process, require the sender to provide cryptographic proof of having themselves been the prior direct recipient of such Value Tokens from the Mint. As disclosed herein this may include payment message encryption and the like. Only if this proof is provided, will the Mint invalidate the Value Tokens and issue a new set of Value Tokens, of the same class and total denominations, signed with an active key This approach supports a system where keys may be dynamically invalidated and changed with no significant user impact, because 'old' (expired or otherwise unwanted) tokens, either with active or expired keys, can be changed for new ones, at no security risk to the Mint.

In some example embodiments, a Mint may issue Value Tokens having alternating characteristics. For example, a Mint may be limited to swap Intrinsic Value Tokens, only in return for Coded Value Tokens.

For example, given a set of intrinsic Value Tokens sent to the Mint, the Mint can verify the validity of the Value Tokens, in this process invalidating such Value Tokens and consequently issue a new set of Coded Value Tokens, to the same total denominations of the same Class as the Value Tokens it has received Given a set of Coded Value Tokens sent to the Mint, the Mint can verify the validity of such Value Tokens, in this process invalidating such Value Tokens, and consequently issue a new set of Coded Value Tokens, to the same total denominations of the same class as it has received An advantage of this approach is that this provides a system embodiment with sets of 'alternating token properties', where semi-anonymous tokens can only ever be used for one step in a chain of transactions, as at least every other transaction is fully identified.

This supports effective AML and other checks in a payment system that does allow and support individual anonymous/untraceable transactions for the payer.

In some example embodiments a Mint issuing Value Tokens may include one or more sets of additional conditions, where such conditions may have been set by the Mint operator, the Issuer associated with the Mint, or other parties controlling the operation of the Mint or Issuer.

In some example embodiments a Mint can, when issuing Coded Value Tokens, encode in such tokens additional information, markers, and/or redemption rules and/or the like. For example, a Coded Value Token may include a rule 'not for swap or exchange before date/time'.

Given a set of Coded Value Tokens sent to the Mint, the Mint can check Value Tokens for compliance with encoded redemption rule information, and only in case of compliance proceed to verify the validity of the Value Tokens, in this process invalidating such Value Tokens and consequently issue a new set of Intrinsic Value Tokens or Coded Value Tokens, to the same total denominations of the same Class as it has received This approach supports the capability of the system to have a network of Mints (and associated Issuers) in any arrangement, where each Mint in the system has certain Value Token handling capabilities which are described herein. In some example embodiments, Mints may retain a record of Value Tokens that have been swapped or exchanged (spent). This may be referred to as a Double Spending Repository. It will be appreciated that a double spending record may, may, but need not, be structured as a list, as such; rather any convenient data structure or storage mechanism may be employed, e.g., any relational or non-relational database structure that facilitates high volume large scale secure transaction processing. Also, the Double Spending Repository may also include additional information regarding tokens that are invalid or tainted for other reasons, besides having been previously swapped or exchanged. For example, if for some reason a Mint key may be at risk of having been compromised, the compromised Mint key may be marked as expired. Further swaps of such tokens may not be allowed to occur anonymously, allowing audit trails to be maintained.

The Mint may also retain a record of all Value Tokens that it has signed, whether or not they were signed using the Blind Signature mechanism. It will be appreciated that valid tokens and redeemed or otherwise invalid or tainted tokens may be identified in the same records in a single repository or in separate records in a single repository, or in separate repositories.

Mint Operation

In some example embodiments, particular Mints may be limited to two operations, Value Token initialisation and Value Token swap. This limitation for the Mint to these operations is well suited to instantiation of Mints as devices and/or device elements where such devices and/or device element may receive messages across multiple message protocols and only on receiving a legitimate message (that is a Value Token) that was initialised (e.g., created and issued) by that Mint will the Mint respond with an operation. (In at least one alternative embodiment, Mints may issue tokens configured to be redeemed by a particular Mint or Mints other than the issuing Mint.) It may be advantageous to have other messages received by the Mint but not complying simply be ignored, so that the attack surface of the Mint is minimized to only valid (to that Mint) instance messages.

Initialisation.

This action creates Value Tokens to a given total of denominations, and encodes them to one particular party which is, or acts on behalf of, the Issuer.

An Issuer may be any party that is able to instantiate a Mint, where such party instructs the Mint to create tokens of, and to the specified values. However, the underwriting of such Value Tokens may, in some cases, be constrained by assets provided by or assigned by an Issuer in support of such Value Tokens. For example, an Issuer may create a Mint, however unless the Value Tokens created by the Mint have a recognized interchange capability, based on interoperable values the Issuer is offering in return for the Value Tokens, their utility for exchange with other users may be extremely limited.

In some example embodiments, an Issuer operating a Mint may offer Value Tokens that are constrained to a specific domain, such as for example, reward points, school or college (or other organization specific) values and/or the like.

A Double Spending Repository may be limited to records involving one particular Mint Signature Key. A Mint Signature Key may be limited to one particular Class of tokens, and/or one particular Class/Denomination pair. A Mint Signature Key can be considered "Active" or "Expired".

In some example embodiments, Mints may be implemented in hardware and may incorporate one or more hardware based secure stores. Mints may be implemented using secure capabilities of, for example Intel SGX, ARM Trustzone and/or other hardware processor based secure environments.

Multiple Security Levels and Key Expiry and Different Security Levels for Distinct Token Swap Messages.

In some example embodiments, a system approach to security may be based on the nature of Value Tokens as electronic messages, because Value Tokens are single use instruments, they can securely be swapped by the Mint only once. The Value Tokens are invalidated in the process of being swapped by being added to the Double Spending Record.

Value Token Swap Message.

This is the swap of Value Tokens of total denominations of (X) in a class, for new Value Tokens of equal total denominations (X) in the same class.

In some example embodiments, a Mint has a restricted set of Value Token Swap operations that may be undertaken. These restricted operations provide an inherent security through reduced attack surface and limited utility of these operations. In some example embodiments these operations can be differentiated and categorised in the following way:

Token Swap Message Type 1:

A Payer is unknown through the use of Blind Signatures. A message where a Payee has obtained Value Tokens, and wants to swap for a new set of Value Tokens known to the Payer only is passed to the Mint, which will only respond within these parameters.

Token Swap Message Type 2:

A Payer is known and identified. A message where the Payee has obtained Value Tokens from a Payer under full audit trail (e.g. not using Blind Signatures) such that the identity of the Payer is disclosed and where appropriate can be authenticated as such, and the Payer wants to swap the Value Tokens in the message for new Value Tokens. (For example this could include a message where the Issuer itself acts as Payer).

Token Swap Message Type 3:

A Payer is identified and is the same as Payee—This constitutes a Swap by one individual sending one set of Value Tokens, and requesting a new set of equal total denominations.

From a security perspective, Message Type 1 is the highest risk as the audit trail available to the Mint is the lowest, Message Type 3 is the lowest risk because the audit trail available to the Mint is complete. This distinction of Token Swap message types and risk levels can then be used to implement the concept of Mint Key validity, expiry, swap, and exchange.

It is noted that the valid Mint signature keys are the most sensitive component of the overall system, because they allow the creation of new Value Tokens. The time during which a Mint Key is valid, is also the time an attacker has to attempt to break the key, and thus threaten the system by enabling themselves to create Value Tokens that the Mint would not be able to distinguish from Value Tokens legitimately issued by the Mint, during a Token Swap Message of types 1 or 2.

Mint keys may be time limited in validity, where such limitation may depend on, for example the context of their use, for example in situations deemed to be high risk, by for example the Mint operator or Issuer, the time period may be set as short.

A further security feature, in our system is that expiry times (and/or timestamps) for Mint keys may be based on arbitrary periods, (which in some example embodiments may be generated through use of, for example a random number generator, where for example such generation may have further policies limiting the time periods involved, for example to exclude very short or very long times whilst ensuring such time periods remain arbitrary). Mint Keys may be expired 'on demand' by the Mint operator.

The approach described above makes the time window for any potential attacker unpredictable, as well as allowing for immediate remedial action (Mint key expiry) in the event of a higher perceived threat level.

Using the different categories of swap messages defined above, a system where 'key expiry' has minimal direct user impact may be provided. For example, in some example embodiments, Mint Key expiry does not mean that Value Tokens signed with an expired key are no longer accepted, but instead limits the category of swap messages that they a Mint will accept such Tokens for. Value Tokens issued under an expired Mint Key may now only be swapped using Token Swap Messages of Type 3. Type 3 messages also require the Payer/Payee to provide proof of withdrawal (for example the relevant blinded tokens and blinding factors and/or other Mint recognized indicia). This means that a full audit trail of Value Token creation must exist in order for these Value Tokens to be swapped for new Value Tokens by the Mint. As a result, Value Tokens issued by an attacker after breaking the Mint key will be identified and not swapped.

The resulting feature from a user's perspective is, that Value Tokens never expire in the value they represent, what expires in the event of a Mint Key expiry is solely the ability to use such Value Tokens for third party transactions. A simple swap for new, current (and transactable) Value Tokens remedies any user impact, and this swap can even be achieved automatically without the need for user initiation.

The resulting feature from a system operator's perspective is, that system security is enhanced, because the risk from a compromised Mint key is limited to any exposure at the time of raised suspicion or detection. After that, an ad-hoc key expiry action fully protects the Mint operator from any further exposure.

In some example embodiments, an extension to this approach is a Mint 'Safe Mode'. In Safe Mode, only Token Swap Messages of Type 2 and Type 3 are permitted (meaning blinded, anonymous transactions are no longer permitted) as Mint operations. Such a Mint Safe Mode is an operational remedy for potential major disruptions, for example if the employed public key encryption mechanism itself was broken and no longer cryptographically safe. In this case, Safe Mode allows for continuation of systems operation (albeit limited through non-anonymity), until the system can be upgraded to operate with alternative public key cryptography.

Alternating Value Token Properties

In some example embodiments, one difference between Intrinsic Value Tokens, and Coded Value Tokens, is that only the former type is issued using Blind Signatures in support of anonymous transfers. Coded Value Tokens are always issued for transfer with an audit trail, as well as having the option to carry additional information sets, such as Token attributes described herein.

In some example embodiments, in Token Swap Message 1, Intrinsic Value Tokens are only swapped for Coded Value Tokens.

Token Swap Messages 2 or 3 allow Coded Value Tokens (obtained with full audit trail or under a Token Swap Message 1), to be swapped for either Intrinsic or Coded Value Tokens. Accordingly, after every anonymous transaction under a Token Swap Message 1, there is always at least one non-anonymous transaction under Messages 2 or 3.

Such an approach supports enforcement of policies, rules, conditions and/or the like, associated with, including attached to circulation of value in the system. This cannot be implemented in Chaum based anonymous protocols (Message Type 1) system only. Such an approach supports AML and other similar regulatory obligations, while retaining payer privacy comparable to a Chaum based system.

Token Re-Circulation Limits

As described herein, Value Tokens may have an expiry date/time associated with them, and/or may have a 'not valid before' timestamp associated with them. Such timestamps may be associated in any combination.

In some example embodiments, such an optional 'not valid before' timestamp for Value Tokens, may be included in order to implement 'speed limits' on circulation and re-circulation of value in the system.

Fast re-circulation of Value Tokens inherently poses higher risks to a system, particularly in the Internet environment or other applications where there are an extremely large number of distributed users. Fraud risk is increased even in transactions with full audit trail, if it is possible to achieve several re-circulation transactions to different parties within a short period of time. Some monetary policy considerations also rely on limited re-circulation speeds of monetary value as fast re-circulation is seen to carry potential for de-facto inflation.

In some example embodiments, the provision of 'not valid before' timestamps on individual Value Tokens (and/or sets thereof) supports the introduction and management of re-circulation limits, including to the level of individual participants, for example, users, or wallet owners, as well as speed controls to the level of individual transactions, and/or individual Value Tokens. This supports one or more categorisation schemas for individual users, and/or individual transactions and/or transaction types, and application of different re-circulation limits depending on such characteristics and/or system conditions.

For example, users satisfying one or more higher identification and/or trust requirements may be permitted faster re-circulation of value. Users and/or transaction sets identified as higher risk, for example through profiling of transaction data, may trigger extended re-circulation limits.

Generally, these sort of rules are potentially more difficult to implement in a ledger based system.

Extensions to Double Spending Record

In previous Value Token based systems (for example DigiCash, eCash), the purpose of a Double Spending list was to identify which Value Tokens have been swapped, and are hence invalidated as 'spent'. A Value Token is either not on this record, or it is, in which case its status is considered 'spent'.

In contrast operation of the Double Spending Record described in the present disclosure may have an extended purpose, by introducing other potential status parameters for Value Tokens beyond binary 'spent'/'not spent'.

In some example embodiments, a Value Token may be considered to be 'suspect', or 'tainted', if it has been involved in a transaction that failed. For example, if a payment message contains a mixture of Value Tokens that appear valid (not spent), and some that appear spent, then the whole transaction can be rejected, but all Value Tokens that appeared valid may be added to the Double Spending Record as 'tainted'.

In this example, a limitation or constraint may be applied to the acceptance of such tainted Value Tokens to Type 3 Swap Messages, meaning the owner has to identify themselves under proof of withdrawal, in order to swap for new Value Tokens. Alternatively, we may use tainted Value Tokens for passive monitoring for potential user fraud and attacks only.

In some example embodiments, the purpose of the Double Spending Record is expanded, by introducing other potential status parameters for Value Tokens beyond simply the binary (for example 'spent'). Such multi value records can support several operational parameters to be varied, as well as the implementation of multiple rule sets in response to differing events, alters and/or other messages and conditions associated with a Value Token sets (and/or those associated with such set). For example, a further parameter value for the Double Spending Record may be 'under ESCROW'. This parameter is used in the implementation of our Value Token Exchange facility discussed later in the present disclosure.

Example Value Token Ecosystem

FIG. 1 illustrates an example digital Value Token ecosystem, according to an example embodiment of the present invention. In this ecosystem, payments between users may be provided using a message based payment capability employ digital Value Tokens. Some example embodiments described herein provide a set of services for such message based payments, as well as for various ancillary processes to support such a payment infrastructure.

In the example embodiment, a user of the system may send to another user of the system one or more messages comprising a set of Value Tokens of a specific Class. This creates a situation where if the message were intercepted in transit, or copied by another party who is not the intended recipient, then only the valid recipient can create a swap message at the appropriate Mint.

Users 110 may include individual natural persons, organizations, or intelligent software agents acting on behalf of a natural person or organization. Both users may both register with and validated by a system registration service. Each user 110 may have an associated device 112, e.g., a computer, mobile phone, or other device. Each device 112 has a respective digital wallet 114 stored on the device. The wallets are cryptographically bound to their respective users and registered with a system registration service. It will be appreciated that a particular device may support multiple wallets with multiple classes and/or class equivalents; the leftmost device is shown with two wallets. The digital wallets 114 may store Value Tokens belonging to the user 110 of the device 112.

It will be appreciated that, one or more users may be associated to a single wallet, for example cryptographically bound using digital certificates. Conversely one or more wallets may be similarly bound to a single user. In both cases such a user may be identified with a valid persistent network address or identity, for example those issued by one or more independent network services, such as email providers, individual bank accounts, mobile phone numbers, social networks (e.g. Facebook) ID's, message systems (e.g. Twitter) IDs and/or other services under the control of the user.

The degree to which such an identity may be verified and authenticated may, in some cases, determine the degree to which such an identity is managed and/or interacted with by one or more system elements.

User identity registration may be undertaken by a service that stores the identity of the user such that other users may be able to look up such an identity by querying such a user registration service. In some example embodiments such a service may create directly or through a delegated proxy a wallet for that user identity such that the user identity is cryptographically bound to that wallet instance.

Such a wallet instance may be instantiated as software and/or hardware element and may be located on a computing arrangement, storage medium, device, cloud service and/or any other suitable environment. For example, such a wallet may be instantiated as a secure environment, such as a sandbox, container or other secured memory or processing environment, for example such as those supported by ARM TrustZone or Intel SGX enclaves.

The example system may further include one or more merchants 130, with their own respective devices 132, e.g., servers that provide interfaces for selling goods or services via the Internet or in the physical retail world. These merchants may have their own wallets 134 for storing digital Value Tokens received as payments for goods and services.

The example system may also include one or more Mints 140. The Mints are configured to issue and swap digital Value Tokens received from users (who may be associated with merchants). Optionally, the Mints may also be configured to facilitate exchanges of Value Tokens of different Classes. In some example embodiments, specific functionality, such as Mints, may be embodied in chips, such as FPGAs, so as to provide a secure distributed system where processing systems of the user, such as for example their cell phone, laptop, smartcard and/or other device becomes an effective secure system element using associated messaging, cryptography and communications methods.

The example system may also include one or more Issuers 150. Each Mint may have an associated Issuer 150 (which may or may not be shared, depending on the situation). The Issuers may serve as a repository for the assets underpinning any Value Tokens and the Mint which is responsible for the issuing and swapping of these Tokens. The separation of Issuers and Mints may make possible the issuing and swapping of Value Tokens independent of the assets that underpin such Value Tokens. For example, an Issuer may provide a set of assets, in the form of securities or other tradable commodities (including sovereign legal tender), which may then form the collateral for an Issuer supporting that Mint's issuing of Value Tokens, for example as Value Tokens with a fixed denomination (intrinsic Value Tokens further explained herein), where the total value of the assets held by the Issuer can be divided into these specified denominations.

The merchants and users and Mints may be connected via a network 120, e.g., the Internet or other network. The messaging systems employed for the communication for the messages may include, for example email, SMS, NFC, Barcodes, messaging applications (e.g. Whatsapp), messaging platforms (e.g. Skype), social networks (e.g. Facebook) and/or any other communications medium capable of supporting messages, and may operate even using messages of less than 1 kilobyte in size.

The system may also include escrow services 170, that provide escrow to facilitate exchange of various types of tokens between users, e.g., in a lower risk transaction where token exchanges are "pre-cleared" by having each side place a digital Value Token into escrow before the transaction is completed. The escrow services may be provided by Mints, or may be provided by separate elements that are in communication with the Mints.

Figure 2:
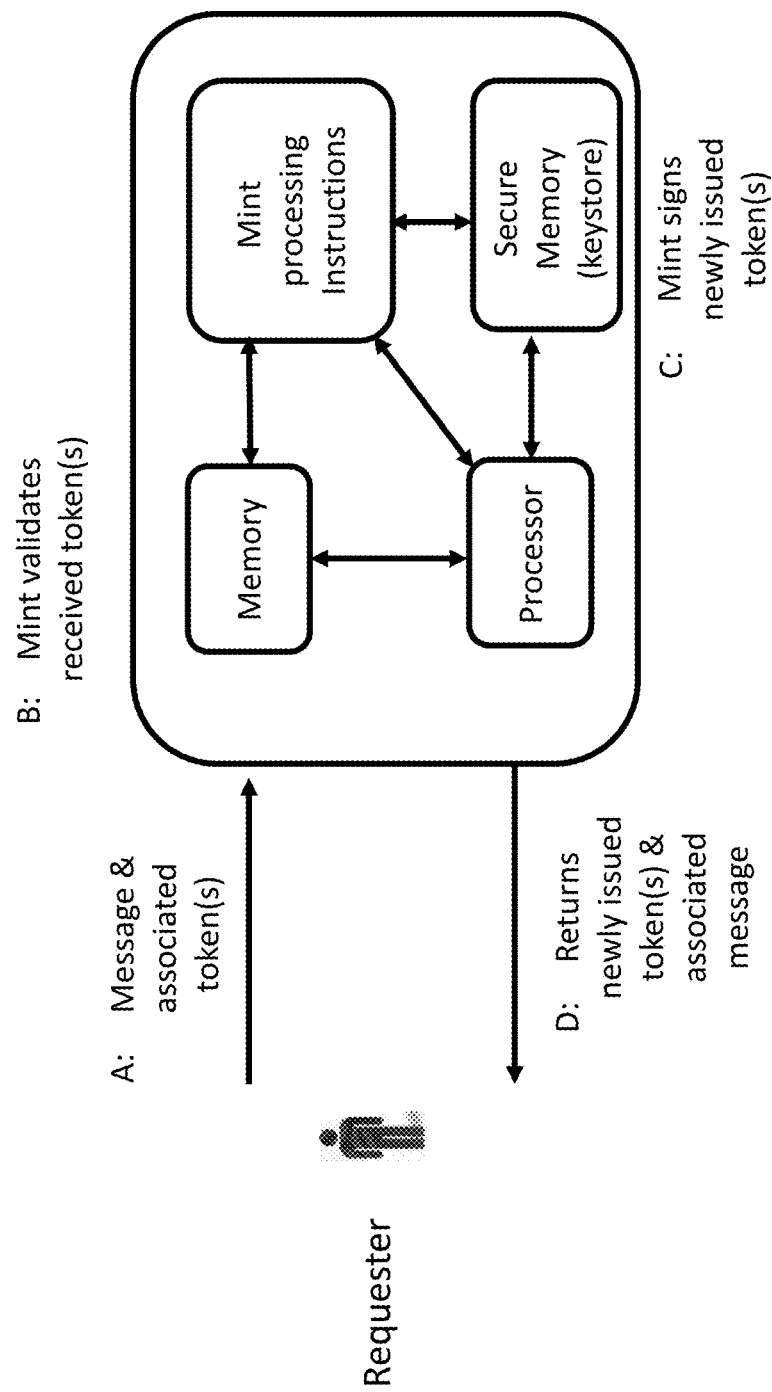
FIG. 2, illustrates a Value Token swap, according to an example embodiment of the present invention

FIG. 2 illustrates a token swap, according to an example embodiment of the present invention. A requester (which may be a device acting under control of or on behalf of user) sends a message to a Mint. Included in or with the message are a token or tokens for which a swap is being requested. The Mint receives and validates the Value Tokens, and assuming the Value Tokens have been validated, it signs new Value Tokens with a Mint key, which may be stored in a hardware keystore, such as a secure memory. The tokens, and possibly additional messaging are then returned to the requester. Various types of Swaps and Value Tokens are used to implement example procedures, as previously described in this disclosure. For example, Swaps are part of example payment procedures described in this disclosure.

Figure 3:
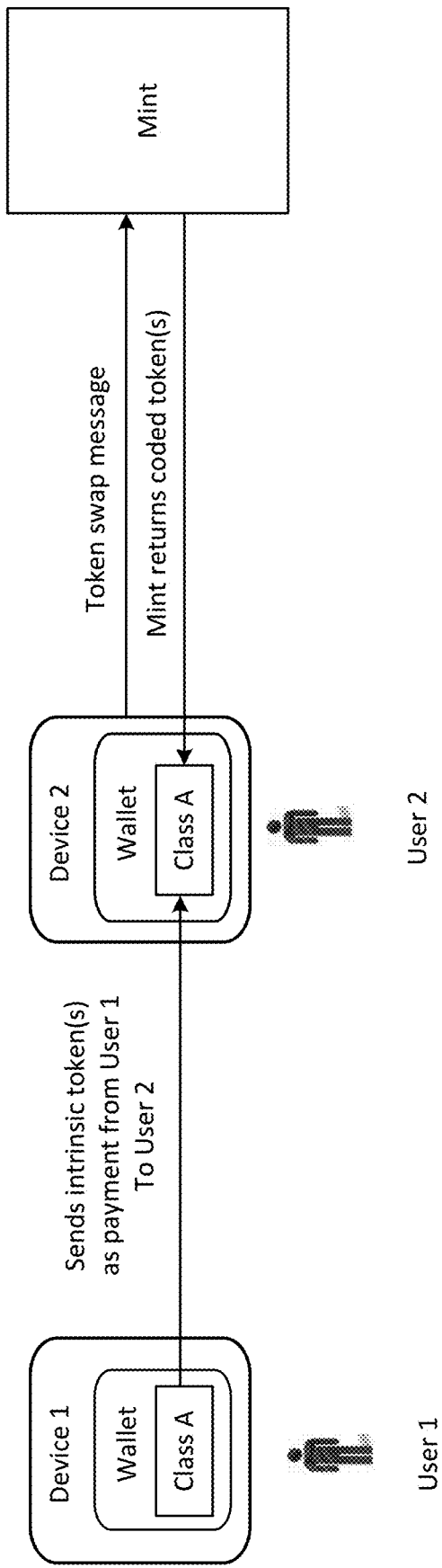
FIG. 3 illustrates an example payment, according to an example embodiment of the present invention.
Figure 4:
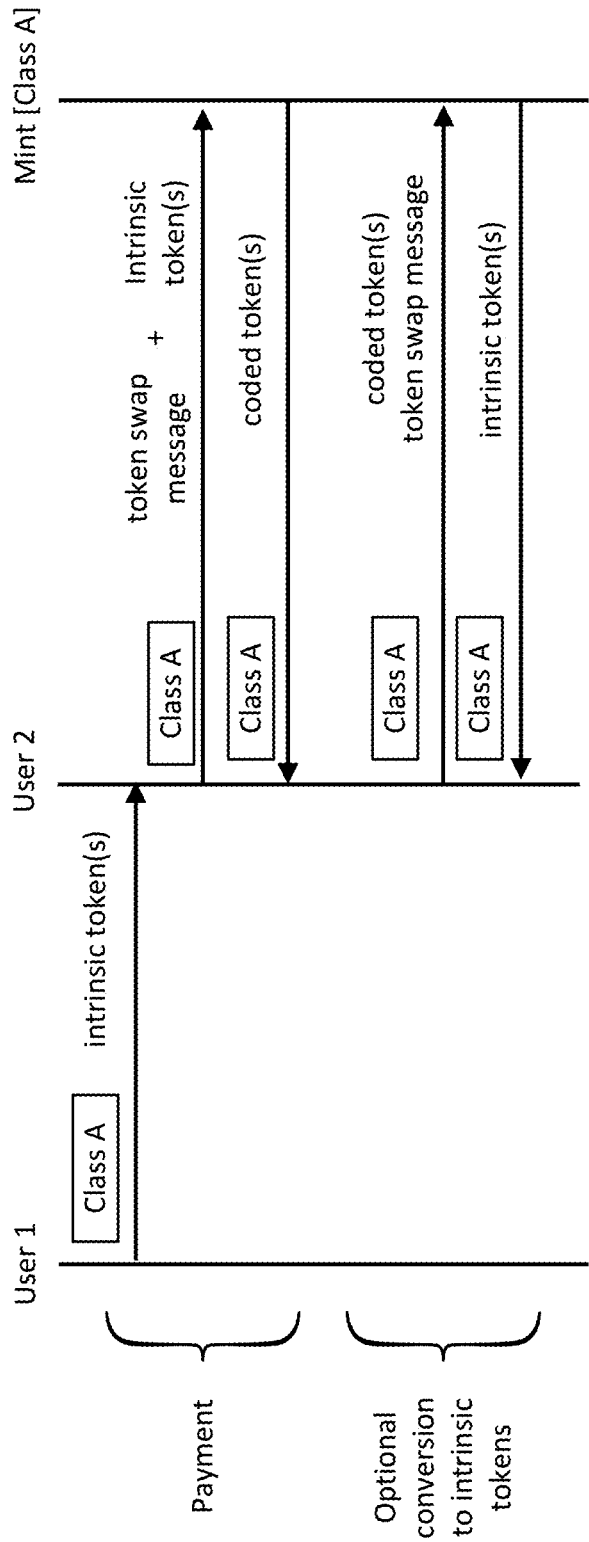
FIG. 4 illustrates timelines for the various actors in the example payment of FIG. 4.

FIG. 3 illustrates an example payment, according to an example embodiment of the present invention, e.g., a payment made in the context of the payment ecosystem described above in FIG. 1. FIG. 4 illustrates the same transaction in a timeline form with each column representing one actor in the transaction. User 1 has an intrinsic digital Value Token stored in a digital wallet, e.g., on a Device 1 (D1) controlled by User 1 (U1). User 2 (U2) may be identified by U1 with a variety of approaches, e.g., email, phone identity or other identity indicia which are recognized by a system identity registration service. When User 1 wishes to send User 2 some value, e.g., a payment, the transfer may be made with one or more digital Value Tokens in one or more denominations. User 1 may instruct D1 to make the payment to U2 and selects the value, by denomination or by value of the transfer to User 1. D1 then sends the at least one intrinsic digital Value Token to User 2, e.g., by having message include the digital Value Token sent from Device 1 to a Device 2 controlled by User 2. For example, such interaction may be supported by bluetooth communications, NFC and/or other peer to peer communications means, including for example displaying of a bar code (such as a QR code) which may then be photographed by User 2 with their Device 2. Responsive to receiving the digital Value Token, Device 2 then sends a swap request, including the digital Value Token to an appropriate a mint, e.g., a Mint that is identified in the digital Value Token as being the Mint which accepts that particular digital Value Token. The Mint then validates the digital Value Token, e.g., by confirming it has not been previously redeemed, and sends in return a coded digital Value Token to Device 2, where it may be stored in User 2's digital wallet.

While it is not illustrated in the FIG. 3, and not always required, it will be appreciated that other actions may also occur incident to or ancillary with the illustrated payment, e.g., Device 2 might issue a receipt for the payment to Device 1 in response to receiving the coded Value Token from the Mint. It will also be appreciated that the payment might be made in any context, as a gift, as a payment for services to be rendered, in satisfaction of an invoice or request for payment, etc. Moreover, subsequent to receiving the coded Value Tokens, User 2 might request a swap of these tokens from the Mint, in order to receive intrinsic Value Tokens in return for them. This might be undertaken automatically as part of the features provided by a digital wallet.

Figure 5:
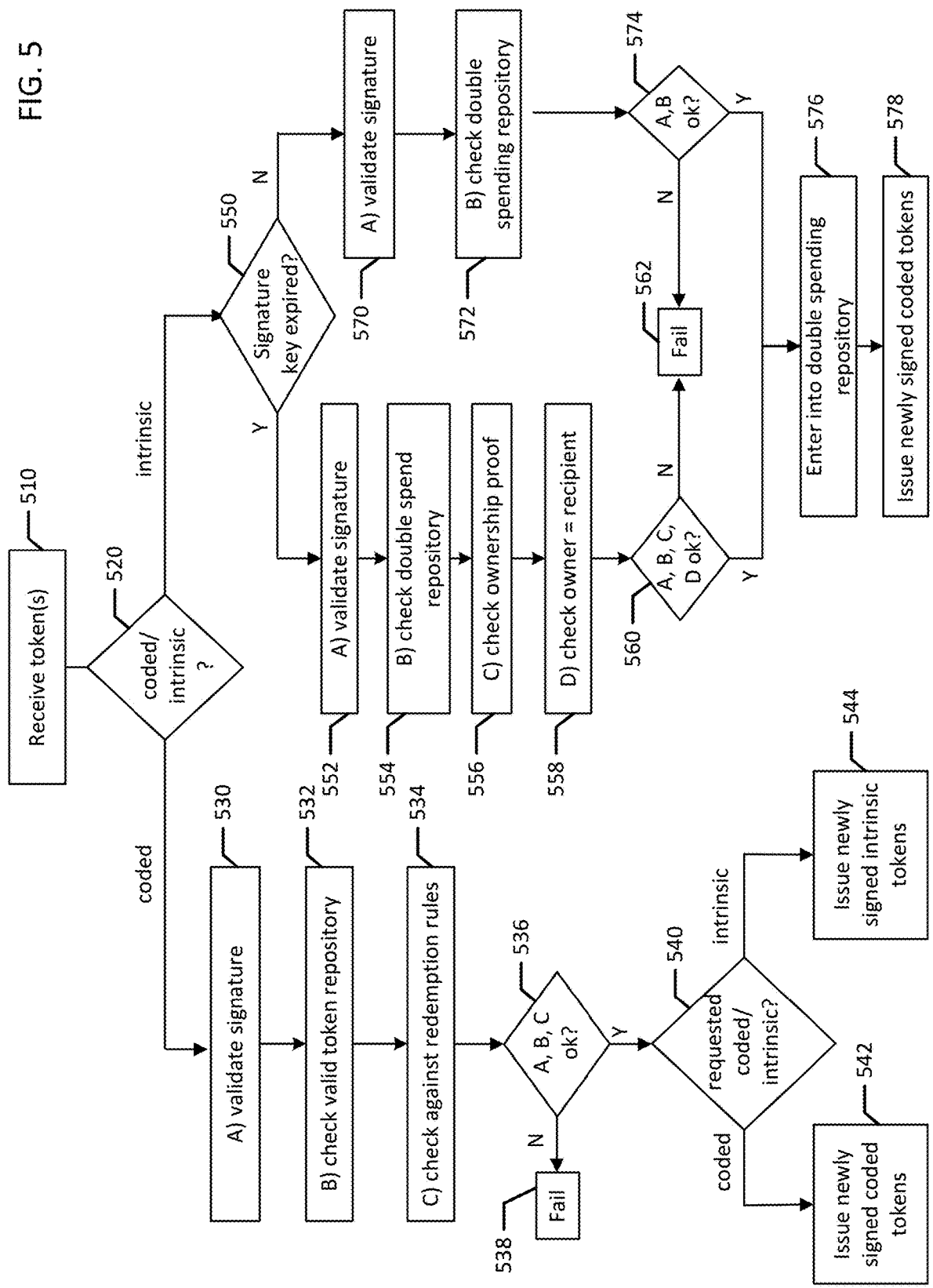
FIG. 5 illustrates an example Value Token swap process, according to an example embodiment of the present invention.

FIG. 5 illustrates an example digital Value Token Swap procedure in more detail, according to an example embodiment of the present invention. The example procedure may be carried out by a Mint. The Mint may be provided in software and/or in hardware, but as part of the process will need to digitally sign newly issued Tokens. Accordingly, the Mint will preferably have some sort of a secure mechanism for holding a Mint key to sign newly issued tokens, e.g., in a secure hardware device or secure memory.

In 510, one or more previously issued Value Tokens may be received, e.g., by a Mint. It will be appreciated that, while one or more previously issued Value Tokens may be sent for Swap in a single transaction, the example procedure is described here in terms of a single Token for simplicity. Multiple Tokens might be swapped in a single atomic transaction, or in separate transactions, although preferably tokens swapped in a single atomic transaction would all be of the same Class. The shared Class might represent a sovereign currency, a security, a commodity, or even simply another Class of digital Value Token. Depending on how the redemption protocol and Mints are configured, the Value Token may be received as part of a request to Swap the Value Tokens, e.g., as part of or an attachment to a Token Swap request message. Alternatively, a Mint may be configured to attempt to swap the previously issued Value Token automatically upon receipt of the Value Token. The Value Token may be of a particular Class and may each include a respective digital signature and, in the case of a coded Value Token, other information, such as denomination.

Optionally, as part of the Token Swap request, newly issued Value Tokens may be received, e.g., from the party requesting the Token Swap. At least with respect to Mint issuing the Value Tokens, the tokens are unsigned (by the Mint). However, in some example, these unsigned "proto-tokens" may be signed using a blind signature protocol like the Chaum blind signature protocol. As part of processing the Token Swap request, the Mint may verify that the proto tokens are authentic. Using this protocol, it is possible that the tokens do not later identify the requester when being returned in a future Swap request.

In 520, it may be determined if the previously issued Value Token received to be swapped is an Intrinsic or Coded Token. If the previously issued Value Token is Coded, the example procedure may continue with 530. If the Value Token is determined to be Intrinsic in 520, the example procedure may continue with 550. It will be appreciated that, even if the Value Token presented for Swap is validated, in the example procedure, only Coded Tokens are issues in Swap for Intrinsic Tokens, whereas, Coded or Intrinsic Tokens can be issued as Swaps for Coded Tokens. A received Token Swap Message for a Coded Token may indicate whether Coded or Intrinsic Tokens are desired, and may accordingly include proto Tokens under a blind signature protocol.

In 530, the Coded Value Token may be validated. First, the signature of the previously issued Token may be validated, e.g., by decrypting the digital signature. In 532, the validity of the Token may be confirmed by checking the status of the Token in a data repository to confirm the status of the Token, e.g., confirming the Token has not been previously swapped by checking information on previously swapped tokens which are no longer valid, or that the Token is not invalid for some other reason noted in the data repository. In 534, the Token swap rules may be checked. For example, redemption rules might include rules about when a Token should be redeemed, or what Mint it should be redeemed at, or other rules. The swap rules might include an identifier of a swap Mint for the Token, and if the Mint receiving the Swap request is not the swap Mint, the request to swap might be rejected, or alternatively might be re-routed to the appropriate Mint. The swap rules might also include times before which or after which the Value Token is valid, a geographic identifier indicating a geographic area where the Value Token is valid, jurisdictions where the Value Token is valid, and/or other attributes. There may also be multiple factors which are used to create a risk profile of the Value Token, and to deny swaps requests for tokens having a risk profile of, for example, at least a certain level or value, or to instead deny anonymous swap requests for tokens have a risk profile over a certain level/value and/or that meet one or more specified criteria.

In 536, if any of the required checks of the Token set are not satisfied, the procedure proceeds to 538, where the attempt to obtain a Token Swap fails. An appropriate message may be sent to the user device attempting to swap the Token set, perhaps including information about why the Token set has not been swapped. In some cases, if the redemption rules indicated a new intrinsic Value Token should not be issued, because of various risk factors, the requester might resubmit the request to swap the coded Value Token for a new coded Value Token, rather than swapping for an intrinsic Value Token.

If the validation of the Token set is successful, the procedure proceeds to 540. In 540, the type of Token set requested is determined, e.g., by information received in the Token Swap request message. If a Coded Token is requested, in 542 a newly signed Coded Token, signed with the Mint's digital signature, will be issued, e.g., by sending it to the device that requested the Token Swap. If an Intrinsic Token is requested, in 544, a newly signed Intrinsic Token, signed with the Mint's digital signature, will be issued, e.g., by sending the newly signed Token to the device that requested the Token Swap. In either case, the new Token set will have the same Class and may have the same, or nearly the same total denomination as the old set of tokens. It will be appreciated that, in some cases a transaction fee or other modification may cause the value not to be completely identical.

In an alternative approach, the denomination of an issued token or tokens may itself be a function of, rather than merely equal to the total of the denomination of the incoming set of Value Tokens. For example, interest type scenarios, intentionally inflationary or deflationary currencies, where, for example, each Swap increases or decreases the amount of a token. In one alternative, this function may include other information, such as the elapsed time since the issuance of the Value Token, to allow the function to depend on time, rather than merely number of swaps. In another example, a function may be applied to the total denomination of the previously issued Value Tokens being swapped relative to the total denomination of the newly issued Value Tokens being created, for example to permit subtraction of implied fees in transaction processing.

It will also be appreciated, that while single tokens may swapped for single tokens, atomic transactions allowing the swaps of sets of tokens for a single token having the same total denomination or for a sets of tokens having equal total denominations in a single atomic transaction may also be provided. In addition, other forms of swaps may also be provided. For example, the value of a single token might be split into multiple tokens.

In 550, the intrinsic Value Token to be swapped may be validated. The nature of the validation depends on the state of the signature key which the Value Token was signed with. If the signature key is expired, the procedure continues with 552, where more extensive token validation is done. It will be appreciated that other tests may also cause the procedure to route to more extensive validation, e.g., some sort of taint associated with the particular token. If the signature key is active the example procedure continues with 570, where token validation may be less extensive. In some variants, conditioned on any of the respective token signature key expiration states being expired and the requester being a party other than an original requester who received the Value token when it was issued, a request to swap the previously issued Value Token may be refused. In one alternative embodiment, if the Value Token signature key expiration state is expired, and the requester is the original requester who received the previously issued Value Token when it was issued, the swap request might be accepted, assuming other forms of validations being used are also successful.

In 552, if the signature of the swapped token is expired, the signature is validated in 552, e.g., by decrypting the digital signature. In 554, the validity of the Value Token may be confirmed by checking the status of the Value Token in a data repository to confirm the status of the Value Token, e.g., confirming the Value Token has not been previously swapped by checking information on previously swapped tokens which are no longer valid or that the Value Token is not invalid for some other reason noted in the data repository.

In 556, ownership related checks for the Value Token may be made. For example, the identity of the requester of the swap may be checked. In some variants, the Value Token includes a digital signature of the original recipient, which may be a random blinding factor under a blind signature protocol. This signature may be validated to verify the Value Token's ownership. In 560, if any of the preceding validity checks for the Value Token and requested swap have failed, the procedure may proceed to 562, otherwise it may continue with 576.

In 562, the request to swap the intrinsic Value Token fails. An appropriate message may be sent indicating the reason for the failure to the device or user requesting the Value Token swap.

In 570, a token whose signature is active may be validated. The token signature may be validated, e.g., by decrypting the digital signature. In 572, the validity of the Value Token may be confirmed by checking the status of the Value Token in a data repository, e.g., confirming the Value Token has not been previously swapped by checking information on previously swapped tokens which are no longer valid or that the Value Token is not invalid for some other reason noted in the data repository. In 574, assuming the validity checks for the Value Token and token swap request have not all be successful, the procedure may continue with 562. Otherwise the procedure may continue with 576. It will be appreciated that, in some variants, for unexpired tokens request to swap a previously issued Value Token might be handled independent of the identity of the requester.

In 576, an intrinsic Value Token has been successfully validated for swap. An invalidity record, such as a double spending repository may be updated to reflect the swapped token is no longer valid, e.g., by indicating it has already been redeemed. In 578, a newly signed coded Value Token may be issued, e.g., by signing it with the digital signature of the Mint and sending it as part of a message to the device that requested the Value Token swap.

Example Token Issuance

Figure 6:
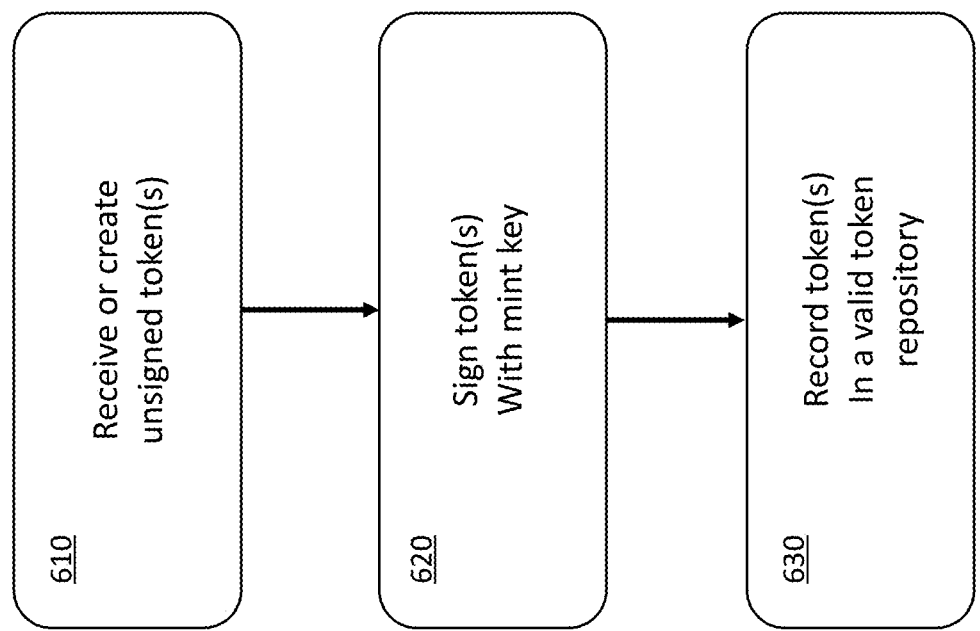
FIG. 6 illustrates an example coded Value Token issue sub-process, according to an example embodiment of the present invention.

FIG. 6 illustrates in more detail elements of the issuance of new coded Value Tokens, corresponding to element 542 or 578 in FIG. 5. When newly issued Value Tokens are created and issued in return for a swap message, the recipient is identified to ensure that the right person is requesting and receiving the newly issued Value Tokens. In 610, a Mint may create proto tokens or receive proto tokens for signing. Optionally, a Mint may verify the identity of the requester, e.g., by receiving or requesting a digital signature or other authenticated identity representation of the requester. In 620 the Value Tokens may be certified as authentic by the mint, e.g., signed by the Mint issuing the Value Token, using a securely held secret active Mint key and a conventional digital signature protocol. In 630, information about the Value Tokens may be entered into a record for the Value Token in a data repository storing information including information related to valid tokens. This data repository may be structured as a secure file, secure relational database, or other form of data storage. The data repository may be included as part of a Mint device, or may be in a location accessible to the Mint issuing the Value Tokens. It will be appreciated that multiple mints may possibly share the same data repository, and that the repository may be in a distributed form, such as a distributed database. The information included in the data repository for a coded Value Token may include, for example, identity of the Mint issuing the Value Token, class and denomination of the Value Token, time the Value Token was issued, and identity of the recipient of the newly issued Value Token and/or any other token related information sets, including for example any information sets pertaining the risk profile/value of such a token, the relationship of one set of tokens to another (for example multiple sets from a single user) and/or the like.

Figure 7:
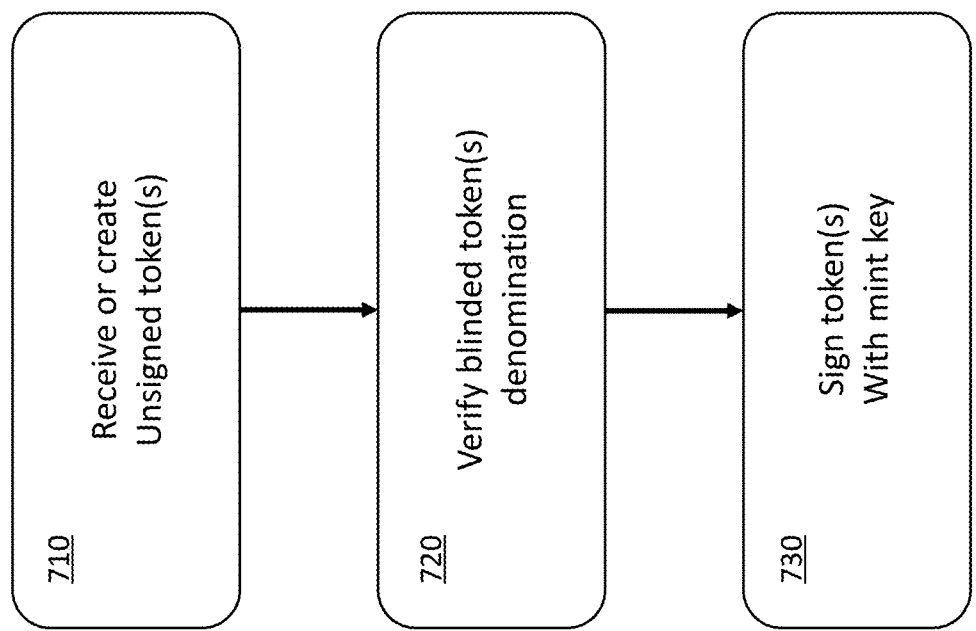
FIG. 7 illustrates an example intrinsic Value Token issue sub-process, according to an example embodiment of the present invention.

FIG. 7 illustrates in more detail elements of the issuance of new intrinsic Value Tokens, corresponding to element 544 in FIG. 5. In 710, new proto tokens may be received, or created for signing. The tokens might be blinded and/or securely bound to a requester, e.g., using a Chaum blind signature. The adequacy or correctness of the proto tokens, including their denominations, may be verified in 720. In 730 the Value Tokens may be certified by the Mint, e.g., by digitally signing them using Mint active private Mint key. The parameters of the intrinsic Value Tokens that are created are set by the signing of the Value Tokens with one particular signature key. This signature key itself is associated with one specific set of intrinsic Value Token parameters, such as the class of token, and the denomination, or any other parameters applicable to the intrinsic Value Token.

Example Mint Architecture

Figure 8:
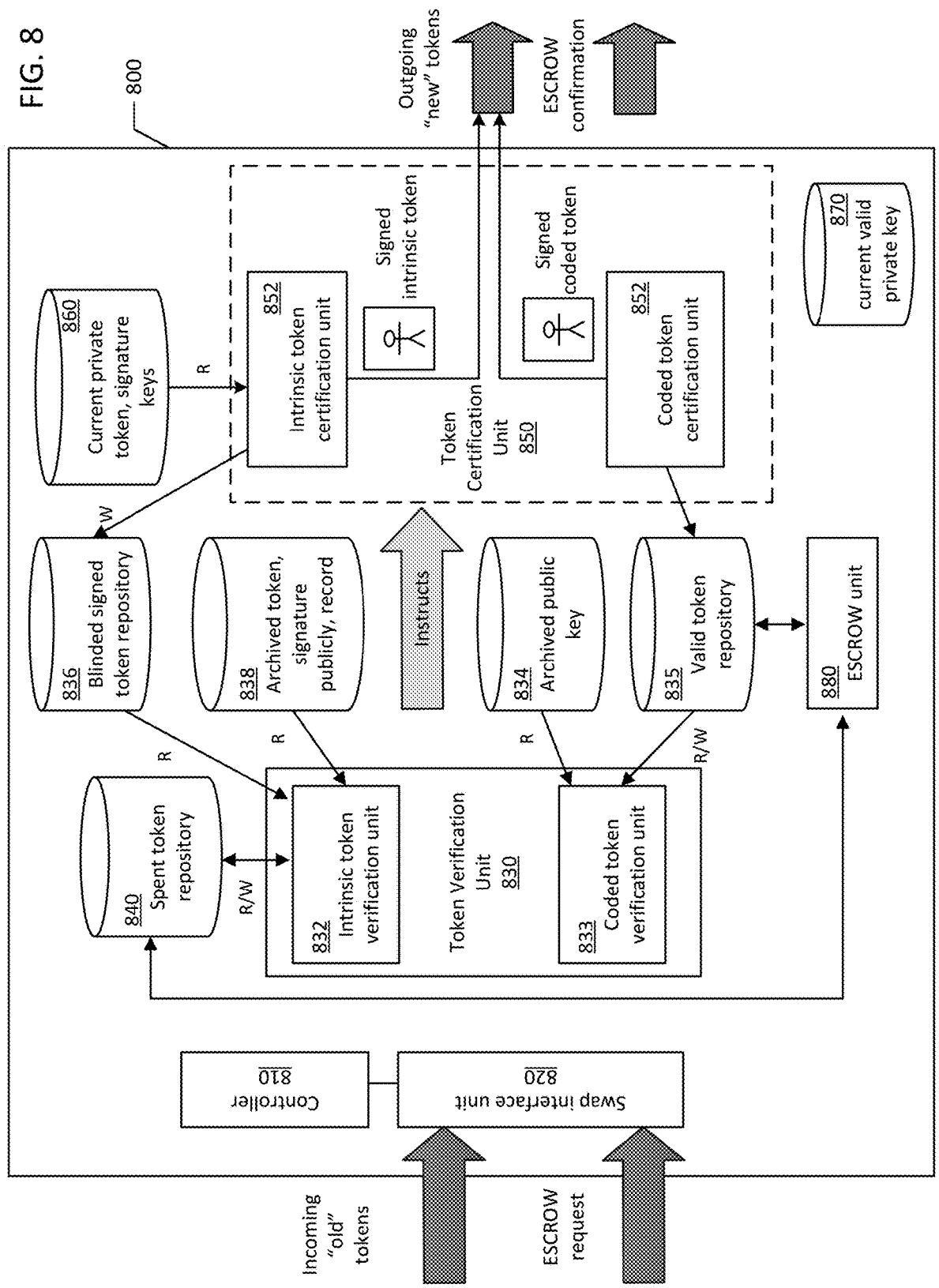
FIG. 8 illustrates an example Mint architecture, according to an example embodiment of the present invention.

FIG. 8 illustrates an example architecture for a mint, according to an example embodiment of the present invention. The Mint 800 may be provided in hardware and/or software, e.g., as a custom or semi-custom device, an appliance or device, a hardware component (for example a System on a Chip and/or an FPGA), on a dedicated computer, and/or as a service (for example as Software as a service) provided for example in a virtual system and/or cloud arrangement. The Mint may be configured to perform the token swap and token issuance processes described in the present disclosure. It will be appreciated that various elements of the Mint 800 may be separate hardware elements, software modules, or services/functions provided by a single Mint service.

For example, an embodiment of a Mint in hardware, for example using a SOC (system on a chip) approach such as an ARM chip with the cryptographic functions operating in the secure section, may be embodied in multiple devices and/or may be instantiated in, for example an FPGA which may connect to a secure cloud service for key management and other services.

A controller 810, may be a computer processor, which controls the operation of the mint, e.g., under software control. The other elements of the Mint may be separate hardware elements, software modules, or a combination thereof. In some embodiments, there may be a rules module, operating under the control of the processor configured to determine the rules associated with an "old" or previously issued Value Token, e.g., based on information in or about the previously issued Value Token, and to allow token swaps to occur only when they are in compliance with the rules.

A swap interface unit 820 may be configured to receive a request, e.g., a network message, from a requester seeking to swap a previously issued Value Token. The previously issued Value Token to be swapped may also be received as part of, attached to, or in conjunction with the request to swap. The received request may indicate the type of token being requested to be received. The received previously issued Value Token may have a class, a digital signature (or more than one digital signature), and a denomination. In some embodiments such an interface unit may implemented for example as swap appliance which may receive and process swap messages for validation, verification and routing. This may include a specialized hardware component, which when combined with the appropriate network communications capability may undertake such processing and routing.

The controller may cause the Value Token's validity to be verified by a token verification unit 830, which may receive the Value Token from the swap interface unit. Separate verification subunits may be provided for intrinsic and coded Value Tokens, respectively 832 and 833. These units may, e.g., implement the verification procedures described elsewhere in the present disclosure. The intrinsic Value Token verification unit 832 may be in communication with a Spent Token data repository 840, which maintains information on tokens that have already been swapped, in order to prevent double redemptions. This data repository may be in any secure form and is not limited to a particular approach to data structure or storage. e.g., a secure relational database. The intrinsic Value Token verification unit may also be in communication with a repository storing blinded signed proto-tokens 836. Archived token public keys may be stored in a data repository 838, which may be contained in the mint, or at some other location. For example, such a repository may also include one or more sets of parameters associated with such public keys. This information may be used to verify digital signatures on tokens presented for redemption when they are being verified by the token verification unit 830.

The coded Value Token verification unit 833 may be in communication with an archived public key repository 834 and a valid token repository 835 that are used to verify coded Value Tokens.

A token certification unit 850 may be used by the Mint to certify newly issued tokens. The certification unit may have access to the mints current private token signature keys stored in 870, which are used to sign certified tokens. 870 may include a secure process and/or secure memory that is used to securely store the Mint's private keys.

The intrinsic Value Token certification unit 852 may have access to the repository 836 for blinded signed tokens, for example to store information for subsequent evaluation. The coded Value Token certification unit 854 may have write access to the valid token repository 835, in order to update information regarding valid coded Value Tokens, such as for example when these tokens are certified.

Optionally, the Mint may also include or have access to an escrow unit 880, that may be employed to pre-clear swap or exchange transactions, for example, in token exchanges. The escrow unit may have access to the valid token data repository 835 and or the spent token data repository 840 in order to check and update the status of tokens during the escrow process.

FIG. 9 illustrates an example token data repository, according to an example embodiment of the present invention. While the data is illustrated as a table, it will be appreciated that any form of data structure or storage may be employed.

Example Coded Value Token

FIG. 10 illustrates an example coded Value Token, according to an example embodiment of the present invention. The coded Value Token is stored, e.g., in the digital wallet of a user, or at a Mint. It will be appreciated that the coded Value Token is presented to illustrate example information that may be associated with a coded digital Value Token, and not all of the features shown must be included in every coded Value Token. Except for some form of identifier, the associated information need not actually be contained in the Value Token, but rather could be stored in a repository and linked to the Value Token, e.g., by using the identifier as an index. Moreover, it will be appreciated that, while the data is shown in FIG. 10 is provided for illustration purposes, any suitable data structure may be employed, and portions or the entirety of the information included may be coded and/or encrypted in a variety of ways.

The example coded Value Token may contain a variety of information. Some or all of the information may be expressed as a cryptographically signed certificate set in the Value Token. The token may contain 1010 a unique identifier, e.g., a string, a number, a sequence of bits, or any other convenient format. The Value Token may contain a unique identifier of the Mint 1020 that issued the value token. The Value Token may contain an indication of the class of the Value Token 1030. In the example the class is "Euros", showing the value token represents sovereign currency in Euros. The Value Token may contain a denomination value 1040, in this case 10 Euros. The Value Token may contain temporal information 1050, such as a "not valid before" indicator or a "not valid after" indicator. The Value Token may include redemption rule information 1060, possibly just a parameter for pre-coded redemption rules, or identifiers of pre-identified redemption rules, e.g., rules available at the Mint, which created or is designated to redeem the Value Token, or parametric information used for rules associated with particular classes of tokens. In an alternative, the Value Token might even include coded information that allows determination of the rules themselves. The Value Token may include a risk indicator 1070. Here the risk indicator is "None" indicating no special risk associated with the Value Token, but various other risk states, "tainted", or more particular status information, or numerical risk levels may be provided.

Mint Initialization

Figure 11:
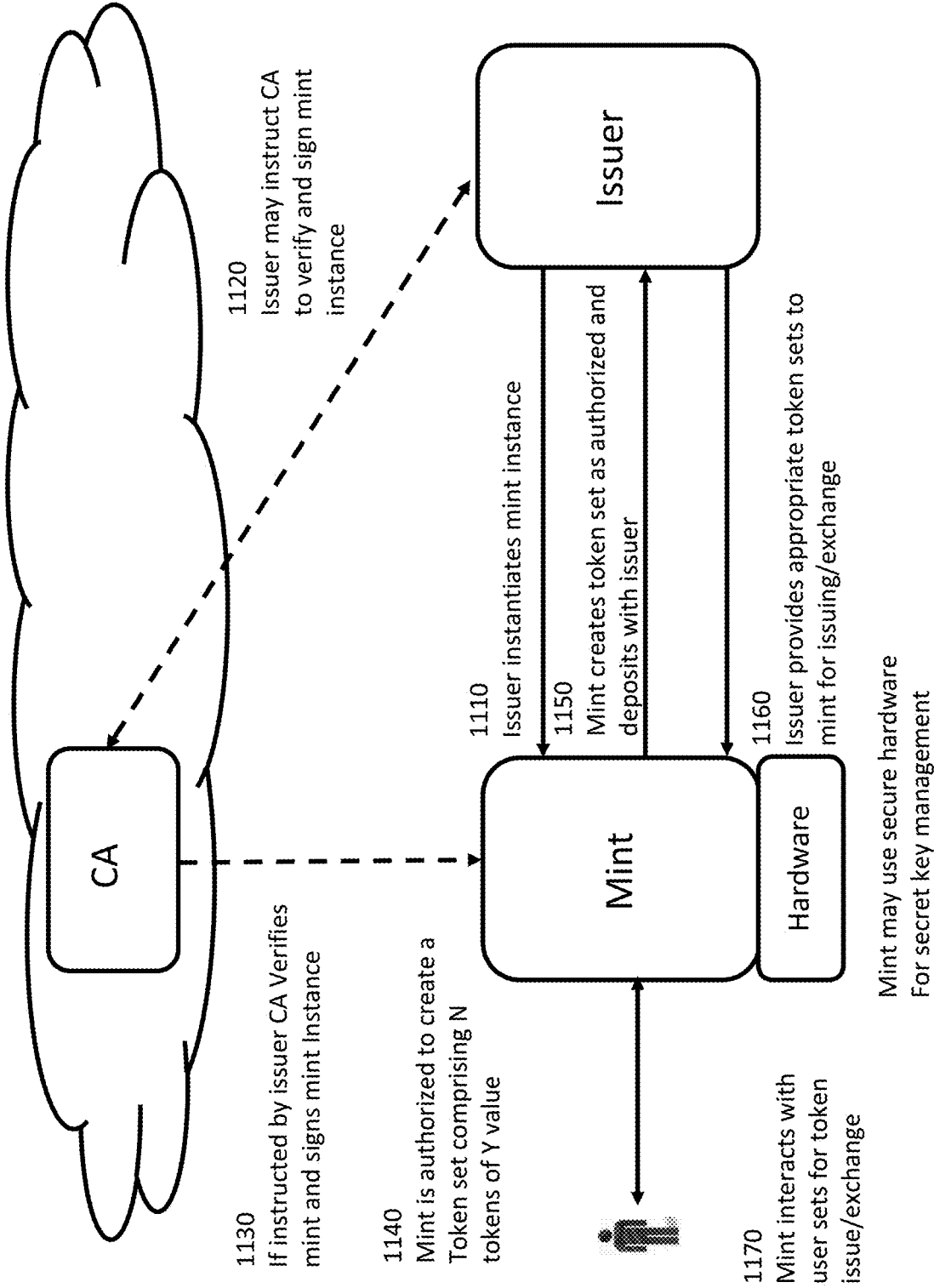
FIG. 11 illustrates an example Mint initialization, according to an example embodiment of the present invention.

FIG. 11 illustrates an example Mint initialization, according to an example embodiment of the present invention. A Mint may be created by or on behalf of an Issuer which wishes to issue and swap tokens in a particular class. The Mint may configure and employ secure hardware for secret key management, e.g., ARM Trustzone/Intel SGX or other specialized secure, including tamper resistant, hardware.

In 1110, a new Mint instance may be created, e.g., by activating a device and/or software that serves as a mint. The new Mint may be created by an Issuer. The software may run on secure hardware that provides for secret key management. In 1120, the Issuer may request verification of the Mint instance from a certification authority. This verification may include checking the certification of the Issuer creating the mint. In 1130, the certification authority verifies the Mint instance and may sign the Mint instance, e.g., using conventional digital signature/certification approaches. In some cases, the Issuer itself may also be certified by a CA and/or may be securely bound to the Mint. It will be appreciated that, in alternative approaches certification of the Mint or the Issuer may not be required or undertaken.

In 1140, the Mint is authorized to create a token set, e.g., a particular total denomination of tokens of a particular class, or a total number of tokens of the particular class of fixed denomination. The authorization may be given by the Issuer and/or the certification authority at the request of the Issuer. The Mint may also create or receive the first active signature key. In 1150, using this key, the Mint may create the first set of valid tokens. This set of tokens may be all or part of the defined total denomination of all tokens for circulation by this mint of which are authorized by the Issuer.

The initial batch of tokens may then be deposited with the Issuer by the Mint. In 1160, the Issuer may provide the Mint with tokens that are approved by the Issuer for issuance, for example an unissued token set signed by the Issuer may be received, and then signed by the Mint upon issuance. In 1170, the Mint may interact with users, provided token swaps or exchanges as described previously in this disclosure.

The Mint may undertake certain key management operations, including for example, expiring of signature keys and creating new ones as directed. The Mint may also increase the total denomination of all tokens in circulation, that is minting newly issued Value Tokens outside of swap messages. This may be undertaken at the behest of and under direction of the associated Issuer, e.g., using a procedure similar to the initialization procedure illustrated in FIG. 11

Networks of Mints

In some example embodiments, several instances of Mints can interact in a cooperating fashion, e.g., as a Network of Mints. Two types of Networks of Mints, to address two different aspects of scalability are described below.

Network of Mints Issuing Single Class of Value Tokens

In a first form of Mint Networking, a set of Mints can be networked so that multiple Mints can issue the same single Class of Value Token. This solution is used to allow for scalability of electronic cash protocols, in particular the Blind Signature protocols, and overcome the known limitations of these protocols, in particular, the bottleneck of the double spending record. A new approach to overcoming this bottleneck through the networking of Mints under a specific protocol is outlined herein, which effectively solves this issue through specialised load balancing.

In this embodiment of a Network of Mints, each Mint issuing the same Class of Value Tokens is designated a specialised Mint ID within the Network of Mints. Each Mint now uses a set of active Value Token signature keys, so that each key relates to a combination of (denomination, Destination Mint ID), when issuing Value Tokens of the same Class.

A Value Token of the relevant Class is now exclusively available for swapping at the Mint with the ID equal to the Destination Mint ID specified in the Value Token. This Mint may be, but need not be, the same Mint in the Network as the Mint that issued the relevant Value Token in the first instance.

For verification of the received Value Tokens in a Swap Message, the Destination Mint now requires (a) the relevant public key set corresponding to the originally issuing Mint's signature key, and (b) its local Double Spending Record, which is now a Record for each issuing Mint in the Network. We specifically note that the signature key is not required for this verification, only its corresponding public key.

In this alternative:

Verification against double spending is no longer required to be done by the issuing Mint, nor indeed by a single verification point.

The distribution of the double spending check allows both (theoretically) unlimited scaling of the double spending check free of a single bottleneck, as well as load balancing between Mints within the Network, without compromising the unambiguous state verification of individual Value Tokens.

New and additional Mints can be added to the Network so that scaling can be undertaken dynamically, by adding capacity to an operating Network of Mints, as required.

Accordingly, if a specific Mint instance load is evaluated as being too high (or is predicted to be too high in the future), then such an instance may be replicated so as to provide a load balancing arrangement which is transparent to a user.

Network of Mints Issuing Different Classes of Value Tokens

In a second form of Mint Networking, a set of Mints issuing different Classes of Value Tokens may be networked through an additional system component, which we refer to as an "Exchange". The Exchange facilitates users exchanging, or trading, Value Tokens of different Classes. In a particular embodiment, the Exchange achieves the operation of a platform for the trading of Value Tokens, with greatly reduced systemic risk. We note that this is a significant improvement over commonly operating exchange trading systems, which are generally net settlement based.

The exchange trading process may be facilitated within ESCROW state of the Value Tokens at participating Mints, which may be provided as an extension of the Double Spending Repository previously described in this disclosure.

Exchanges may be provided, e.g., by an escrow unit included in or accessible to particular Mints, or by a separate subsystem providing similar capabilities. An Exchange may offer users the facility to place orders for an exchange trade, by providing to the Exchange the Value Tokens to be exchanged, and by specifying the class and denomination of Value Tokens they are to be exchanged for. (Alternatively the specific value tokens to be exchanged for might be identified by either party.) To complete placement of such an order, the Exchange will submit the Value Tokens being submitted for exchange to the relevant Mint, which marks them as 'under ESCROW with Exchange X' in its Double Spending Repository. This means that the relevant Mint will no longer permit spending of the Value Tokens so marked, except for a transaction involving the Exchange X, which can be (a) a successful trade matched by Exchange X, or (b) a cancellation of the order.

In the event of the Exchange receiving a matching order, this order too will include the Value Tokens submitted for trading. Consequently, the action of matching the orders and executing the trade is in fact an exchange of the two sets of Value Tokens between the two users whose orders are being matched. This is then achieved by each user receiving the corresponding Value Tokens of the other user involved in this trade, then submitting them to the issuing Mint in a Token Swap message, in order to obtain new Value Tokens of the desired Class.

The result is that at the end of this trade transaction, both participating users have successfully exchanged valid Value Tokens of one Class, for Value Tokens of the desired other Class. In the process, this transaction has become fully settled and finalized through the holding on new Value Tokens by each of the two users, such that no further separate clearing or settlement is necessary.

One could conceptually consider trades in this Exchange to be 'pre-settled', in that because order placement on the Exchange includes submission of valid Value Tokens itself, conceptually the exchange of valid Value Tokens of different Classes in itself comprises a finalized, fully settled, exchange trade.

For example, user A submits Value Tokens of Class A, issued by Mint A, (of total denomination n), to the Exchange X, and specifies that in return, he wants Value Tokens of Class B, issued by Mint B, (total denomination m). We consider this the order placement. Exchange X now validates the Value Tokens included in the order, by sending them to Mint A for a Mint ESCROW submission. They are confirmed valid by Mint A, which annotates them as 'under ESCROW for Exchange X' in the appropriate Double Spending Record. The order is listed by Exchange X as available for matching trade.

After some time, user B submits an order, which includes Value Tokens Class B, (total denomination m), and requests in return Value Tokens Class A (total denomination n). This order matches the order by user A. Exchange X now matches the orders and executes the trade, by sending the Value Tokens Class B (total denomination m) to user A, and the Value Tokens Class A (total denomination n) to user B. In this example, this is achieved through a Value Token Trade message, which includes the authorisation by Exchange X to the relevant Mint, to release the relevant Value Tokens from ESCROW (essentially permitting the Mint to move their status to 'spent' in the Double Spending Record, in the following Swap message). User A now sends the Value Tokens Class B he received to Mint B in a Swap message, thus obtaining new valid Value Tokens Class B, and user B sends the Value Tokens Class A he received to Mint A in a Swap message, thus obtaining new valid Value Tokens Class A. This set of messages has now achieved a fully settled trade between users A and B. The net effect of this approach is that exchange transactions are essentially pre-cleared, and settled in real time. This is achieved by using a combination of two Token Swap messages, together with the system attributes described herein.

In an alternative approach, the Exchange may itself deposit the Value Tokens received in an order with the relevant Mint in a Swap message, thus obtaining new Value Tokens, and hold these new Value Tokens itself during the period when an order is active. In the event of a matching order, these new Value Tokens are then sent to the corresponding parties in a trade, who in turn obtain new Value Tokens through Swap messages with the relevant Mints. This approach does not make use of the special ESCROW state in the Mints' Double Spending Records, but it increases the level of trust required in the Exchange by the users.

In some embodiments, partial order matching will be permitted, and facilitated by the Exchange through the exchange of a subset of Value Tokens included in a particular order, and, if necessary, the swapping of Value Tokens with participating Mints for Value Tokens of different denominations required for the partial matching of an order.

In some embodiments, the Exchange may send Value Tokens being exchanged directly to the relevant Mints on behalf of the users involved in a trade, and obtain new Value Tokens for each user in that trade, then send those Value Tokens to the users for settlement. The users may then each optionally swap those Value Tokens with the relevant Mints again, thus obtaining new valid Value Tokens.

In some embodiments, the Exchange may provide for a message protocol that explicitly ensures the full completion of a trade including the receipt of new Value Tokens by each user involved in a trade, or effectively 'rolls back' such a transaction in the event some components of it do not complete.

In some embodiments the Exchange may publish all available orders, or it may publish a subset of such orders, or it may not publish available orders. It may also use any kind of matching rules and order lifecycle rules including conditional order cancellations, as is practised on securities exchanges elsewhere.

Figure 12:
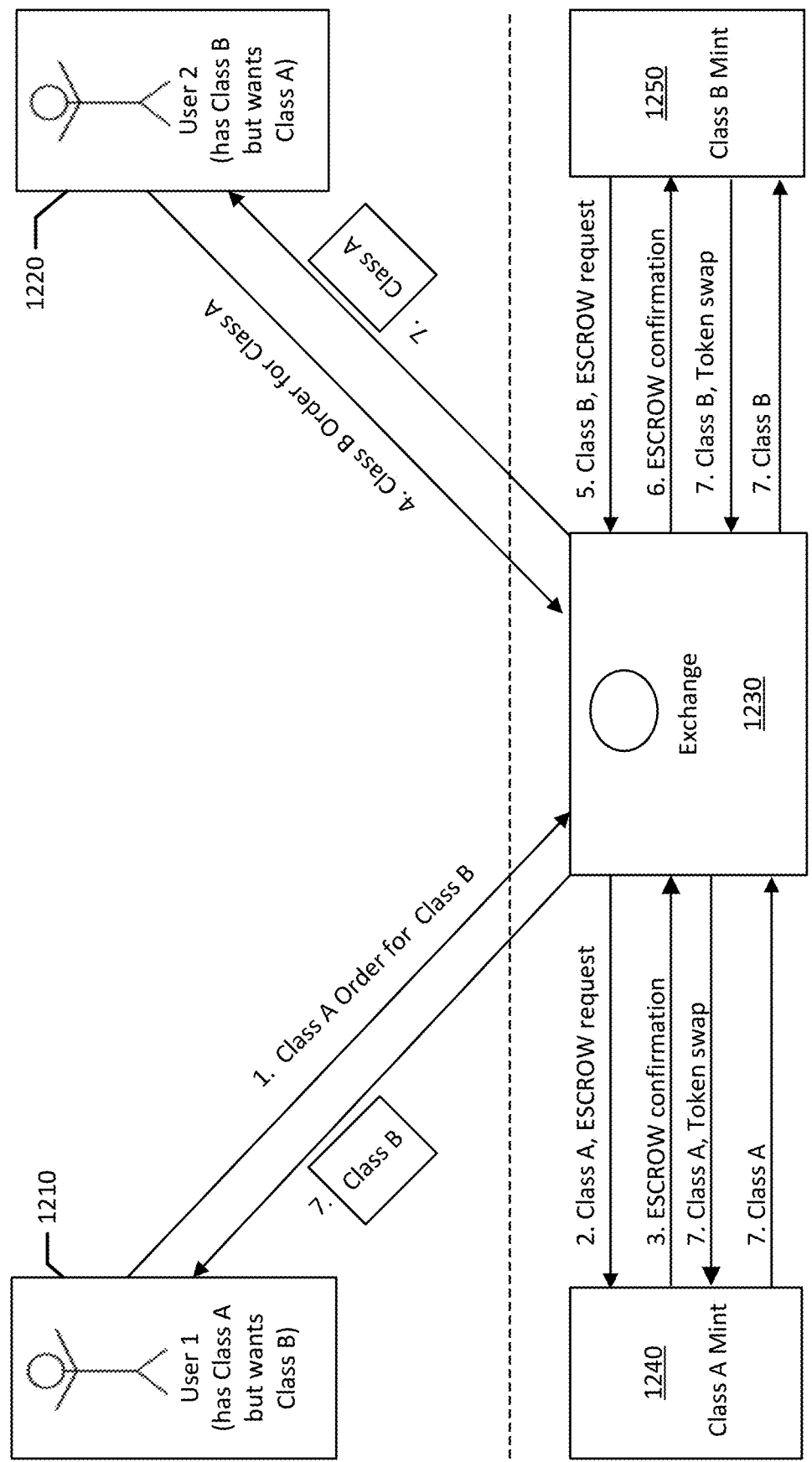
FIG. 12 illustrates the exchange process for exchange of tokens of different currencies, according to an example embodiment of the present invention.

FIG. 12 illustrates the exchange process for exchange of tokens of different currencies, according to an example embodiment of the present invention. A user 1's device 1210 has a token (or multiple tokens in class A) but user 1 wants tokens in class B. Device 1210 makes a request to Exchange 1230 to exchange the class A token for the class B token. User 2's device 1220 has a token (or multiple tokens), in class B, but user 2 wants tokens in class A. Device 1220 makes a request to Exchange 1230 to exchange the class B token for the class A token.

The Exchange 1230 receives the Value Tokens to be swapped from the respective user devices and requests to exchange the Value Tokens. Responsive to receiving the exchange request and the Value Tokens, Exchange 1230 makes an escrow request for the class A token to the Mint associated with that token 1240, and receives an escrow confirmation. The Exchange makes an escrow request for the class B token to the Mint 1250 associated with that token, and receives an escrow confirmation. Responsive to receipt of both escrow confirmations, the exchange then makes swap requests for both tokens at their respective mints. Upon receipt of the newly issued Value Tokens, the newly issued class B token is sent to user 1's device 1210, and the new class A token is sent to user 2's device 1220.

While an escrow is in place, attempts to swap the Value Token from entities other than the Exchange may be rejected. For example, this may be accomplished, by updating a data repository including token validity and/or double spend data to indicate the status of the Value Token is "in escrow". Mints may be configured, e.g., as part of the Value Token swap validation process to reject requests to swap such tokens.

If one of the attempts to escrow the Value Tokens by the Exchange fails, e.g., because the relevant Mint refuses the request, the Exchange may cause the status of the other token, which had been placed in escrow status, to be released, e.g., by sending an appropriate message to the Mint for that token.

The process of match-making between A and B may be accomplished by a variety of methods. The process described in this subsection assumes the parties wanting to make the exchange have already been identified to the system and to each other. Also, more complicated exchange patterns with multiple parties seeking exchanges, and/or exchanges of multiple tokens at the same time, or other more complicated exchanges, may also be developed using variants based on the basic protocol described here.

Figure 13:
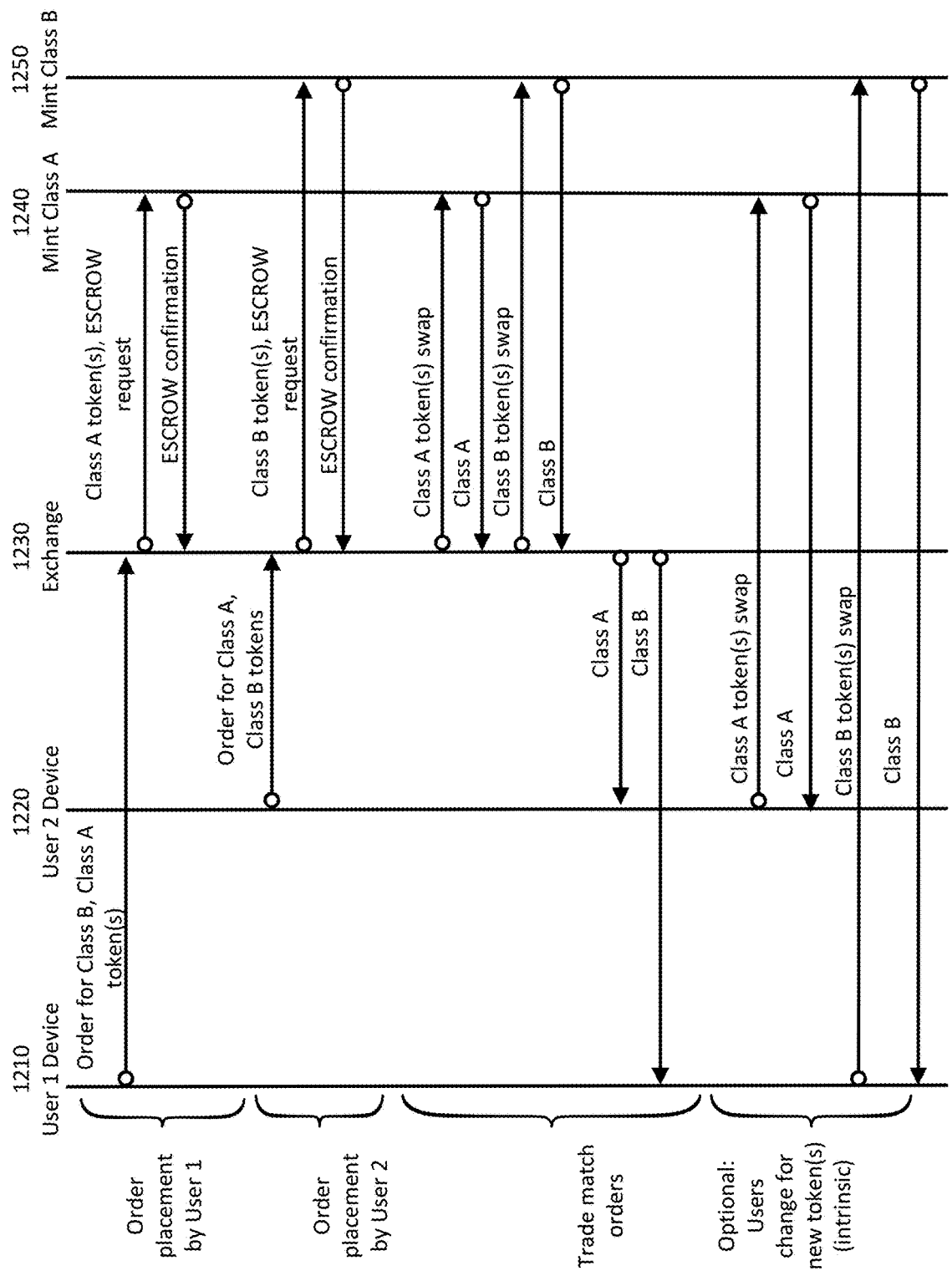
FIG. 13 illustrates the same exchange process showing the actions of each participant in a separate flow.

FIG. 13 illustrates the same process showing the actions of each user in a separate flow, as well as the respective message exchanges. Also, optionally, added to the end of the exchange procedure, User 1210 may request a swap of the newly received class B token, and user 1220 may request a swap of the newly received class A token, e g, to exchange coded for intrinsic Value Tokens for user in a further purchase.

It will be appreciated that procedures similar to the Exchange process may be used in other contexts where pre-clearing transactions is desirable. For example, mints conducting swaps for particularly large or other high risk tokens may use similar approaches to pre-clear a transaction prior to making a swap.

Example: Value Token Swap with Network of Mints

In this example, each issuer issues a respective class of Value Token using one or more Mints; each Mint may include one or more redemption and/or signing functions. In some cases, a particular Mint may both issue and redeem Value Tokens of a particular Class; in other cases these operations may reside at separate Mints. The Mints may be configured to operationally provide either redemption, signing or both capabilities, so that a single Mint may act as a redeemer and a signer. A Mint that provides redemption or signing can be deployed and configured to use one or more servers that share a common set of repositories that store Value Token related information, for example databases. This information may be distributed across multiple databases based, e.g., on the index used. Example indices might include a portion, e.g., the first byte of a token hash, denomination index, transaction id, etc. It will be appreciated that differing arrangements of Mints may offer varying operational capabilities and outcomes.

In the present example, each Coded Value Token has associated with it a Class, Value, at least one Issuing Mint ID and at least one Redemption Mint ID. The Issuing Mint ID is the identity of the Mint that issued the Coded Value Token and the Redemption Mint ID identifies the Mint that can verify the Coded Value Token. Mint identities may be certified by an appropriate authority, for example a Certificate Authority. For an Intrinsic Value Token the Issuing Mint and the Redemption Mint are typically the same and the Mint ID is implicitly determined by a key set used to sign the Intrinsic Value Token. When a Mint verifies a set of Intrinsic Value Tokens and provides a set of Coded Value Tokens as a swap, the verifying Mint assigns a Redemption Mint ID to the Coded Value Token. The Coded Value Token is signed with the specific Coded Value Token-signing key of the issuing Mint. For example, if Mint A issues an Intrinsic Value Token set and then at a subsequent time redeems a token from that Intrinsic Value Token set, Mint A may also issue Coded Value Token(s) for redemption at another Mint, for example Mint C. When Mint C receives such Coded Value Token, e.g., as part of a swap request, Mint C may, after verification, redeem these Coded Value Token(s) for Intrinsic Value Token(s).

Figure 14:
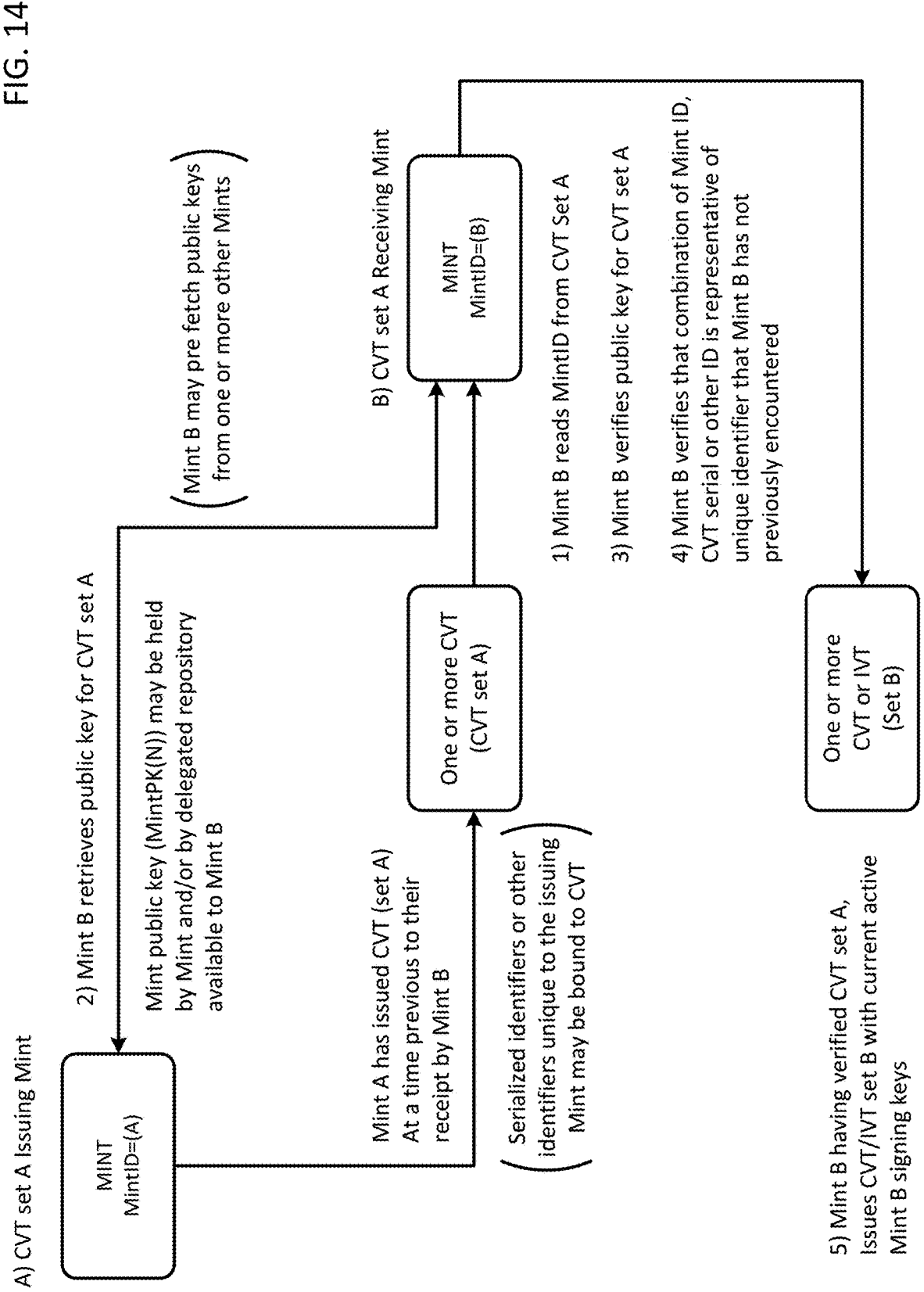
FIG. 14 illustrates an example method for verifying a set of Coded Value Tokens by a Mint, according to an example embodiment of the present invention.

FIG. 14 illustrates an example method for verifying a set of Coded Value Tokens by a Mint, according to an example embodiment of the present invention. When a Mint verifies a set of Coded Value Token(s) (for example, that all share the same Redemption Mint ID), the Mint:

reads the Issuing Mint ID from the request (for example, from information associated with a Coded Value Token) message retrieves the public Coded Value Token-key for that Issuing Mint (for example, either from the request message, or a local cache, or from the other Mint)

verifies the Coded Value Token set are properly signed with that public key verifies that the combination of Issuing Mint ID, Coded Value Token number (for example a serial number that represents a unique identifier (UID) that is unique to the signing mint does not previously occur in its Coded Value Token data repository signs the requested Intrinsic Value Token or Coded Value Token with its corresponding Issuing Mint active signing keys.

Example: Secure Token Escrow in a Network of Mints Issuing Difference Classes of Value Tokens In this example, a Mint's data repository may include information sets corresponding to Value Tokens. Part of this information set may include token state information, such as double spending information to prevent multiple redepemptions of the same token. As part of this information, one possible value of token state information for a Value Token may be 'In Escrow'. For example, the 'In Escrow' state may indicate that the associated Value Token is part of a multi-phase transaction. For example, such a multi-phase transaction may involve multiple Mints of the same Class and/or multiple Mints of different Classes. In some cases, a payee or swap recipient, does not even have to be assigned while a set of value tokens state information is marked as 'In Escrow'. They could be marked "In Escrow" as a precursor to a transaction.

The set of operations involving a token set with state "In Escrow" may be indivisible and irreducible, such that all of the operations involving such a token set occur or no operations involving such a set occur. For example, in this manner, if there are a number of participants involved in an overall transaction, where such a transaction may involve multiple constituent transactions and/or operations involving one or more token sets where at least one of which has a state of "In Escrow", these operations and their constituents, may be arranged so that a controlling logic, specification and/or operating program may require that each of these constituent steps is undertaken, for example in a specified sequence or other organization of such processes, before the state of the token set is changed from "In Escrow" state to another state.

A complex swap is a Value Token swap where a set of value tokens from multiple Mints (for example of the same Class or multiple Classes) are swapped for another set of value tokens. An Exchange device may be provided to controls the secure exchange of value tokens of different classes in a complex swap.

An Escrow management unit may be associated with a Mint. For example the escrow management unit may be cryptographically bound to the Mint, and may manage issuing of a Coded Value Token set until the Escrow conditions for the exchange, are met, or the exchange transaction is cancelled.

Figure 16:
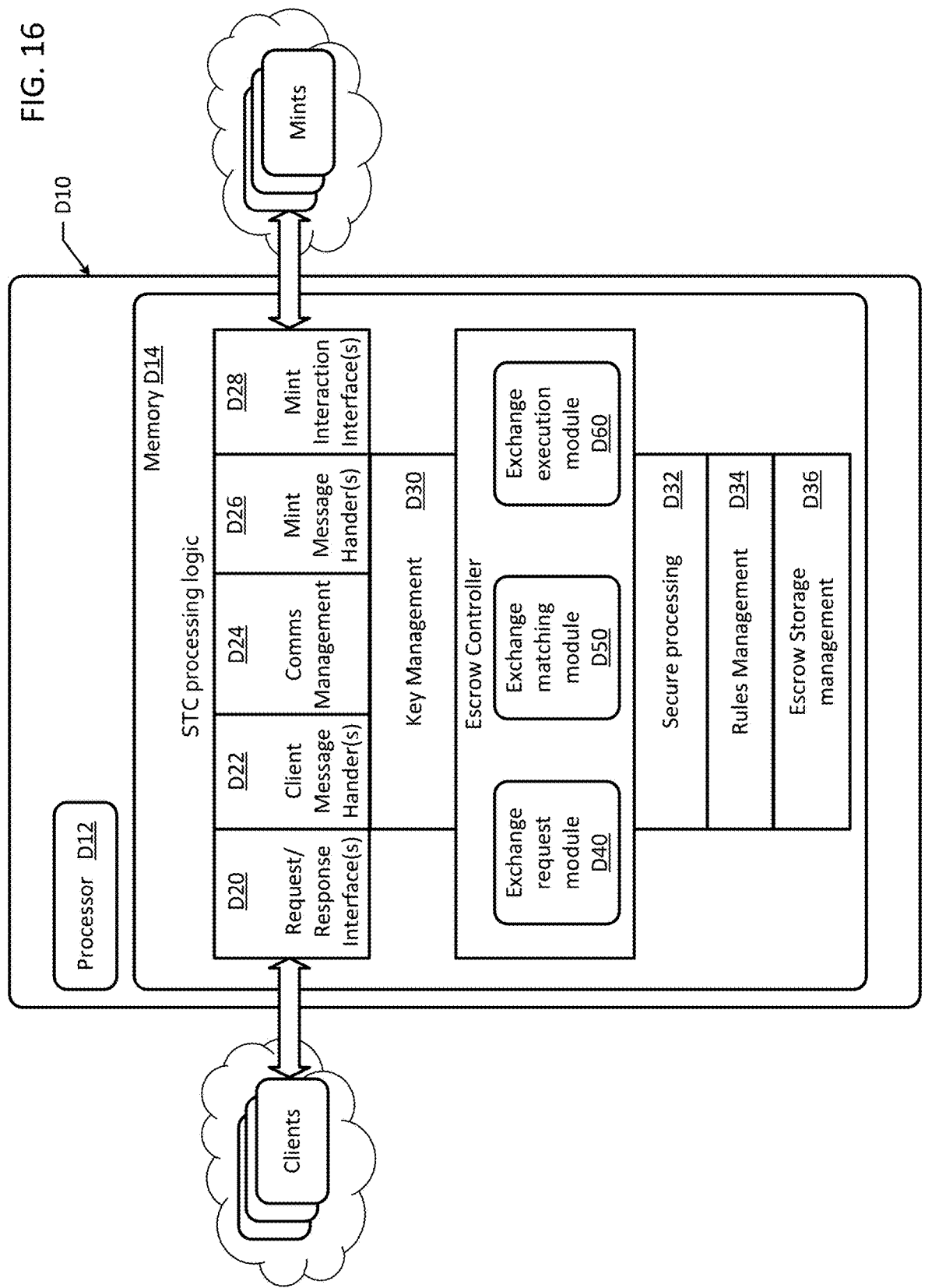
FIG. 16 illustrates an example secure transaction controller architecture, according to an example embodiment of the present invention.

A Secure Transaction Controller (STC) may be provided to control the atomicity of Complex Swaps. FIG. 16 illustrates an example secure transaction controller D10, according to an example embodiment of the present invention. The escrow management system (or just the STC) can be implemented, in whole or as part of a hardware device, or as a software controlled device running on a secure processor. The STC may ensure that either all the constituent parts are executed (rolled forward) or none of them are (all parts are cancelled). For example, an STC may be part of an Escrow management system. Escrow transactions may have their respective payee associated when requested, or alternatively at a subsequent time, such as when the transaction is rolled forward, and payee is assigned by STC. Conversely if the transaction is rolled backward, then the transaction is marked as cancelled. In the case only the original payer may receive the Coded Value Token once they are identified. For example, if a Complex Swap is cancelled, the relevant Mint may allow participants to swap the values tokens originally submitted in the Complex Swap for fresh tokens.

The STC D10 includes a processor D12 in communication with memory D14. The escrow controller may include an exchange request module D40, an exchange matching module D50, and an exchange execution module D60, which are stored in memory D14. Memory D14 may include request and/or response interfaces D20, client message hander(s) D22, and a communication management module D24. The STC may also include mint message hander(s) D26 and Mint interaction interface(s) D28. The escrow controller is in communication with various Mints and may receive indications that sets of Value Tokens should be placed in escrow.

This combination of elements may incorporate creation and management of one or more audit trails and may use D30 key management capabilities for securing such audit trails.

D30 A key management unit D30 may be provided to handle encryptions and decryptions of keys, provide public key encryption, and the like, e.g., as described in the various process diagrams described herein that use key systems. D30 may be used by other STC elements for securing communications and/or supporting authorization and/or authentication capabilities.

An exchange request module D40 may be provided to receive and process requests for exchange transactions received from clients.

An exchange matching module D50 may be provided to match client requests for exchanges, or to receive such matchings from some other system that identifies such potential matches. The exchange matching module may provide various sorts of exchanges, such as exchanges that have been identified elsewhere, market orders, auction, and the like, described elsewhere in this disclosure, and may further include using rules managed in Rule management module D34.

An exchange execution module D60 may execute an exchange after an acceptable match has been identified by the Exchange matching module.

Each of D40, D50 and D60 may in combination with D36 create and maintain one or more audit trails and/or other records pertaining to the operations of such entities.

D34 Rules management may manage rules sets for one or more request/response, client and/or Mint operations. D34 may facilitate the creation and deployment of one or more rule sets in response to requests/response and/or Mint interactions where such rule sets are applied to such interactions dynamically. Rule sets may, in some embodiments, have further rule sets that determine the type of operations such sets are associated with and may pass such information sets to other STC elements, for example D60 for instantiation.

Secure processing for all the other modules may be facilitated by secure processing module D32. From the time a request is made until execution of an exchange is completed, the escrow status of tokens may be handled by Escrow storage management unit D36. Such status may be secured though using D30 in combination with D32, such that STC processing of exchange requests and responses, including interactions with Mints is end-to-end secure. In some embodiments, D32 may be instantiated as a hardware system, for example as a System on a Chip (SOC), such as for example an ARM SOC, whereby the secure processing in undertaken with that SOC secure processing domain. In some embodiments, an STC may be instantiated as a hardware device, incorporating such SOC, whereby the processor D12, Memory D14 and all other system elements are embodied in secure hardware, which may be further hardened. It will be appreciated that all of the above described modules could also be provided as special purposes hardware, ASICs or FPGAS, or the like.

Figure 17:
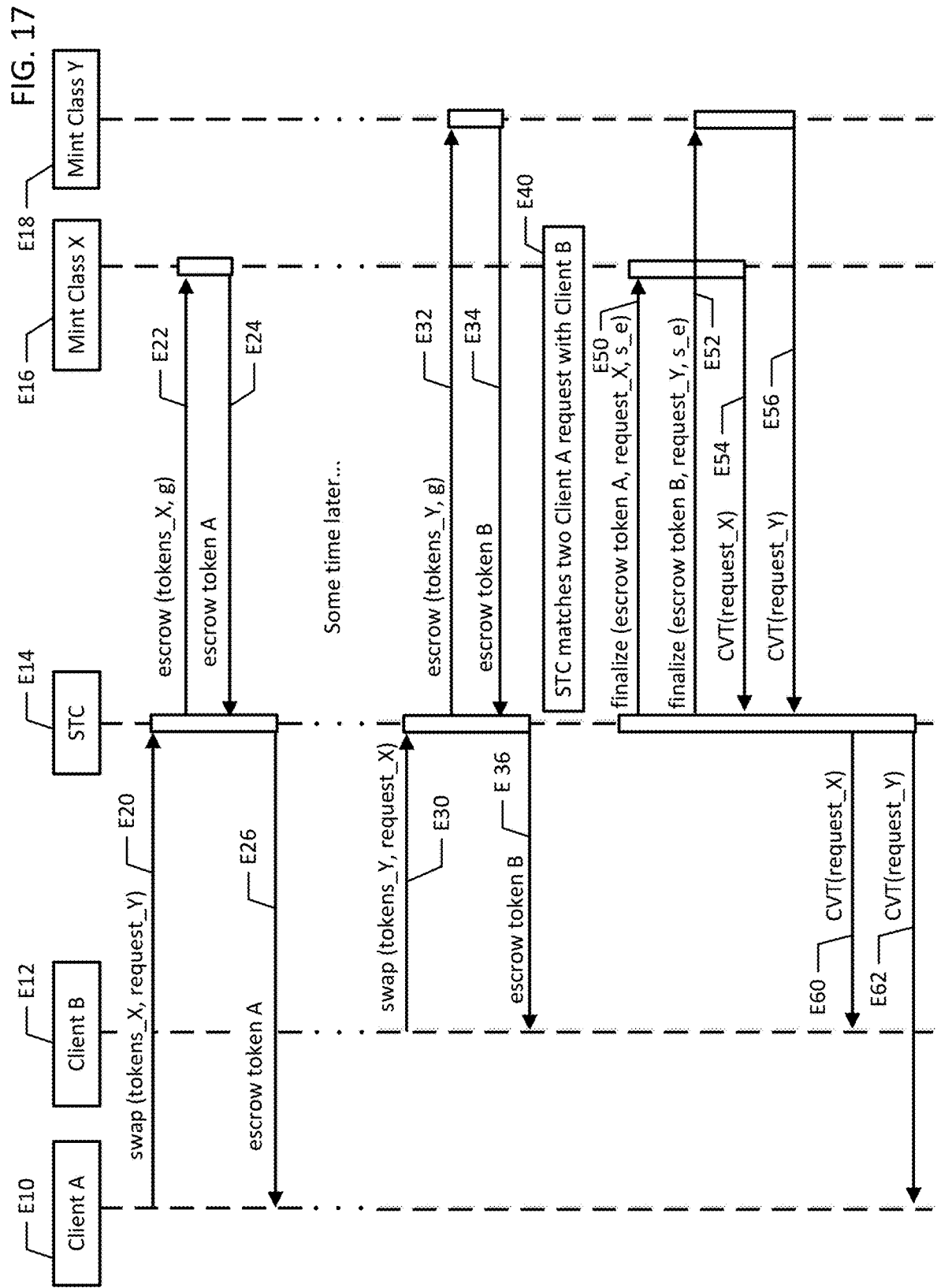
FIG. 17 illustrates an example process flow for a Value Token exchange, using a secure transaction controller, according to an example embodiment of the present invention.

FIG. 17 illustrates an example process flow for a Value Token exchange, using a secure transaction controller E14, according to an example embodiment of the present invention. For illustration, the complex swap may involve clients E10 and E12, secure transaction controller E14, and Mint E16 for Value tokens of Class X and Mint E18 for Value Tokens of Class Y.

In E20, Client E10 may request an exchange of a set of Value tokens of Class X for Value Tokens of Class Y. In response, the secure transaction controller may send an escrow request for the Mint E16 responsible for redeeming class X tokens. In E24, the secure transaction controller may receive an acknowledgement indicating that the set of class X tokens has been placed in escrow which may be in the form of or include an escrow token A. In E26, in response to receiving the acknowledgement, the STC may also inform Client E10 that the tokens have been placed in escrow, and may provide the Client E10 with the escrow token A.

At the same or at some later time, in E30, Client E12 may send a request to exchange tokens of class Y for tokens of class X. In E32 the STC may make an escrow request to Mint E18 that handles redemptions of Value Tokens of Class Y. In E32, the STC may receive an acknowledgement from Mint E18 indicating the set of tokens of Class Y has been placed in escrow, which may in in the form of or include an escrow Token B. In E36, the STC may also inform Client E12 that the tokens have been placed in escrow and may provide the escrow token B to client E12.

In E40, the requests from Clients E10 and E12 can be matched, either by the STC, or by some other system that identifies the matching and communicates the match to STC. In response to the STC determining that there is match, the STC communicates with Mints to complete the exchange. The communications with the multiple mints may be done atomically. In E50, the STC communicates with the Mint E16 to finalize the request for swapped tokens for the set of tokens of Class X, by provided a finalization request including the escrow token A, and a request for new tokens of Class X which will be provided to client B. In E52 the STC communicates with mint E18 to finalize the request for swapped tokens for the set of tokens of Class Y, by sending the escrow token B, and request to execute a swap for new tokens of class Y for client A. In E54, coded Value Tokens of class X may be received from Mint E16 by the STC. These tokens may be coded to indicate Client E12 is the intended recipient. In E56 coded value tokens of Class Y may be received from Mint E18 by the STC. These tokens may be coded to indicate client E10 is the intended recipient. In E60, the STC sends the coded Value Tokens of Class X to client E12. In E62, the STC sends the coded Value Tokens of Class X to client E10. The clients may subsequently swap their respective coded Value Tokens for intrinsic Value tokens at the appropriate Mint.

It will be appreciated that the STC performs E50, E52, E54, E56, E60, and E62 in an atomic fashion, so that all the actions are completed.

Figure 15:
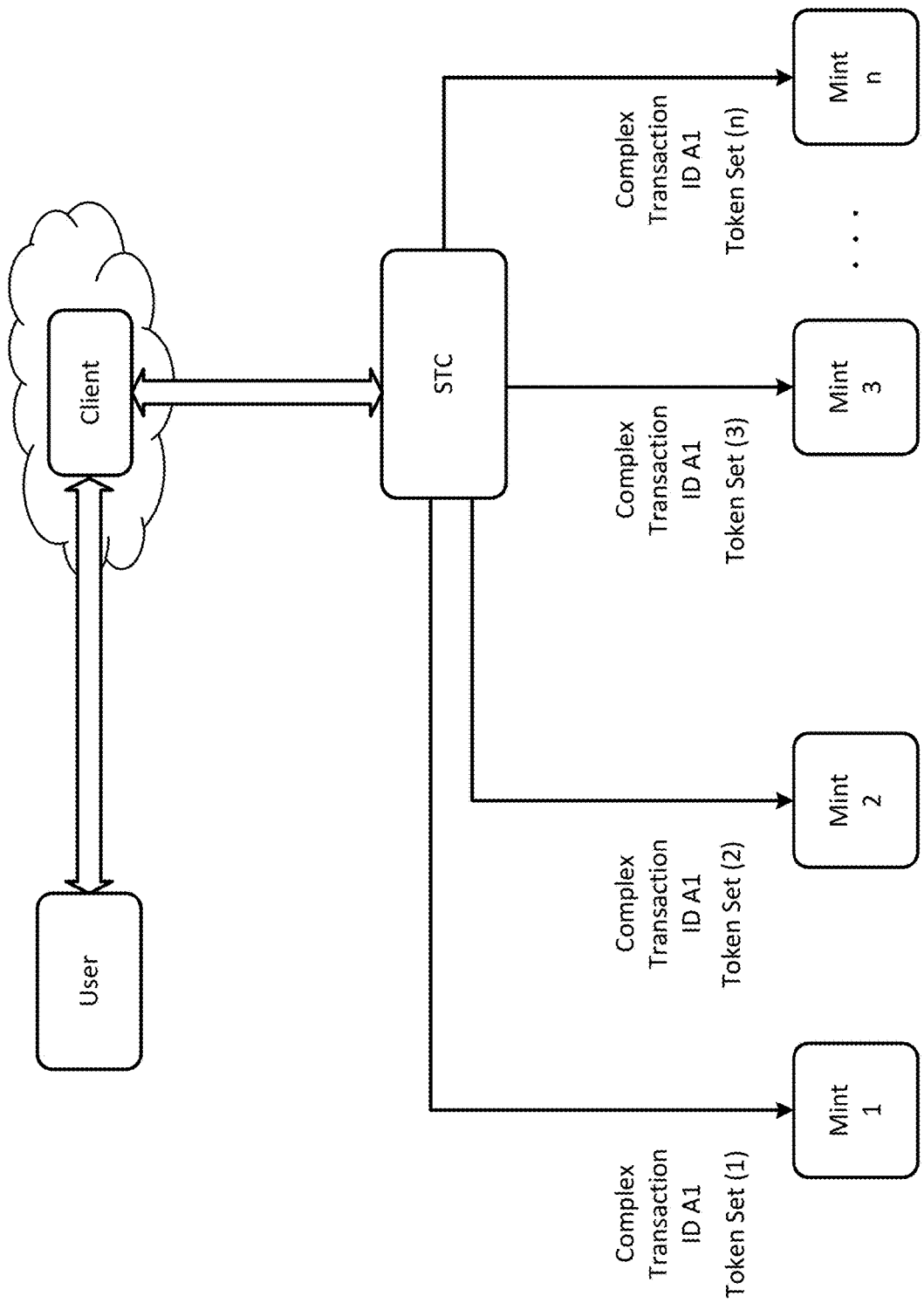
FIG. 15 illustrates an example complex transaction using a complex transaction id and multiple Mints, according to an example embodiment of the present invention.

FIG. 15 illustrates an example complex transaction using a complex transaction id and multiple Mints, according to an example embodiment of the present invention. In some embodiments, when initiating a Complex Swap, an STC creates a unique identifier for the transaction (illustrated as "m"). In some embodiments, an STC, which is controlling the transaction, creates and manages records of such transaction, whereby such record is controlled, and where appropriate, secured by, such STC. In some embodiments, such records may be stored locally (for example in STC accessible memory or storage medium) and/or in a distributed manner (for example in cloud storage).

When receiving Value Tokens from a user, the STC sends an Escrow request to the Mint that includes the Complex Swap transaction id as well as an expiry date/time. The Mint verifies the tokens (and puts them on the double-spent list) and returns an Escrow Token.

The STC does this with every Mint that is part of the Complex Swap. For example as Intrinsic Value Token and Coded Value Token are presented to an STC, such STC may contact those set of Mints associated with such Intrinsic Value Token and Coded Value Token, and as such may maintain a network of Mints sufficient for the effective evaluation and management of the transaction involving such tokens.

When all Escrow tokens have been received and verified by the appropriate Mints, the STC records the decision to execute and requests finalization of the Escrow transaction to each one of the cooperating Mints. These Mints in turn return the final Coded Value Tokens for the swaps that are subsequently distributed by the STC to the participants involved in the transaction.

When the STC decides to cancel the transaction (for example, because not all preconditions could be met in the required time pegriod), the STC records the cancellation in its repository and requests cancellations from each of the cooperating Mints.

The Escrow Request and Escrow Token may also include an expiry date/time after which the Escrowed tokens can be cancelled. In some embodiments, an Escrow token may also identify or be directly associated with the initial presentation to an STC, for example a deposit, and consequently such token is only valid for that transaction.

In each case there will be a unique piece of data (illustrated as 'g') that is stored by each Mint involved in the Complex Swap. When the STC decides to finalize the transaction the Escrow finalization message includes a piece of data, such as a private key, (illustrated as 's_e') that can be verified using g. Alternatively, when the STC decides to cancel the transaction the request message includes a piece of data (illustrated as 's_c') that can also be verified using g. In some embodiments there will be a controlling secret 'r' from which 'g', 's_e' and 's_c' are derived.

Figure 18:
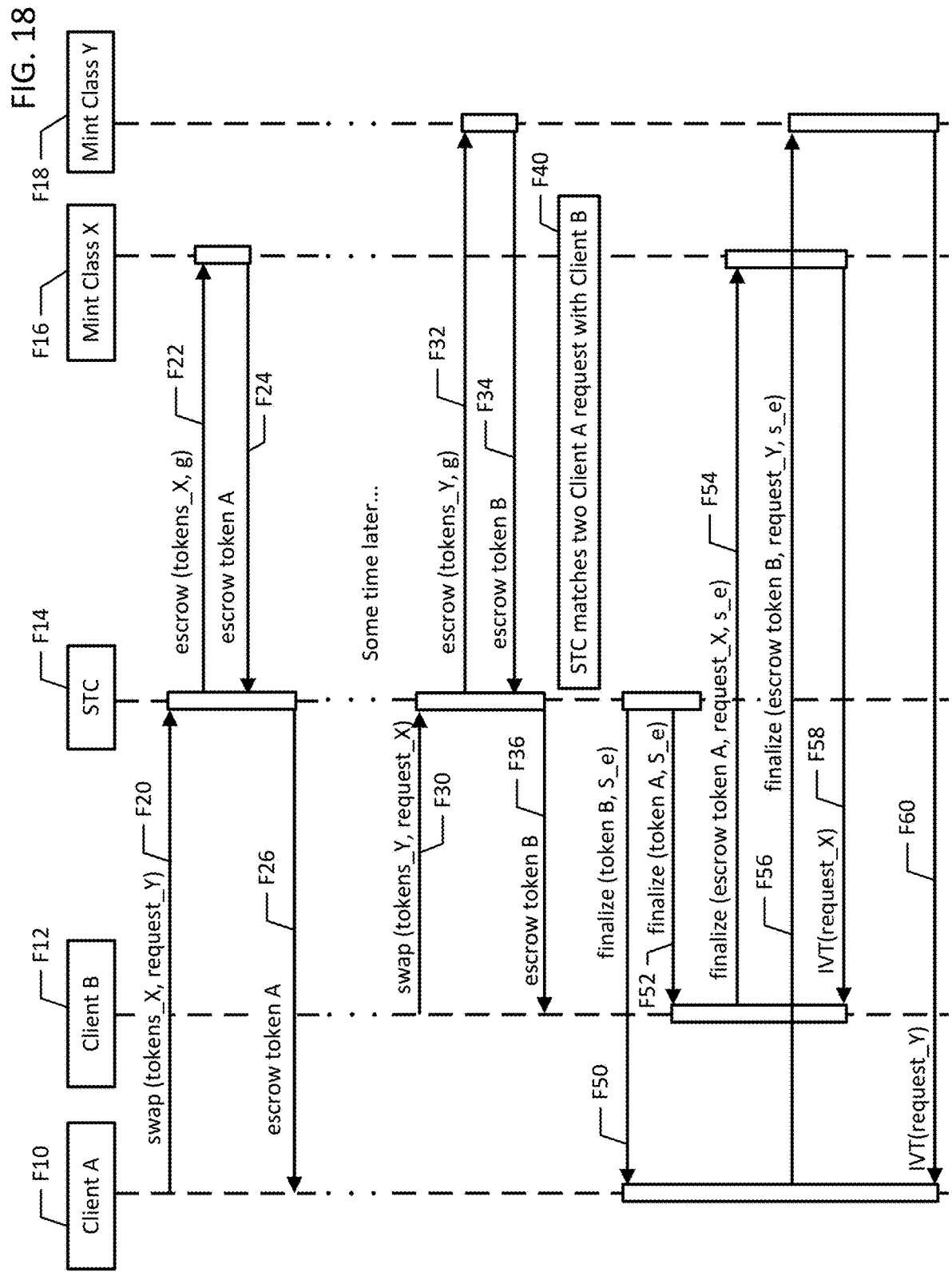
FIG. 18 illustrates an alternative example process flow for a Value Token exchange, using a secure transaction controller, that includes a complex swap transaction key according to an example embodiment of the present invention.

FIG. 18 illustrates an alternative example process flow for a Value Token exchange, using a secure transaction controller, that includes a complex swap transaction key according to an example embodiment of the present invention. For illustration, the complex swap may involve clients F10 and F12, secure transaction controller F14, and Mint F16 for Value tokens of Class X and Mint F18 for Value Tokens of Class Y.

In F20, Client F10 may request an exchange of a set of Value tokens of Class X for Value Tokens of Class Y. In response, the secure transaction controller may send an escrow request for the Mint F16 responsible for redeeming class X tokens. In F24, the secure transaction controller may receive an acknowledgement indicating that the set of class X tokens has been placed in escrow, which may be in the form of or include an escrow token A. In response to receiving the acknowledgement, the STC may also inform Client F10 that the tokens have been placed in escrow and may provide the escrow token A to the client.

At the same or at some later time, in F30, Client F12 may send a request to exchange tokens of class Y for tokens of class X. In F32 the STC may make an escrow request to Mint F18 that handles redemptions of Value Tokens of Class Y. In F34, the STC may receive an acknowledgement from Mint F18 indicating the set of tokens of Class Y has been placed in escrow, which may in the form of or include an escrow token B. In F36, the STC may provide an indication to Client F12 that the set of tokens of Class Y has been placed in escrow and may provide the escrow token B to client B.

In F40, the requests from Clients F10 and F12 can be matched, either by the STC, or by some other system that identifies the matching and communicates the match to STC. In response to the STC determining that there is match, in F50 the STC communications with send a finalization message to client A included escrow token B and private key s_e. In F52, the STC communicates a finalization message to client F12 including escrow token A and private key S_e.

In F54, in response to receiving the finalization message from the STC, the client B may request to swap of the escrow token A for intrinsic value tokens of class X at Mint F16. IN F56, which may happen asynchronously with F54, in response to receiving the finalization message from the STC, the client A may request a swap of the escrow token B for intrinsic value tokens of class Y from Mint F18. In F58, client B may receive the requested intrinsic value tokens. In F60, client A may receive the requested intrinsic value tokens of class Y.

Example: Key Handling

An STC may create a unique key for a Complex Swap, which may be public key (g) of which is sent with each Escrow request. The public key may be stored by each Mint in manner that associates it with the escrowed tokens. The Escrow Token may also contains this public key or a one-way hash thereof.

In some embodiments, when an STC executes a Complex Swap, it signs an Escrow finalization message with the private key ('s_e') and returns to each of the user's clients such an Escrow finalization message informing the user that the pre-settled transaction has been successfully undertaken.

In this example, each user can now contact the relevant Mints and retrieve the appropriate Coded Value Token for the token swap using the Escrow Token and Escrow Finalization message.

Alternatively, to cancel the transaction, the STC signs a request message ('s_c') that can be used by user's clients to prove to a Mint that the transaction has been cancelled by the STC.

In some embodiments, a private key can comprise two random secrets such that the public key is a hash of the image of each secret after a one-way function (for example such as a Merkle function). The STC can now reveal either the first secret and the second one-way (for example, to execute) or the second secret and the first one-way (for example, to cancel).

In this example, the combination of r_e and r_c form the controlling secret 'r'. The following diagram illustrates the process by which the STC derives the public key 'g' from two random secrets 'r_e' and 'r_c' using two one-way functions f1 and f2.

Figure 20:
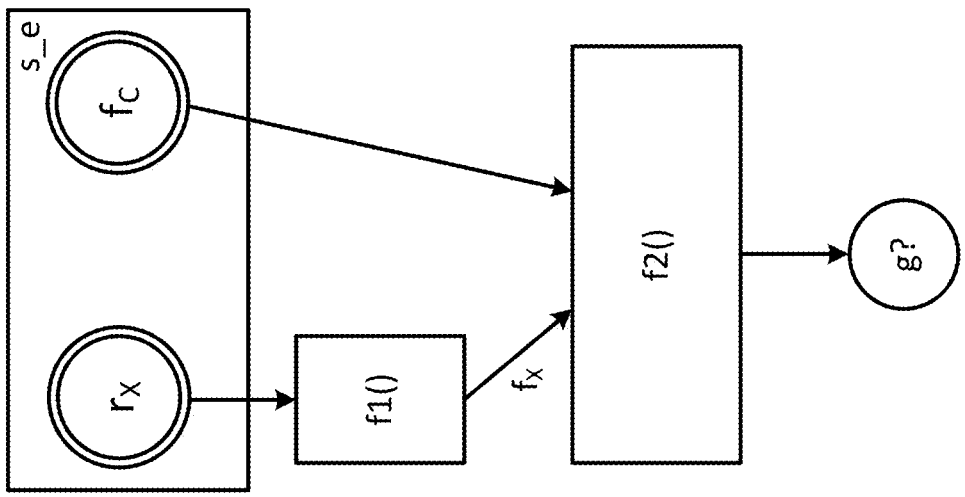
FIG. 20 illustrates an example procedure for verifying an execute message, according to an example embodiment of the present invention.
Figure 19:
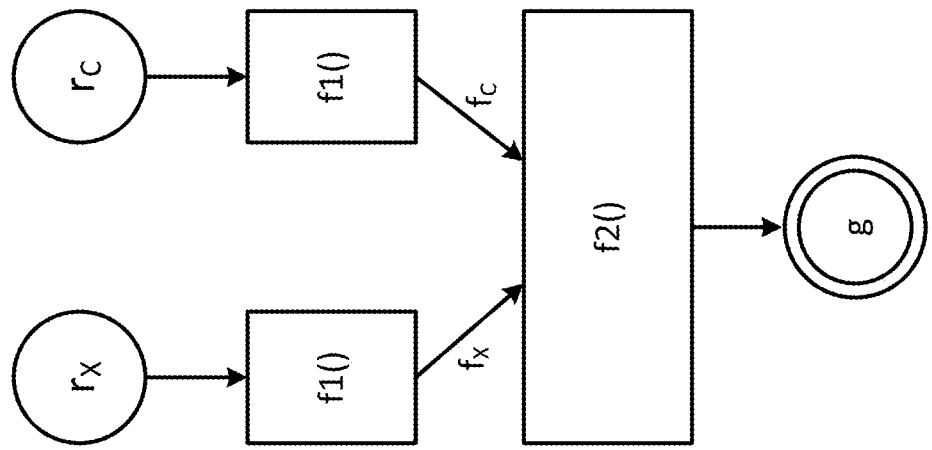
FIG. 19 illustrates an example procedure for deriving the public key, according to an example embodiment of the present invention.

FIG. 19 illustrates an example procedure for deriving the public key, according to an example embodiment of the present invention. The public key 'g' is provided to the mints as described in section. When the STC executes a Complex Swap it provides the message 's_e' to the client which includes r_e and f1(r_y). The mint subsequently verifies the result of applying the one-way functions with the stored public key 'g'. FIG. 20 illustrates an example procedure for verifying an execute message, according to an example embodiment of the present invention.

Figure 21:
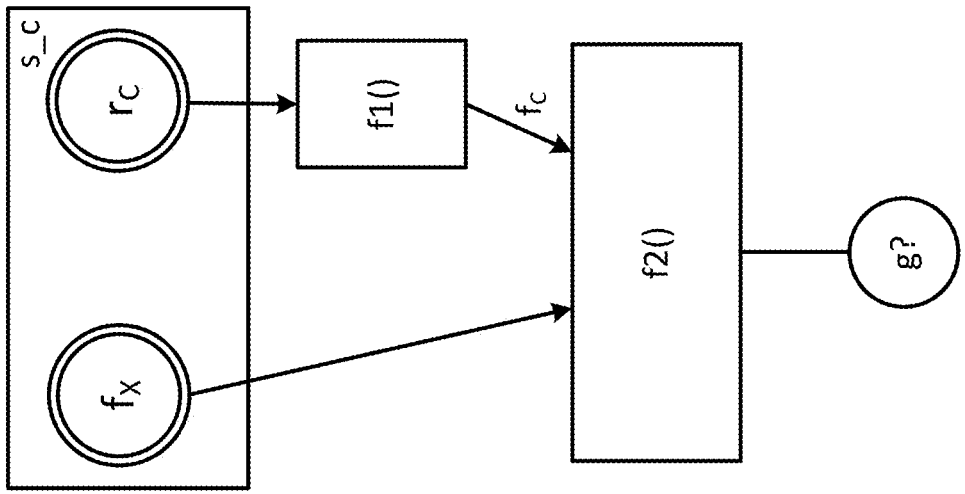
FIG. 21 illustrates an example procedure for verifying a cancel message, according to an example embodiment of the present invention.

Alternatively, if the STC decides to cancel a Complex Swap it provides the message 's_c' to the client which includes r_c and f1(r_e). The mint subsequently verifies the result of applying the one-way functions with the stored public key 'g'. FIG. 21 illustrates an example procedure for verifying a cancel message, according to an example embodiment of the present invention.

Further Example: Escrow Finalization Messages

In some embodiments, in place of an assigned payee identity being included in a Coded Value Token, an Escrow Finalization message can be a token swap of token requests for final tokens.

The STC can store the original token requests for Intrinsic Value Token that should be returned as part of the swap. When the escrow is finalized, the STC relays the token requests to the appropriate Mint(s) and returns the result to the user's client. In this manner, retrieving the Coded Value Token and swapping the Coded Value Token for Intrinsic Value Token may be bypassed.

STC Exchange Operations

An STC may receive a set of Value Tokens with sets with a value token requests including an expressed enumerated value in the class of desired Tokens. For example, a price can be a set in one or more Value Token requests (either same Class or different Classes). The message indicates a willingness to sell the Value Tokens in return for Value tokens requested.

The exchange STC escrows the tokens and creates a Complex Swap transaction. This transaction is effectively the 'order' and will remain valid until fulfilled or cancelled.

If a match is made with another complimentary order, the exchange STC finalizes the transaction and returns the Coded Value Token to the parties involved.

These orders may or may not be published. Publication may be to any selected and/or authorized location (for example, web, network, cloud etc.), repository, client and/or the like.

In some embodiments, a 'Market order' may just include a set of Value Tokens and a requested token class (for example, without a price). The Exchange can then match with the best price currently available for the requested class.

An STC may also include or have access to one or more rule sets determining the operation of such an STC. Each STC may be able to execute such rule sets to control exchanges. Examples of such rulesets are illustrated below:

Store and Forward Service

For example, in an embodiment of a store and forward service, the following rule sets may be operated:
  A Store-and-Forward device receives a request to send a set of Value Tokens to a particular recipient.
  The recipient may not be a member of the system, or may not be ready to accept payments, or we may want to notify a recipient in real-time of the availability of a payment without revealing the contact details of that recipient.
  The Store-and-Forward device's STC requests escrow for the Value Tokens to ensure the tokens are real and that the service is not used to spam unsuspecting users with fake payments.
  The Store-and-Forward device sends a notification to the recipient that a payment is available
  When the recipient requests to collect the payment, the Escrow is finalized and the Coded Value Token returned to the recipient
  The sender may (or may not) receive a notification when the payment has been collected.
  The payment may be cancelled by the sender as long as it has not been collected yet.

Multi-Currency Payment (e.g., Using Loyalty Points Program)
  An example embodiment of a Merchant STC where:
  The Merchant requests tokens for more than one class at the same time from the users wallet.
  The user sends sets of Value Tokens for each of these classes in a single message.
  The Merchant's STC creates a Complex Swap and sends Escrow requests for each of these sets of Value Tokens to their corresponding Mints.
  After all Escrow Tokens have been received, the Merchant's STC finalizes the Escrow.

Auction
  An example embodiment of an STC where:
  The Auction device stores a reference to the highest bidder for a particular item.
  When a set of Value Tokens is received that have more value than the current highest bidder, they are Escrowed by the Auction's STC. If the Escrow Token is received, the previous highest bidder's Escrow is cancelled.
  When the time limit of the Auction has passed, the Escrow is finalized with the seller as recipient.

Crowd-Funding
  An example embodiment of an STC where:
  A party requests a certain amount of Value tokens in a particular class.
  Each set of Value Tokens received is escrowed by the STC.
  When the total requested amount has been reached, the STC finalizes the Escrow with the payee id of the party.

Combinations

In some embodiments, multiple Escrow tokens can be finalized at the same time (at the same Mint) and can be combined into a single Coded Value Token.

Examples: Using Exchanges for Payment Processing

In some example embodiments, exchanging a set of Intrinsic Value Token for a set of Coded Value Token can be an atomic operation where input tokens are stored in the spent token repository at the same time as a signed Coded Value Token is associated with them.

This results in a consistent operational behavior, such that (Re-)Sending a request with the same set of Intrinsic Value Token produces the same set of Coded Value Token.

In some embodiments, exchanging a (set of) Coded Value Token for a (set of) Intrinsic Value Token can be an atomic operation where the signed Intrinsic Value Token are associated with the input Coded Value Token.

This results in a consistent operational behavior, such that (Re-)Sending a request with for a Coded Value Token requires the same set of Intrinsic Value Token requests and produces the same Intrinsic Value Tokens.

Figure 22:
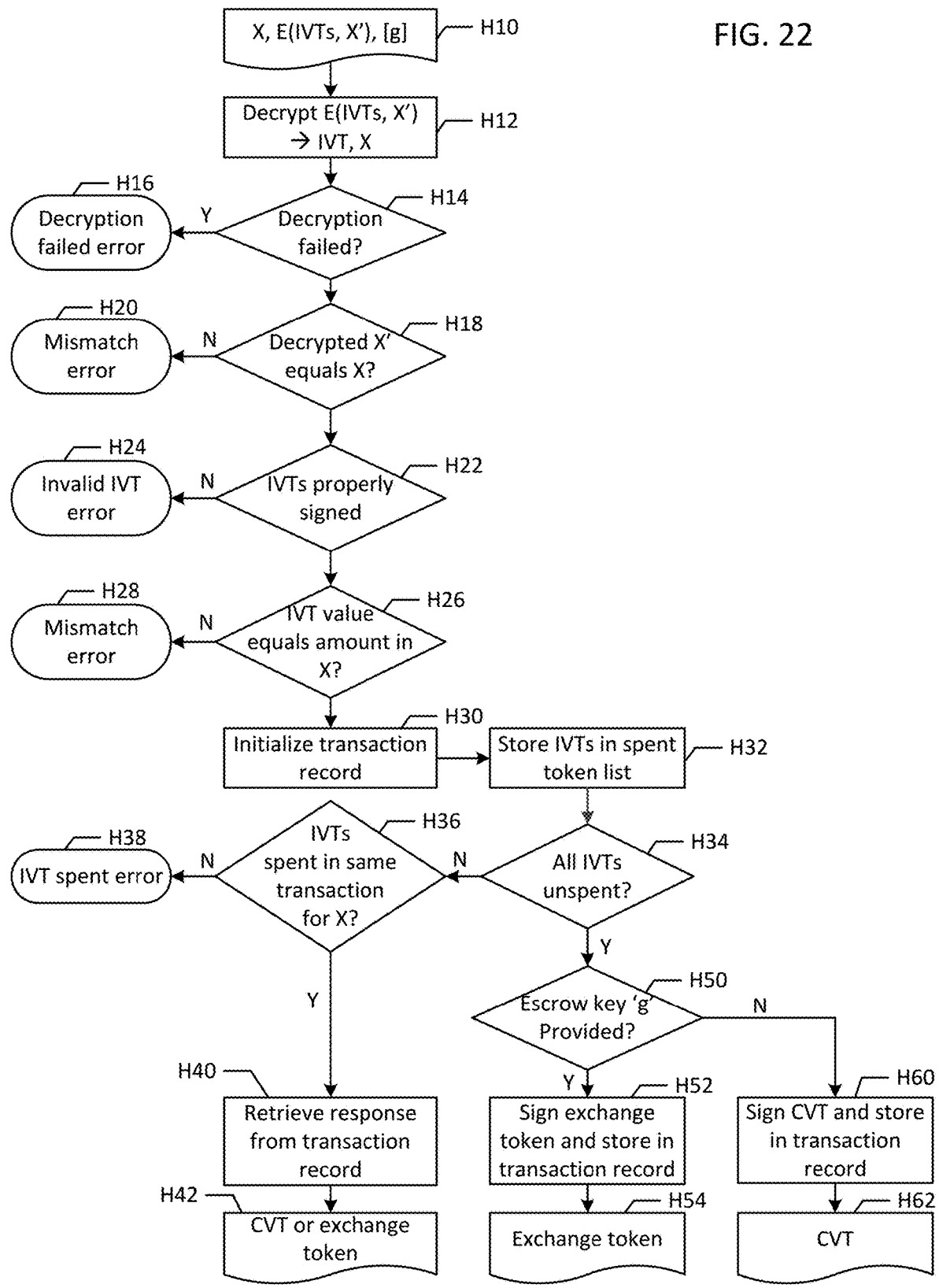
FIG. 22 illustrates a flowchart of an example process for an exchange of Intrinsic Value Token for a Coded Value Token.

FIG. 22 illustrates a flowchart of an example process for processing an exchange of Intrinsic Value Token for a Coded Value Token. This process may be carried out by a Mint, e.g., as a Mint deposit process. It will be appreciated that, alternatively, in place of a Coded Value Token, if there is an escrowed exchanged, an escrow token may be sent in place of a Coded Value Token.

Figure 23:
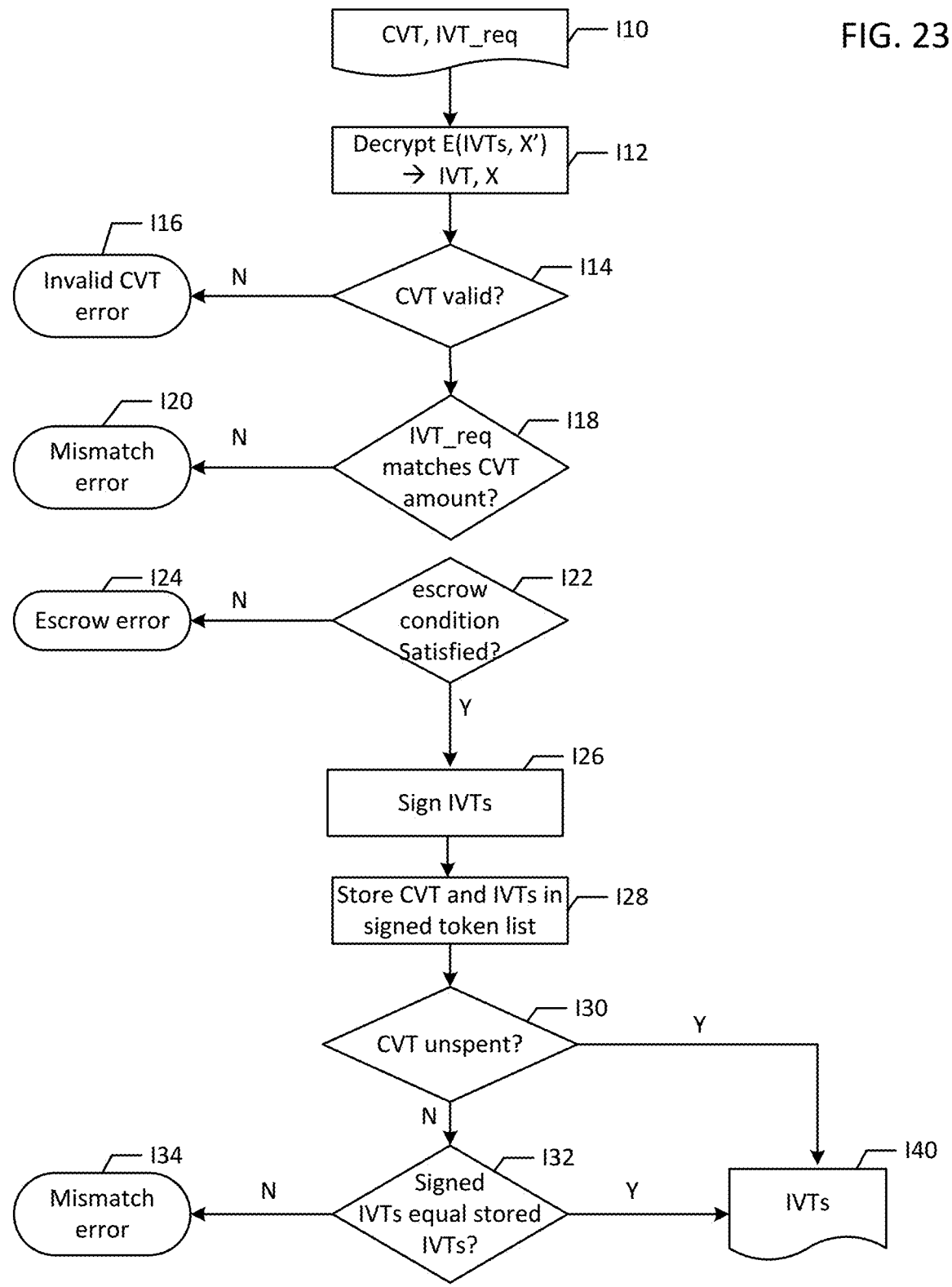
FIG. 23 illustrates a flowchart for an example process for an exchange of a Coded Value Token (or an escrow token) for freshly signed Intrinsic Value Token.

FIG. 23 illustrates a flowchart for an example process for a Coded Value Token (or an escrow token) for freshly signed Intrinsic Value Token. This process may be carried out by a Mint, e.g., as a Mint withdrawal process.

Payment Examples

It will be appreciated that exchanges, as described in the preceding sections, can be used to facilitate payment transaction of various types between client devices or users. The following examples illustrate various scenarios that may arise with such exchanges.

Example Normal Payment Exchange

Figure 24:
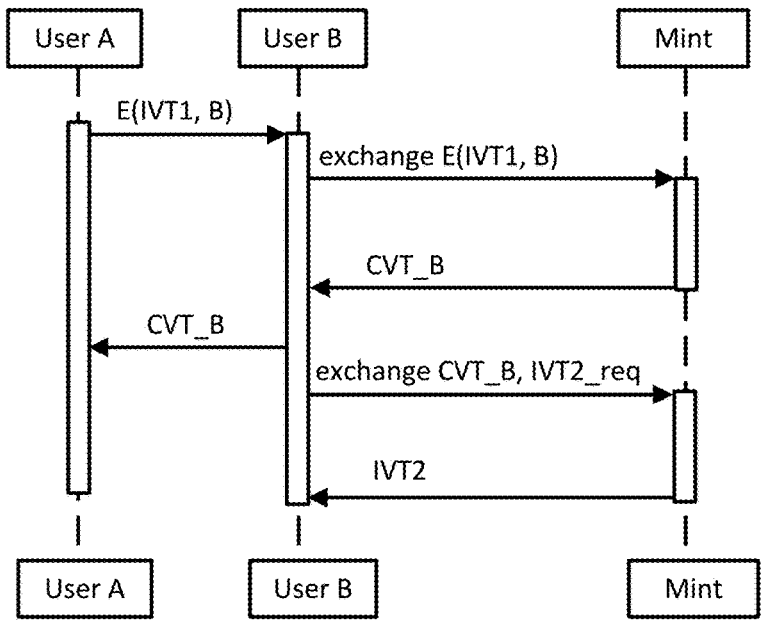
FIG. 24 illustrates a normal exchange in an example exchange process used for payments, according to an example embodiment of the present invention.

FIG. 24 illustrates a normal exchange in an example exchange process used for payments, according to an example embodiment of the present invention. In the normal exchange, a User B may receive value tokens from User A as a form of payment. User B checks the value tokens with a Mint and receives its own value tokens in return.

1. User A sends its Payment Message with encrypted Intrinsic Value Token to User B
2. User B exchanges the Payment Message for a Coded Value Token
3. Mint checks the Intrinsic Value Token were not already spent and issues a Coded Value Token to User B
4. User B returns the Coded Value Token to User A as a confirmation of the payment
5. User B exchanges the Coded Value Token for new Intrinsic Value Token2
6. Mint checks the Coded Value Token was not already spent and issues Intrinsic Value Token2

Example Retry Exchange

Figure 25:
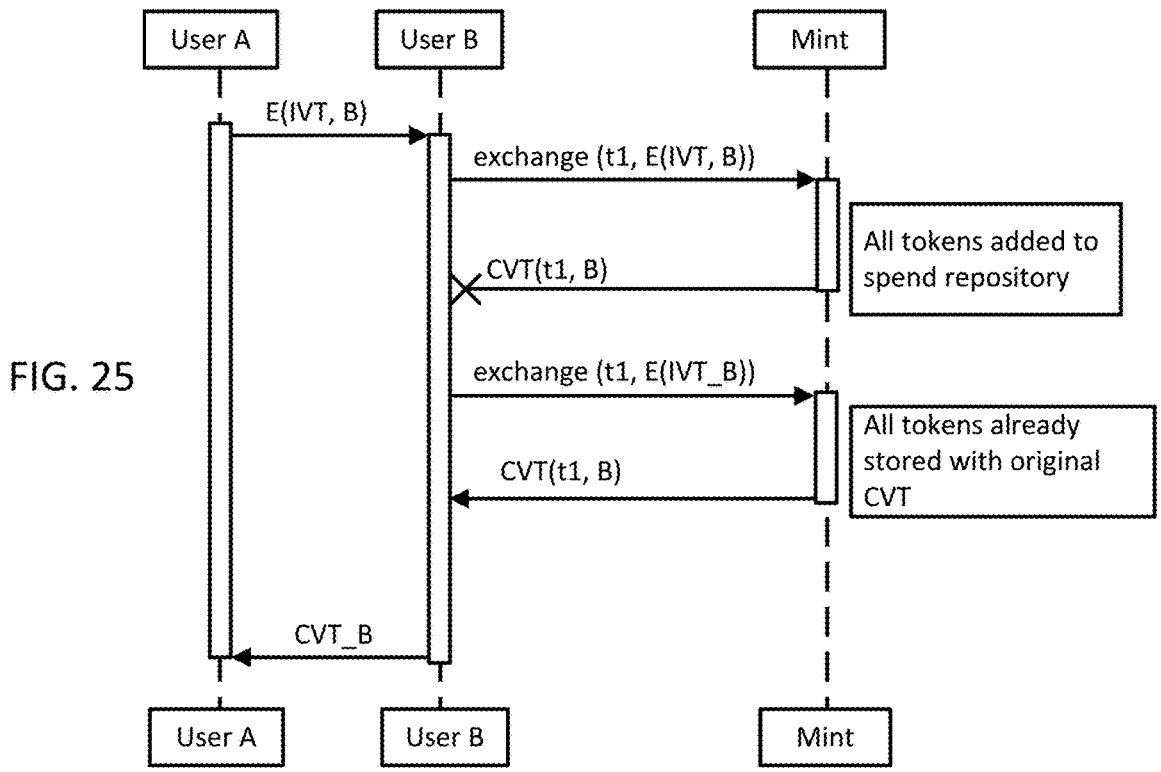
FIG. 25 illustrates a retry exchange in an example exchange process used for payments, according to an example embodiment of the present invention.

In some embodiments, when a request from User B to a Mint fails (for any reason except a permanent failure, for example a network error), User B simply resends the request. FIG. 25 illustrates a retry exchange in an example exchange process used for payments, according to an example embodiment of the present invention.

1. User A sends a payment message with encrypted Intrinsic Value Token to User B
2. User B requests exchange of the Payment Message for a Coded Value Token
3. Mint checks the Intrinsic Value Token were not already spent and issues a Coded Value Token to User B
4. User B never receives response (timeout or temp failure)
5. User B resends exact same request
6. Mint determines tokens have already been spent in another transaction and returns Coded Value Token for that transaction (as it was also issued to User B)
7. User B returns the Coded Value Token to User A as a confirmation of the payment User B then proceeds to exchange the Coded Value Token for its own Intrinsic Value Token in the normal way.

Example Payment Resending

In some embodiments, for example User A resends the same value tokens after a previous payment has been completed. User B may or may not accept the resending of the payment.

Figure 26:
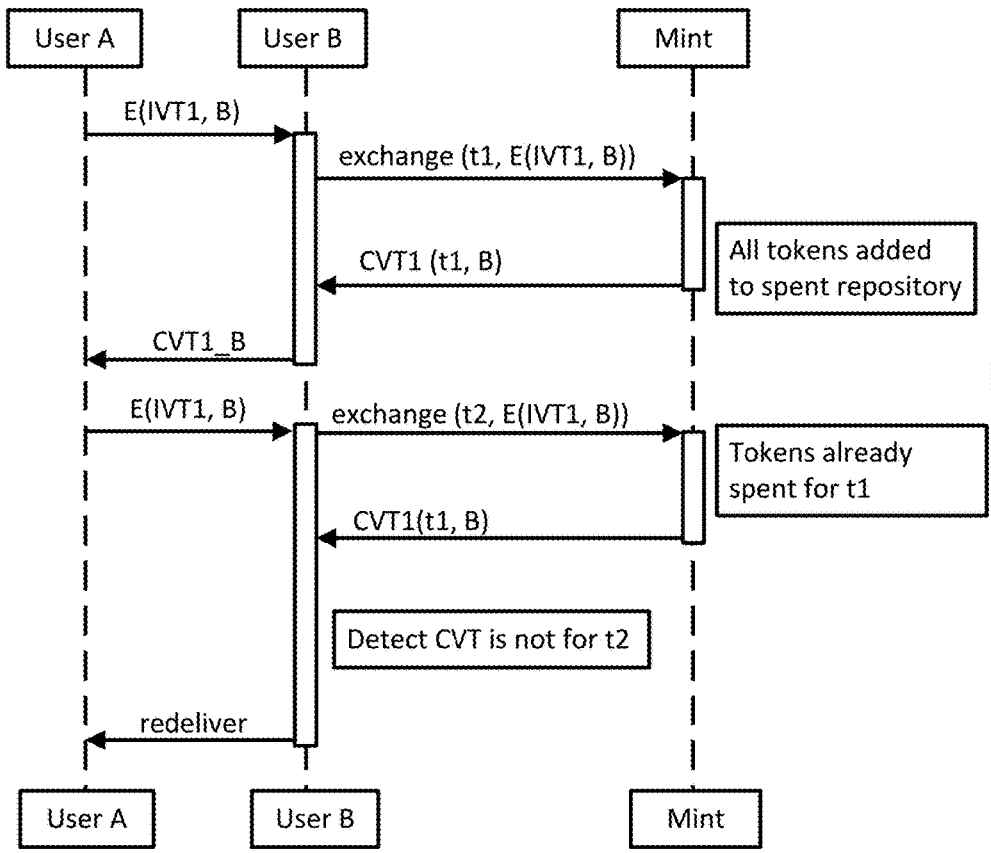
FIG. 26 illustrates resending in an example exchange process used for payments, according to an example embodiment of the present invention.

For example, if User B delivers a digital message in response to a payment, the exact same digital message is delivered. FIG. 26 illustrates resending in an exchange process used for payments, according to an example embodiment of the present invention.

1. User A sends a Payment Message with encrypted Intrinsic Value Token1 to User B
2. User B exchanges the Payment Message for a Coded Value Token1
3. Mint checks the Intrinsic Value Token were not already spent and issues a Coded Value Token1 to User B
4. User B returns the Coded Value Token to User A as a confirmation of the payment. (The process of exchanging Coded Value Token1 for Intrinsic Value Token2 is described in more detail elsewhere in this disclosure)
5. User A resends the Payment Message, or sends a new Payment Message with the same Intrinsic Value Token1.
6. User B attempts an exchange with a new transaction id and the Payment Message received.
7. Mint determines tokens have already been spent in another transaction and returns Coded Value Token for that transaction (as it was also issued to User B).
8. User B detects that Coded Value Token is actually for t1 (not t2) and returns either a failure or the original digital delivery.

Example Payment Cancellation

Figure 27:
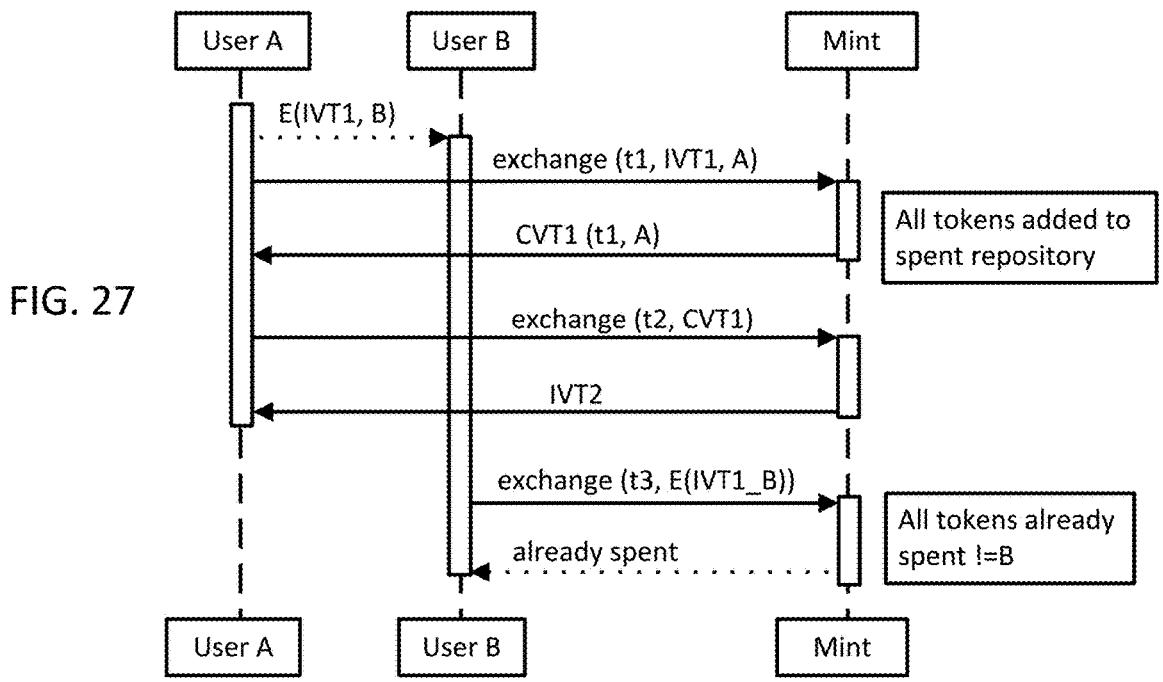
FIG. 27 illustrates cancellation of a payment, in an example exchange process used for payments, according to an example embodiment of the present invention.

In some embodiments, User A sends a payment to User B but cancels the payment before User B can exchange the tokens. Figure FIG. 27 illustrates cancellation of a payment, in an exchange process used for payments, according to an example embodiment of the present invention.

Figure 28:
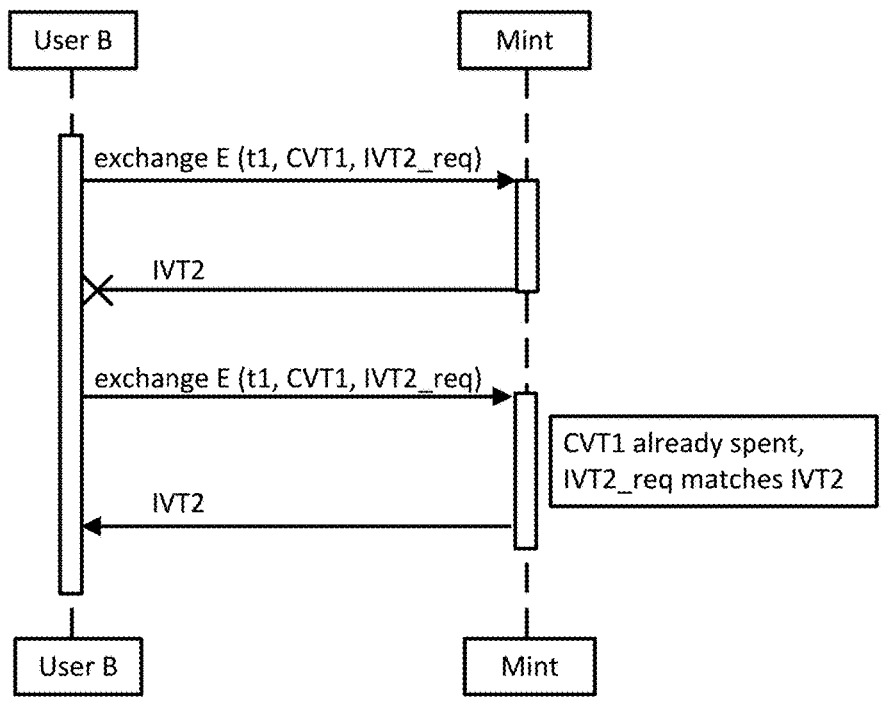
FIG. 28 illustrates an example retry exchange of coded value tokens for intrinsic tokens, as part of a payment process, according to an example embodiment of the present invention.

1. User A sends a Payment Message with encrypted Intrinsic Value Token1 to User B
2. User A requests exchange of Intrinsic Value Token1 for Coded Value Token (possibly with blinding factors to prove ownership of the Intrinsic Value Token1)
3. Mint determines that Intrinsic Value Token1 were not already spent and issues a Coded Value Token1 for User A
4. (User A exchanges Coded Value Token1 for Intrinsic Value Token2, however this is not significant for this example)
5. User B attempts to exchange the Payment Message with encrypted Intrinsic Value Token1 for a Coded Value Token
6. Mint determines that Intrinsic Value Token1 are already spent but that the associated Coded Value Token is not for User B and returns a permanent failure Example Retry Exchange: Coded for Intrinsic In some embodiments, exchanging Coded Value Token for Intrinsic Value Token can be retried as long as the second Intrinsic Value Token request message matches the first Intrinsic Value Token request exactly. (i.e. exact same unsigned blinded Intrinsic Value Token). Figure FIG. 28 illustrates an example retry exchange of coded value tokens for intrinsic tokens, as part of a payment process, according to an example embodiment of the present invention.
1. User B requests exchange of Coded Value Token1 for its own Intrinsic Value Token2
2. Mint checks the Coded Value Token1 was not already spent and issues (and stores) Intrinsic Value Token2
3. User B does not receive response from Mint (timeout or failure)
4. User B resends request for exchange of Coded Value Token1 for its own Intrinsic Value Token2
5. Mint determines that Coded Value Token1 was already spent and verifies Intrinsic Value Token2 request against the Intrinsic Value Token2 stored and responds with Intrinsic Value Token2
6. User B receives Intrinsic Value Token2

Example: Payment of Partially Spent Tokens

Figure 29:
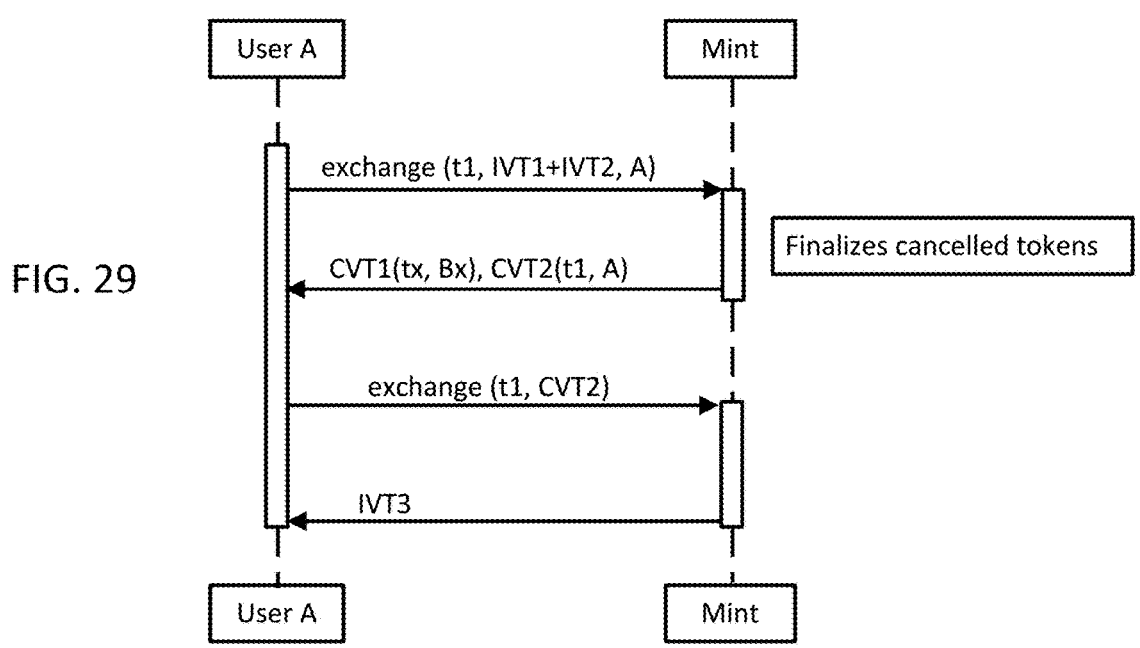
FIG. 29 illustrates an example attempt to exchange a set of tokens which are partially spend, according to an example embodiment of the present invention.

Figure FIG. 29 illustrates an example attempt to exchange a set of tokens which are partially spend, according to an example embodiment of the present invention.

In some embodiments, when a User sends a Payment Message that contains tokens some of which are spent and others are not, the Mint creates a Coded Value Token for the unspent tokens allowing them to be cancelled only (for example, cancel "In Escrow" state). The User sending the tokens for exchange receives a permanent failure.

In the following example, the UIntrinsic Value Token is the set of unspent Intrinsic Value Token and the SIntrinsic Value Token is the set of already spent Intrinsic Value Token.
1. User A requests exchange of previously spent tokens and unspent tokens.
2. Mint finalizes any cancelled tokens, spends any unspent tokens and issues a Coded Value Token2 for their combined value.
3. Mint responds with all Coded Value Token1 for transactions in which tokens were previously spent as well as the Coded Value Token2
4. User A checks its transaction record for the Coded Value Token1 and retries the exchange of any Coded Value Tokenx that have not been exchanged for Intrinsic Value Token yet, yielding Intrinsic Value Token3.

Example: Idempotent Responses to Resends

In some embodiments described in the present disclosure, at various points in an interaction, communications may fail and cause (either automatic or explicit) resend or retries of a request. These failures may occur at different points, e.g.:
1. Communications failure during request sending
2. Communications timeout while waiting for response
3. Temporary processing failure (unavailability of resources—for example, network errors, repository unavailable, internal server configuration and/or the like)
4. Permanent processing failure (request syntax error, or request denied)
5. Communications failure during response sending
6. Also, termination of the client application while a request is being processed may occur.

These situations may be conveniently addressed by configuring a client to always retry a request with the outcome that it will yield the same result.

For example, a transaction may have state, such that a client first records a transaction (where such transaction may, in some embodiments, be prospective) and can always resend such a transaction using values stored with the transaction record managed by such client. Whenever a response is received, the local client transaction record is updated and as such the transaction state is updated. The state update may cause a next request to be sent.

In some embodiments, a client retains transaction state as may the counter party of such a transaction, for example a Mint, STC, another client, server or other entity acting as a counter party.

Example: Final (Indelible) Transaction

In some embodiments, as a token transaction always results in a token swap, a write once ledger may provide an indelible audit trail for such transactions. For example, the state of the system may be modified by appending transactions to a ledger so as to create an indelible record for those transactions. This record may be written to write-once media to preserve the state of the system and the transaction history across a system failure. For example, this may employ one or more cryptographic techniques to establish the veracity and irrefutable unique state of such a record. For example, a blockchain, Merkel Tree and/or other hash arrangements or digital signatures may be used. For example, once a token has been decrypted by redeeming Mint, e.g., by its intrinsic token verification unit, the token is added to at least one appropriate and accessible spent token list. Even when the transaction fails because some tokens have already been spent at the time of the request, the particular failure is caused by that combination of tokens and unspent tokens and the transaction should be recorded and the unspent tokens will be marked as spent (or actually cancelled).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

The invention is claimed as follows:

1. A secure transaction controller for use in exchanging digital Value Tokens which are cryptographically signed, comprising:
   a processor,
   a memory in communication with the processor;
   an exchange request module stored in the memory and executed by the processor to
      receive first request from a first client device to exchange a first set of Value Tokens of a first respective class redeemable by a first Mint for Value Tokens of a second respective class redeemable by a second Mint the first request including the first set of Value Tokens,
      responsive to the first request, provide an indication to an escrow controller in communication with the first Mint that the first set of Value Tokens should be placed in escrow,
      receive, responsive to providing the indication, an acknowledgement confirming that the first set of Value Tokens is valid and has been placed in escrow
      receive a second request from a second client device to exchange a second set of Value Tokens of the second respective class for Value Tokens of the first respective class, the second request including the second set of Value tokens, and
      responsive to the second request, provide a second indication to an escrow controller in communication with the second Mint that the second set of Value Tokens should be placed in escrow;
      receive responsive to providing the second indication, an acknowledgement confirming that the second set of Value Tokens is valid and has been placed in escrow;
   an exchange matching module stored in the memory and executed by the processor to determine there is a match between the first request and the second request;
   an exchange execution module stored in the memory and executed by the processor to, responsive to the exchange matching module determining there is a match between the first request and the second request, and conditioned on the acknowledgements from the first and second Mints having been received, send an instruction to the first Mint to swap the first set of Value Tokens for a first set of new coded Value Tokens of the first class, each cryptographically signed by the first Mint and including information sufficient to confirm the second client device is the original recipient of a respective one of the first set of new coded Value Tokens, and a second instruction to the second Mint to swap the second set of Value tokens for a second set of new coded Value Tokens of the second class, each cryptographically signed by the second Mint and each including information sufficient to confirm the first client device is the original recipient of a respective one of the second set of new coded Value Tokens.

2. The system of claim 1, wherein the exchange execution module is further executed by the processor to
   receive the first set of new coded Value Tokens from the first Mint encoded to indicate the identity of the second client device as recipient and deliver the first set of new coded Value Tokens to the second client device,
   receive the second set of new coded tokens from the second Mint encoded to indicate the identify of the first client device as recipient and deliver the second set of new coded Value Tokens to the first client device.

3. The system of claim 1, wherein the exchange execution module is further executed by the processor to
   send a first escrow finalization message to the first client device, the escrow finalization message allowing the first client device to retrieve the second set of new coded Value Tokens from the second Mint.

4. The system of claim 1 wherein
   the first request includes an enumerated value in the second class, and wherein the processor executing the exchange matching module matches the first and second requests conditioned on a total enumerated value of the second set of Value Tokens meeting or exceeding the enumerated value included in the first request.

5. The system of claim 1 wherein the first request indicates a market order, and wherein the processor executing the exchange matching module matches the first request with the second request chosen from a set of requests to exchange Value Tokens of the second class for Value Tokens of the first class, the second request having the highest total enumerated value of the set of requests.

6. The system of claim 1, further comprising:
   a ruleset stored in the memory, the processor executing the exchange matching module using the ruleset to match the first set and the second set of Value Tokens.

7. The system of claim 1, where the first set of tokens further includes a token of a third class, different than the first class.

8. The system of claim 1, wherein the indication further includes a complex exchange transaction id, and wherein the instruction to the first Mint and the instruction to the second Mint include the complex exchange transaction id.

9. The system of claim 1, wherein the indication further includes an expiry time.

10. The system of claim 1, wherein the processor executing the exchange matching module determines the matching based, at least in part, on information sets associated with the tokens but not included in such requests.

11. A method of providing a secure token exchange transaction for cryptographically signed digital Value Tokens, comprising:
   receiving, a first digital message including a first request from a first client device to exchange a first set of Value Tokens of a first respective class redeemable by a first Mint for Value tokens of a second respective class redeemable by a second Mint, the first digital message including the first set of Value Tokens;
   responsive to receiving the first request, providing, a first escrow message including an indication to the first Mint that the first set of Value Tokens should be placed in escrow;
   responsive to providing the indication, receiving an acknowledgement confirming that the first set of Value Tokens is valid and has been placed in escrow;
   receiving a second digital message including a second request from a second client device to exchange a second set of Value Tokens of the second respective class for Value Tokens of the first respective class, the second digital message including the second set of Value Tokens;
   responsive to receiving the second request, providing, a second escrow message including a second indication to the second Mint that the second set of Value Tokens should be placed in escrow;
   responsive to providing the second indication, receiving, an acknowledgement confirming that the second set of Value Tokens is valid and has been placed in escrow;

determining there is a match between the first request and the second request; and responsive to determining there is a match between the first request and the second request, and conditioned on the acknowledgements from the first and second Mints having been received, sending an instruction to the first Mint to swap the first set of tokens for a first set of new coded Value Tokens of the first class each cryptographically signed by the first Mint and including information sufficient to confirm the second client device is the original recipient of a respective one of the first set of new coded Value Tokens, and a second instruction to the second Mint to swap the second set of Value tokens for a second set of new coded Value Tokens of the second class, each cryptographically signed by the second Mint and each including information sufficient to confirm the first client device is the original recipient of a respective one of the second set of new coded Value Tokens.

12. The method of claim 11, further comprising:

receiving the first set of new coded Value Tokens from the first Mint encoded to indicate the identity of the second client device as recipient and deliver the first set of new coded Value Tokens to the second client device; and receiving the second set of new coded tokens from the second Mint encoded to indicate the identity of the first client device as recipient and deliver the second set of new coded Value Tokens to the first client device.

13. The method of claim 12, further comprising sending a first escrow finalization message to the first client device, the escrow finalization message allowing the first client device to retrieve the second set of new coded Value Tokens from the second Mint.

14. The method of claim 11, wherein the indication further includes a complex exchange transaction id.

15. The method of claim 11, wherein the Value Tokens in the first and second sets of new coded Value Tokens each include a respective unique identifier, a respective indication of the class of the Value Token, and a respective denomination value.

16. The method of claim 11, wherein the Value Tokens in the first and second sets of new coded Value Tokens each include redemption rule information.

17. The method of claim 11, wherein the Value Tokens in the first and second sets of new coded Value Tokens each include a respective unique identifier of the Mint that issues the respective Value Token.

18. The method of claim 11, wherein the Value Tokens in the first and second sets of new coded Value Tokens each include a respective unique identifier of a Mint other than the Mint that issued the respective Value Token where the respective Value Token can be swapped.

19. The method of claim 11, wherein the Value Tokens in the first and second sets of new coded Value Tokens each include temporal information including a respective "not valid before" indicator.

20. A non-transitory machine readable medium storing a program, configured to, when executed by a processor, to cause a processor to receive, a first digital message including a first request from a first client device to exchange a first set of cryptographically signed digital Value Tokens of a first respective class redeemable by a first Mint for Value tokens of a second respective class redeemable by a second Mint, the first digital message including the first set of Value Tokens;

responsive to receiving the first request, provide a first escrow message including an indication to the first Mint that the first set of Value Tokens should be placed in escrow;

responsive to providing the indication, receive an acknowledgement confirming that the first set of Value Tokens is valid and has been placed in escrow;

receive a second digital message including a second request from a second client device computer to exchange a second set of cryptographically signed digital Value Tokens of the second respective class for Value Tokens of the first respective class, the second digital message including the second set of Value Tokens;

responsive to receiving the second request, provide a second escrow message including a second indication to the second Mint that the second set of Value Tokens should be placed in escrow;

responsive to providing the second indication, receive an acknowledgement confirming that the second set of Value Tokens is valid and has been placed in escrow;

determining there is a match between the first request and the second request; and responsive to determining there is a match between the first request and the second request, and conditioned on the acknowledgements from the first and second Mints having been received, send an instruction to the first Mint to swap the first set of tokens for a first set of new coded Value Tokens of the first class each cryptographically signed by the first Mint and including information sufficient to confirm the second client device is the original recipient of a respective one of the first set of new coded Value Tokens, and a second instruction to the second Mint to swap the second set of Value tokens for a second set of new coded Value Tokens of the second class, each cryptographically signed by the second Mint and each including information sufficient to confirm the first client device is the original recipient of a respective one of the second set of new coded Value Tokens.

\* \* \* \* \*